US012683895B2

(12) United States Patent
Kadous et al.

(10) Patent No.: US 12,683,895 B2
(45) Date of Patent: Jul. 14, 2026

(54) LATENCY-REDUCING WIRELESS NETWORK MULTIPOINT ASSOCIATION

(71) Applicant: Virewirx, Inc., San Diego, CA (US)

(72) Inventors: Tamer Adel Kadous, San Diego, CA (US); Siddhartha Mallik, San Diego, CA (US); Ali A. Elghariani, San Diego, CA (US); Peter John Black, La Jolla, CA (US); Jaspreet Singh, Upland, CA (US)

(73) Assignee: Virewirx, Inc., San Diego, CA (US)

( * ) Notice: Subject to any disclaimer, the term of this patent is extended or adjusted under 35 U.S.C. 154(b) by 0 days.

(21) Appl. No.: 18/759,545

(22) Filed: Jun. 28, 2024

(65) Prior Publication Data

US 2024/0356848 A1 Oct. 24, 2024

Related U.S. Application Data

(63) Continuation of application No. 17/230,783, filed on Apr. 14, 2021, now Pat. No. 12,088,499.

(Continued)

(51) Int. Cl.
H04L 45/74 (2022.01)
H04B 17/327 (2015.01)
(Continued)

(52) U.S. Cl.
CPC ........... H04L 45/74 (2013.01); H04B 17/327 (2015.01); H04L 45/24 (2013.01); H04L 69/22 (2013.01);
(Continued)

(58) Field of Classification Search
None
See application file for complete search history.

(56) References Cited

U.S. PATENT DOCUMENTS

| 170,026 A | 11/1875 | Springsteen |
|---|---|---|
| 5,469,115 A | 11/1995 | Peterzell |

(Continued)

FOREIGN PATENT DOCUMENTS

| KR | 10-2009-0026184 | 3/2009 |
|---|---|---|
| WO | WO 2021/211702 | 10/2021 |

OTHER PUBLICATIONS

International Search Report and Written Opinion for PCT/US2021/027268, mailed on Jul. 6, 2021, in 7 pages.

(Continued)

*Primary Examiner* — Jenee Holland
(74) *Attorney, Agent, or Firm* — Knobbe, Martens, Olson & Bear, LLP

(57) ABSTRACT

Aspects of the disclosure relate to a multipoint environment that enables a station (STA) to communicate with multiple access points (APs) and an AP to communicate with multiple STAs in a single wireless protocol stack. For example, a STA can authenticate simultaneously with multiple APs and decode any data packet that includes in a header a destination address that matches an address of the STA, irrespective of the source address included in the header of the data packet. Similarly, an AP can decode any data packet that includes in a header a destination address that matches an address of the AP or that matches a wildcard address associated with the AP, irrespective of the source address included in the header of the data packet.

21 Claims, 17 Drawing Sheets

Related U.S. Application Data

(60) Provisional application No. 63/010,500, filed on Apr. 15, 2020.

(51) Int. Cl.

| | | |
|---|---|---|
| *H04L 45/24* | (2022.01) | |
| *H04L 69/22* | (2022.01) | |
| *H04W 12/06* | (2021.01) | |
| *H04W 28/02* | (2009.01) | |
| *H04W 28/06* | (2009.01) | |
| *H04W 40/02* | (2009.01) | |

(52) U.S. Cl.
  CPC ....... *H04W 12/06* (2013.01); *H04W 28/0231* (2013.01); *H04W 28/0252* (2013.01); *H04W 28/06* (2013.01); *H04W 40/02* (2013.01)

(56) References Cited

U.S. PATENT DOCUMENTS

| | | | |
|---|---|---|---|
| 5,617,060 A | 4/1997 | Wilson | |
| 5,757,858 A | 5/1998 | Black | |
| 5,870,431 A | 2/1999 | Easton | |
| 5,896,373 A | 4/1999 | Mitts et al. | |
| 6,006,108 A | 12/1999 | Black | |
| 6,107,878 A | 8/2000 | Black | |
| 6,134,440 A | 10/2000 | Black | |
| 6,147,964 A | 11/2000 | Black | |
| 6,181,201 B1 | 1/2001 | Black | |
| 6,205,129 B1 | 3/2001 | Esteves | |
| 6,208,873 B1 | 3/2001 | Black | |
| 6,246,885 B1 | 6/2001 | Black | |
| 6,285,861 B1 | 9/2001 | Bonaccorso | |
| 6,363,102 B1 | 3/2002 | Ling | |
| 6,397,070 B1 | 5/2002 | Black | |
| 6,426,971 B1 | 7/2002 | Wu | |
| 6,434,376 B1 | 8/2002 | Black | |
| 6,449,490 B1 | 9/2002 | Chaponniere | |
| 6,466,558 B1 | 10/2002 | Ling | |
| 6,560,211 B2 | 5/2003 | Esteves | |
| 6,574,211 B2 | 6/2003 | Padovani | |
| 6,594,501 B2 | 7/2003 | Black | |
| 6,633,552 B1 | 10/2003 | Ling | |
| 6,636,568 B2 | 10/2003 | Kadous | |
| 6,661,833 B1 | 12/2003 | Black | |
| 6,678,257 B1 | 1/2004 | Vijayan | |
| 6,680,925 B2 | 1/2004 | Wu | |
| 6,680,968 B2 | 1/2004 | Black | |
| 6,687,510 B2 | 2/2004 | Esteves | |
| 6,693,920 B2 | 2/2004 | Montojo | |
| 6,694,469 B1 | 2/2004 | Jalali | |
| 6,700,880 B2 | 3/2004 | Ling | |
| 6,714,526 B2 | 3/2004 | Wei | |
| 6,725,028 B2 | 4/2004 | Bonaccorso | |
| 6,738,608 B2 | 5/2004 | Black | |
| 6,748,201 B2 | 6/2004 | Black | |
| 6,757,520 B2 | 6/2004 | Attar | |
| 6,798,736 B1 | 9/2004 | Black | |
| 6,801,580 B2 | 10/2004 | Kadous | |
| 6,813,478 B2 | 11/2004 | Glazko | |
| 6,873,606 B2 | 3/2005 | Agrawal | |
| 6,894,994 B1 | 5/2005 | Grob | |
| 6,917,821 B2 | 7/2005 | Kadous | |
| 6,920,504 B2 | 7/2005 | Bender | |
| 6,928,062 B2 | 8/2005 | Krishnan | |
| 6,985,516 B1 | 1/2006 | Easton | |
| 6,987,778 B2 | 1/2006 | Sindhushayana | |
| 7,010,073 B2 | 3/2006 | Black | |
| 7,012,883 B2 | 3/2006 | Jalali | |
| 7,020,073 B2 | 3/2006 | Kadous | |
| 7,020,225 B2 | 3/2006 | Sindhushayana | |
| 7,039,001 B2 | 5/2006 | Krishnan | |
| 7,042,857 B2 | 5/2006 | Krishnan | |
| 7,051,268 B1 | 5/2006 | Sindhushayana | |
| 7,068,707 B2 | 6/2006 | Bender | |
| 7,069,037 B2 | 6/2006 | Lott | |
| 7,072,628 B2 | 7/2006 | Agashe | |
| 7,079,550 B2 | 7/2006 | Padovani | |
| 7,088,701 B1 | 8/2006 | Attar | |
| 7,088,957 B2 | 8/2006 | Ling | |
| 7,095,790 B2 | 8/2006 | Krishnan | |
| 7,106,782 B2 | 9/2006 | Howard | |
| 7,123,922 B2 | 10/2006 | Chaponniere | |
| 7,127,654 B2 | 10/2006 | Jalali | |
| 7,130,282 B2 | 10/2006 | Black | |
| 7,133,437 B2 | 11/2006 | Black | |
| 7,145,940 B2 | 12/2006 | Gore | |
| 7,149,264 B2 | 12/2006 | Black | |
| 7,155,246 B2 | 12/2006 | Bhushan | |
| 7,167,684 B2 | 1/2007 | Kadous | |
| 7,177,351 B2 | 2/2007 | Kadous | |
| 7,177,648 B2 | 2/2007 | Attar | |
| 7,184,426 B2 | 2/2007 | Padovani | |
| 7,184,713 B2 | 2/2007 | Kadous | |
| 7,194,041 B2 | 3/2007 | Kadous | |
| 7,206,580 B2 | 4/2007 | Black | |
| 7,209,517 B2 | 4/2007 | Sindhushayana | |
| 7,228,148 B2 | 6/2007 | Esteves | |
| 7,236,535 B2 | 6/2007 | Subramaniam | |
| 7,239,622 B2 | 7/2007 | Black | |
| 7,239,847 B2 | 7/2007 | Attar | |
| 7,251,229 B2 | 7/2007 | Montojo | |
| 7,266,156 B2 | 9/2007 | Montojo | |
| 7,289,473 B1 | 10/2007 | Padovani | |
| 7,295,857 B2 | 11/2007 | Joshi | |
| 7,315,531 B2 | 1/2008 | Black | |
| 7,369,549 B2 | 5/2008 | Wu | |
| 7,376,209 B2 | 5/2008 | Namgoong | |
| 7,382,744 B2 | 6/2008 | Bhushan | |
| 7,411,930 B2 | 8/2008 | Montojo | |
| 7,418,046 B2 | 8/2008 | Gore | |
| 7,428,269 B2 | 9/2008 | Sampath | |
| 7,450,943 B2 | 11/2008 | Black | |
| 7,457,639 B2 | 11/2008 | Subramaniam | |
| 7,463,576 B2 | 12/2008 | Krishnan | |
| 7,477,693 B2 | 1/2009 | Subramaniam | |
| 7,499,427 B2 | 3/2009 | Padovani | |
| 7,508,748 B2 | 3/2009 | Kadous | |
| 7,525,909 B2 | 4/2009 | Fan | |
| 7,564,775 B2 | 7/2009 | Jayaraman | |
| 7,564,794 B2 | 7/2009 | Montojo | |
| 7,564,818 B2 | 7/2009 | Black | |
| 7,567,621 B2 | 7/2009 | Sampath | |
| 7,580,709 B2 | 8/2009 | Black | |
| 7,596,090 B2 | 9/2009 | Black | |
| 7,606,326 B2 | 10/2009 | Krishnan | |
| 7,609,773 B2 | 10/2009 | Bhushan | |
| 7,613,978 B2 | 11/2009 | Jalali | |
| 7,620,005 B2 | 11/2009 | Wei | |
| 7,646,802 B2 | 1/2010 | Black | |
| 7,668,125 B2 | 2/2010 | Kadous | |
| 7,672,383 B2 | 3/2010 | Namgoong | |
| 7,675,886 B2 | 3/2010 | Agrawal | |
| 7,693,213 B2 | 4/2010 | Sindhushayana | |
| 7,725,799 B2 | 5/2010 | Walker | |
| 7,729,714 B2 | 6/2010 | Black | |
| 7,742,447 B2 | 6/2010 | Joshi | |
| 7,796,563 B2 | 9/2010 | Wu | |
| 7,817,677 B2 | 10/2010 | Black | |
| 7,817,760 B2 | 10/2010 | Black | |
| 7,826,441 B2 | 11/2010 | Black | |
| 7,830,900 B2 | 11/2010 | Black | |
| 7,835,695 B2 | 11/2010 | Ling | |
| 7,848,282 B2 | 12/2010 | Padovani | |
| 7,848,283 B2 | 12/2010 | Padovani | |
| 7,848,284 B2 | 12/2010 | Padovani | |
| 7,848,285 B2 | 12/2010 | Padovani | |
| 7,848,298 B2 | 12/2010 | Attar | |
| 7,869,387 B2 | 1/2011 | Black | |
| 7,876,265 B2 | 1/2011 | Black | |
| 7,890,144 B2 | 2/2011 | Subramaniam | |
| 7,893,873 B2 | 2/2011 | Black | |
| 7,903,615 B2 | 3/2011 | Gorokhov | |
| 7,924,753 B2 | 4/2011 | Attar | |

(56) References Cited

U.S. PATENT DOCUMENTS

| | | |
|---|---|---|
| 7,940,663 B2 | 5/2011 | Kadous |
| 7,948,959 B2 | 5/2011 | Wang |
| 7,953,062 B2 | 5/2011 | Sindhushayana |
| 7,961,592 B2 | 6/2011 | Black |
| 7,974,359 B2 | 7/2011 | Gorokhov |
| 7,995,531 B2 | 8/2011 | Padovani |
| 7,995,684 B2 | 8/2011 | Montojo |
| 8,005,042 B2 | 8/2011 | Padovani |
| 8,009,625 B2 | 8/2011 | Padovani |
| 8,010,113 B2 | 8/2011 | Black |
| 8,014,331 B2 | 9/2011 | Sarkar |
| 8,040,942 B2 | 10/2011 | Bhushan |
| 8,042,086 B2 | 10/2011 | Tseng |
| 8,050,198 B2 | 11/2011 | Bhushan |
| 8,073,068 B2 | 12/2011 | Kim |
| 8,077,654 B2 | 12/2011 | Sutivong |
| 8,077,655 B2 | 12/2011 | Padovani |
| 8,077,691 B2 | 12/2011 | Kadous |
| 8,085,678 B2 | 12/2011 | Spindola |
| 8,089,924 B2 | 1/2012 | Padovani |
| 8,094,623 B2 | 1/2012 | Attar |
| 8,094,740 B2 | 1/2012 | Bhushan |
| 8,098,635 B2 | 1/2012 | Montojo |
| 8,102,872 B2 | 1/2012 | Spindola |
| 8,107,517 B2 | 1/2012 | Naguib |
| 8,111,663 B2 | 2/2012 | Black |
| 8,116,283 B2 | 2/2012 | Black |
| 8,126,072 B2 | 2/2012 | Namgoong |
| 8,139,672 B2 | 3/2012 | Gore |
| 8,160,596 B2 | 4/2012 | Black |
| 8,165,619 B2 | 4/2012 | Attar |
| 8,175,594 B2 | 5/2012 | Attar |
| 8,189,540 B2 | 5/2012 | Padovani |
| 8,203,961 B2 | 6/2012 | Yavuz |
| 8,204,530 B2 | 6/2012 | Gorokhov |
| 8,213,390 B2 | 7/2012 | Black |
| 8,218,573 B2 | 7/2012 | Bhushan |
| 8,229,423 B2 | 7/2012 | Sarkar |
| 8,306,096 B2 | 11/2012 | Sampath |
| 8,311,027 B2 | 11/2012 | Padovani |
| 8,331,310 B2 | 12/2012 | Wang |
| 8,331,377 B2 | 12/2012 | Attar |
| 8,331,385 B2 | 12/2012 | Black |
| 8,331,892 B2 | 12/2012 | Kadous |
| 8,340,605 B2 | 12/2012 | Hou |
| 8,351,372 B2 | 1/2013 | Padovani |
| 8,351,456 B2 | 1/2013 | Kadous |
| 8,363,697 B2 | 1/2013 | Grob |
| 8,375,261 B2 | 2/2013 | Shi |
| 8,379,705 B2 | 2/2013 | Mallik |
| 8,385,433 B2 | 2/2013 | Wang |
| 8,385,465 B2 | 2/2013 | Kadous |
| 8,385,923 B2 | 2/2013 | Attar |
| 8,391,196 B2 | 3/2013 | Gorokhov |
| 8,391,337 B2 | 3/2013 | Black |
| 8,391,413 B2 | 3/2013 | Mantravadi |
| 8,406,774 B2 | 3/2013 | Yavuz |
| 8,411,594 B2 | 4/2013 | Black |
| 8,412,227 B2 | 4/2013 | Edge |
| 8,416,756 B2 | 4/2013 | Bhushan |
| 8,432,821 B2 | 4/2013 | Gorokhov |
| 8,451,740 B2 | 5/2013 | Sampath |
| 8,451,776 B2 | 5/2013 | Dayal |
| 8,457,152 B2 | 6/2013 | Gorokhov |
| 8,457,221 B2 | 6/2013 | Palanki |
| 8,462,859 B2 | 6/2013 | Sampath |
| 8,472,322 B2 | 6/2013 | Black |
| 8,483,223 B2 | 7/2013 | Black |
| 8,493,942 B2 | 7/2013 | Luo et al. |
| 8,493,958 B2 | 7/2013 | Attar |
| 8,494,593 B2 | 7/2013 | Black |
| 8,498,192 B2 | 7/2013 | Bhushan |
| 8,498,647 B2 | 7/2013 | Gorokhov |
| 8,514,988 B2 | 8/2013 | Wu |
| 8,526,347 B2 | 9/2013 | Wang |
| 8,576,742 B2 | 11/2013 | Yoo |
| 8,576,760 B2 | 11/2013 | Gorokhov |
| 8,582,621 B2 | 11/2013 | Grob |
| 8,583,137 B2 | 11/2013 | Rezaiifar |
| 8,588,801 B2 | 11/2013 | Gorokhov |
| 8,594,252 B2 | 11/2013 | Black |
| 8,605,729 B2 | 12/2013 | Dayal |
| 8,605,801 B2 | 12/2013 | Rezaiifar |
| 8,611,303 B2 | 12/2013 | Rezaiifar |
| 8,611,305 B2 | 12/2013 | Black |
| 8,611,310 B2 | 12/2013 | Black |
| 8,611,325 B2 | 12/2013 | Black |
| 8,614,981 B2 | 12/2013 | Mallik |
| 8,619,717 B2 | 12/2013 | Agrawal |
| 8,619,835 B2 | 12/2013 | Grob |
| 8,630,602 B2 | 1/2014 | Attar |
| 8,634,435 B2 | 1/2014 | Kadous |
| 8,634,438 B2 | 1/2014 | Nanda |
| 8,638,758 B2 | 1/2014 | Black |
| 8,639,190 B2 | 1/2014 | Gore |
| 8,654,705 B2 | 2/2014 | Wang |
| 8,654,715 B2 | 2/2014 | Wang |
| 8,655,400 B2 | 2/2014 | Kadous |
| 8,675,511 B2 | 3/2014 | Gorokhov |
| 8,675,560 B2 | 3/2014 | Yoo |
| 8,676,209 B2 | 3/2014 | Gorokhov |
| 8,693,344 B1 | 4/2014 | Adams et al. |
| 8,700,083 B2 | 4/2014 | Yavuz |
| 8,712,461 B2 | 4/2014 | Yavuz |
| 8,724,545 B2 | 5/2014 | Dayal |
| 8,724,555 B2 | 5/2014 | Krishnan |
| 8,737,470 B2 | 5/2014 | Walker |
| 8,737,538 B2 | 5/2014 | Grob |
| 8,737,911 B2 | 5/2014 | Black |
| 8,743,909 B2 | 6/2014 | Black |
| 8,744,018 B2 | 6/2014 | Chen |
| 8,760,994 B2 | 6/2014 | Wang |
| 8,767,885 B2 | 7/2014 | Sampath |
| 8,773,308 B2 | 7/2014 | Black |
| 8,781,005 B2 | 7/2014 | Mallik |
| 8,787,183 B2 | 7/2014 | Mallik |
| 8,812,657 B2 | 8/2014 | Mallik |
| 8,817,924 B2 | 8/2014 | Mallik |
| 8,824,979 B2 | 9/2014 | Yavuz |
| 8,825,860 B2 | 9/2014 | Linsky |
| 8,830,934 B2 | 9/2014 | Banister |
| 8,839,079 B2 | 9/2014 | Chen |
| 8,842,693 B2 | 9/2014 | Agrawal |
| 8,848,607 B2 | 9/2014 | Wang |
| 8,854,944 B2 | 10/2014 | Jou |
| 8,855,000 B2 | 10/2014 | Mallik |
| 8,855,001 B2 | 10/2014 | Gorokhov |
| 8,867,456 B2 | 10/2014 | Yavuz |
| 8,868,118 B2 | 10/2014 | Rezaiifar |
| 8,873,534 B2 | 10/2014 | Sindhushayana |
| 8,874,998 B2 | 10/2014 | Walker |
| 8,879,445 B2 | 11/2014 | Sadek |
| 8,885,744 B2 | 11/2014 | Kadous |
| 8,886,126 B2 | 11/2014 | Mantravadi |
| 8,886,239 B2 | 11/2014 | Dayal |
| 8,897,181 B2 | 11/2014 | Wang |
| 8,897,188 B2 | 11/2014 | Black |
| 8,897,220 B2 | 11/2014 | Kadous |
| 8,903,021 B2 | 12/2014 | Mantravadi |
| 8,908,496 B2 | 12/2014 | Kadous |
| 8,909,279 B2 | 12/2014 | Yavuz |
| 8,923,109 B2 | 12/2014 | Wang |
| 8,923,125 B2 | 12/2014 | Lott |
| 8,923,208 B2 | 12/2014 | Dayal |
| 8,929,908 B2 | 1/2015 | Agrawal |
| 8,948,095 B2 | 2/2015 | Black |
| 8,954,063 B2 | 2/2015 | Sarkar |
| 8,958,412 B2 | 2/2015 | Singh et al. |
| 8,971,461 B2 | 3/2015 | Sampath |
| 8,971,823 B2 | 3/2015 | Gore |
| 8,971,884 B2 | 3/2015 | Ahluwalia |
| 8,976,662 B2 | 3/2015 | Somasundaram |
| 8,983,480 B2 | 3/2015 | Rezaiifar |
| 8,995,417 B2 | 3/2015 | Jou |

(56)                    References Cited

U.S. PATENT DOCUMENTS

| | | | |
|---|---|---|---|
| 9,001,735 B2 | 4/2015 | Padovani |
| 9,014,152 B2 | 4/2015 | Jou |
| 9,020,009 B2 | 4/2015 | Barriac |
| 9,036,521 B2 | 5/2015 | Su et al. |
| 9,036,538 B2 | 5/2015 | Palanki |
| 9,055,545 B2 | 6/2015 | Black |
| 9,059,785 B2 | 6/2015 | Fertonani |
| 9,066,306 B2 | 6/2015 | Yavuz |
| 9,071,315 B2 | 6/2015 | Huang |
| 9,071,344 B2 | 6/2015 | Smee |
| 9,072,102 B2 | 6/2015 | Yavuz |
| 9,078,269 B2 | 7/2015 | Yavuz |
| 9,088,389 B2 | 7/2015 | Gorokhov |
| 9,100,227 B2 | 8/2015 | Singh et al. |
| 9,106,287 B2 | 8/2015 | Wang |
| 9,107,056 B2 | 8/2015 | Damnjanovic |
| 9,113,488 B2 | 8/2015 | Oguz |
| 9,118,387 B2 | 8/2015 | Padovani |
| 9,119,026 B2 | 8/2015 | Black |
| 9,119,217 B2 | 8/2015 | Black |
| 9,124,344 B2 | 9/2015 | Padovani |
| 9,124,464 B2 | 9/2015 | Singh et al. |
| 9,131,420 B2 | 9/2015 | Rezaiifar |
| 9,136,953 B2 | 9/2015 | Yoo |
| 9,136,974 B2 | 9/2015 | Gorokhov |
| 9,137,806 B2 | 9/2015 | Yavuz |
| 9,143,957 B2 | 9/2015 | Sadek |
| 9,144,036 B2 | 9/2015 | Gorokhov |
| 9,144,084 B2 | 9/2015 | Sadek |
| 9,148,256 B2 | 9/2015 | Sampath |
| 9,154,179 B2 | 10/2015 | Gudem |
| 9,154,211 B2 | 10/2015 | Sampath |
| 9,155,106 B2 | 10/2015 | Krishnan |
| 9,161,232 B2 | 10/2015 | Linsky |
| 9,161,233 B2 | 10/2015 | Wang |
| 9,167,597 B2 | 10/2015 | Singh et al. |
| 9,172,402 B2 | 10/2015 | Gudem |
| 9,172,453 B2 | 10/2015 | Wang |
| 9,179,319 B2 | 11/2015 | Gore |
| 9,184,870 B2 | 11/2015 | Sampath |
| 9,185,718 B2 | 11/2015 | Kadous |
| 9,185,720 B2 | 11/2015 | Mantravadi |
| 9,198,053 B2 | 11/2015 | Edge |
| 9,204,437 B2 | 12/2015 | Smee |
| 9,210,605 B2 | 12/2015 | Yoo |
| 9,226,173 B2 | 12/2015 | Sadek |
| 9,237,434 B2 | 1/2016 | Mallik |
| 9,237,546 B1 | 1/2016 | Zhang et al. |
| 9,246,560 B2 | 1/2016 | Sampath |
| 9,253,658 B2 | 2/2016 | Sadek |
| 9,264,183 B2 | 2/2016 | Gorokhov |
| 9,265,047 B2 | 2/2016 | Mallik |
| 9,270,441 B2 | 2/2016 | Mallik |
| 9,277,564 B2 | 3/2016 | Wang |
| 9,282,462 B2 | 3/2016 | Dayal |
| 9,288,814 B2 | 3/2016 | Yavuz |
| 9,307,544 B2 | 4/2016 | Gore |
| 9,344,973 B2 | 5/2016 | Yavuz |
| 9,351,307 B2 | 5/2016 | Luo |
| 9,363,764 B2 | 6/2016 | Black et al. |
| 9,374,791 B2 | 6/2016 | Yavuz |
| 9,398,602 B2 | 7/2016 | Kadous |
| 9,408,165 B2 | 8/2016 | Jou |
| 9,408,220 B2 | 8/2016 | Gore |
| 9,419,751 B2 | 8/2016 | Sindhushayana |
| 9,450,723 B2 | 9/2016 | Ramakrishna et al. |
| 9,451,480 B2 | 9/2016 | Huang |
| 9,461,736 B2 | 10/2016 | Bhushan |
| 9,474,051 B2 | 10/2016 | John Wilson |
| 9,474,075 B2 | 10/2016 | Yavuz |
| 9,485,069 B2 | 11/2016 | Wang |
| 9,491,722 B2 | 11/2016 | Yavuz |
| 9,491,755 B2 | 11/2016 | Abu-Surra et al. |
| 9,497,765 B2 | 11/2016 | Yoo |
| 9,521,554 B2 | 12/2016 | Farajidana |
| 9,525,477 B1 | 12/2016 | Wu |
| 9,544,175 B2 | 1/2017 | Kim et al. |
| 9,578,649 B2 | 2/2017 | Dayal |
| 9,585,150 B2 | 2/2017 | Marsh |
| 9,585,156 B2 | 2/2017 | Bhattad |
| 9,660,776 B2 | 5/2017 | Kadous |
| 9,693,323 B2 | 6/2017 | Mallik |
| 9,712,218 B2 | 7/2017 | Singh |
| 9,730,227 B2 | 8/2017 | Marsh |
| 9,750,014 B2 | 8/2017 | Sadek |
| 9,755,705 B2 | 9/2017 | Hou |
| 9,780,847 B2 | 10/2017 | Budianu |
| 9,788,361 B2 | 10/2017 | Valliappan |
| 9,813,497 B2 | 11/2017 | Mallik |
| 9,832,785 B2 | 11/2017 | Kadous |
| 9,838,169 B2 | 12/2017 | Rajagopal et al. |
| 9,860,033 B2 | 1/2018 | Kadous |
| 9,867,194 B2 | 1/2018 | Kadous |
| 9,877,203 B2 | 1/2018 | Yoo |
| 9,882,623 B2 | 1/2018 | Sun |
| 9,893,800 B2 | 2/2018 | Wu |
| 9,900,074 B2 | 2/2018 | Mallik |
| 9,900,856 B2 | 2/2018 | Wu |
| 9,924,368 B2 | 3/2018 | Valliappan |
| 9,929,835 B2 | 3/2018 | Dabeer |
| 9,936,400 B2 | 4/2018 | Lee |
| 9,942,801 B2 | 4/2018 | Yerramalli |
| 9,954,668 B2 | 4/2018 | Lee |
| 9,955,476 B2 | 4/2018 | Black |
| 9,961,579 B2 | 5/2018 | Geirhofer |
| 9,967,729 B2 | 5/2018 | Wang |
| 9,973,923 B2 | 5/2018 | Damnjanovic |
| 9,991,986 B2 | 6/2018 | Sindhushayana |
| 9,991,989 B2 | 6/2018 | Malladi |
| 9,992,004 B2 | 6/2018 | Mallik |
| 10,009,053 B2 | 6/2018 | Somasundaram |
| 10,020,911 B2 | 7/2018 | Mallik |
| 10,021,677 B2 | 7/2018 | Mallik |
| 10,028,332 B2 | 7/2018 | Mallik |
| 10,033,558 B2 | 7/2018 | Yoo |
| 10,034,269 B2 | 7/2018 | Sun |
| 10,044,438 B2 | 8/2018 | Kadous |
| 10,044,459 B2 | 8/2018 | Chendamarai Kannan |
| 10,075,313 B2 | 9/2018 | Black |
| 10,085,283 B2 | 9/2018 | Yoo |
| 10,091,789 B2 | 10/2018 | Valliappan |
| 10,098,140 B2 | 10/2018 | Mallik |
| 10,111,235 B2 | 10/2018 | Singh et al. |
| 10,123,323 B2 | 11/2018 | Mallik |
| 10,136,333 B2 | 11/2018 | Yoo |
| 10,136,452 B2 | 11/2018 | Liu |
| 10,143,005 B2 | 11/2018 | Chendamarai Kannan |
| 10,149,293 B2 | 12/2018 | Damnjanovic |
| 10,149,318 B2 | 12/2018 | Sun |
| 10,178,649 B2 | 1/2019 | Liu |
| 10,182,404 B2 | 1/2019 | Prakash |
| 10,187,900 B2 | 1/2019 | Zhang |
| 10,200,904 B2 | 2/2019 | Zhang |
| 10,201,014 B2 | 2/2019 | Kadous |
| 10,206,117 B2 | 2/2019 | Damnjanovic |
| 10,218,406 B2 | 2/2019 | Liu |
| 10,219,235 B2 | 2/2019 | Patel |
| 10,219,252 B2 | 2/2019 | Chendamarai Kannan |
| 10,219,292 B2 | 2/2019 | Damnjanovic |
| 10,219,300 B2 | 2/2019 | Gorokhov |
| 10,225,818 B2 | 3/2019 | Liu |
| 10,231,131 B2 | 3/2019 | Zhang |
| 10,231,132 B2 | 3/2019 | Zhang |
| 10,244,399 B2 | 3/2019 | Damnjanovic |
| 10,250,678 B2 | 4/2019 | Mallik |
| 10,257,848 B2 | 4/2019 | Sun |
| 10,257,851 B2 | 4/2019 | Patel |
| 10,264,541 B2 | 4/2019 | Patel |
| 10,270,579 B2 | 4/2019 | Chendamarai Kannan |
| 10,278,177 B2 | 4/2019 | Sadek |
| 10,285,117 B2 | 5/2019 | Yoo |
| 10,291,379 B2 | 5/2019 | Kadous |
| 10,292,093 B2 | 5/2019 | Chendamarai Kannan |
| 10,298,289 B2 | 5/2019 | Yerramalli |

(56) References Cited

U.S. PATENT DOCUMENTS

| | | | |
|---|---|---|---|
| 10,299,284 | B2 | 5/2019 | Sadek |
| 10,312,987 | B2 | 6/2019 | Mallik |
| 10,327,241 | B2 | 6/2019 | Kadous |
| 10,327,261 | B2 | 6/2019 | Naghshvar |
| 10,333,595 | B2 | 6/2019 | Fakoorian |
| 10,333,668 | B2 | 6/2019 | Yoo |
| 10,334,546 | B2 | 6/2019 | Chendamarai Kannan |
| 10,341,884 | B2 | 7/2019 | Sun |
| 10,349,313 | B2 | 7/2019 | Chen et al. |
| 10,349,404 | B2 | 7/2019 | Chendamarai Kannan |
| 10,356,626 | B2 | 7/2019 | Montojo |
| 10,356,816 | B2 | 7/2019 | Valliappan |
| 10,362,574 | B2 | 7/2019 | Chendamarai Kannan |
| 10,362,612 | B2 | 7/2019 | Valicherla et al. |
| 10,368,301 | B2 | 7/2019 | Chendamarai Kannan |
| 10,368,305 | B2 | 7/2019 | Radulescu |
| 10,368,348 | B2 | 7/2019 | Chendamarai Kannan |
| 10,368,372 | B2 | 7/2019 | Chendamarai Kannan |
| 10,374,777 | B2 | 8/2019 | Kadous |
| 10,375,711 | B2 | 8/2019 | Sadek |
| 10,389,479 | B2 | 8/2019 | Yoo |
| 10,397,754 | B2 | 8/2019 | Vajapeyam |
| 10,397,796 | B2 | 8/2019 | Sun |
| 10,404,434 | B2 | 9/2019 | Kannan |
| 10,404,509 | B2 | 9/2019 | Sun |
| 10,405,228 | B2 | 9/2019 | Liu |
| 10,405,242 | B2 | 9/2019 | Kadous |
| 10,405,262 | B2 | 9/2019 | Chendamarai Kannan |
| 10,405,335 | B2 | 9/2019 | Barghi |
| 10,411,795 | B2 | 9/2019 | Liu |
| 10,412,704 | B2 | 9/2019 | Sun |
| 10,425,826 | B2 | 9/2019 | Fakoorian |
| 10,425,945 | B2 | 9/2019 | Sun |
| 10,433,179 | B2 | 10/2019 | Zhang |
| 10,448,296 | B2 | 10/2019 | Radulescu |
| 10,448,410 | B2 | 10/2019 | Chen et al. |
| 10,454,569 | B2 | 10/2019 | Wu |
| 10,455,455 | B2 | 10/2019 | Yoo |
| 10,455,457 | B2 | 10/2019 | Sadek |
| 10,461,797 | B2 | 10/2019 | Liu |
| 10,462,676 | B2 | 10/2019 | Mallik |
| 10,470,048 | B2 | 11/2019 | Zhang |
| 10,470,112 | B2 | 11/2019 | Damnjanovic |
| 10,476,627 | B2 | 11/2019 | Bhushan |
| 10,476,781 | B2 | 11/2019 | Luo |
| 10,477,437 | B2 | 11/2019 | Zhang |
| 10,477,526 | B2 | 11/2019 | Chendamarai Kannan |
| 10,484,135 | B2 | 11/2019 | Mallik |
| 10,484,212 | B2 | 11/2019 | Yoo |
| 10,484,878 | B2 | 11/2019 | Patel |
| 10,484,934 | B2 | 11/2019 | Malik |
| 10,484,935 | B2 | 11/2019 | Li |
| 10,484,954 | B2 | 11/2019 | Liu |
| 10,484,959 | B2 | 11/2019 | Liu |
| 10,484,992 | B2 | 11/2019 | Sadek |
| 10,485,027 | B2 | 11/2019 | Mallik |
| 10,492,220 | B2 | 11/2019 | Sun |
| 10,499,394 | B2 | 12/2019 | Damnjanovic |
| 10,506,629 | B2 | 12/2019 | Sun et al. |
| 10,511,399 | B2 | 12/2019 | Sun et al. |
| 10,511,987 | B2 | 12/2019 | Liu et al. |
| 10,516,618 | B2 | 12/2019 | Barghi et al. |
| 10,523,300 | B2 | 12/2019 | Malik et al. |
| 10,524,279 | B2 | 12/2019 | Yoo |
| 10,536,195 | B2 | 1/2020 | Sun |
| 10,536,944 | B2 | 1/2020 | Zhang |
| 10,536,966 | B2 | 1/2020 | Liu et al. |
| 10,541,851 | B2 | 1/2020 | Malik et al. |
| 10,542,436 | B2 | 1/2020 | Liu et al. |
| 10,542,541 | B2 | 1/2020 | Valliappan et al. |
| 10,542,543 | B2 | 1/2020 | Yerramalli et al. |
| 10,542,556 | B2 | 1/2020 | Mallik |
| 10,547,422 | B2 | 1/2020 | Yoo et al. |
| 10,547,494 | B2 | 1/2020 | Liu et al. |
| 10,548,020 | B2 | 1/2020 | Khoshnevisan et al. |
| 10,548,131 | B2 | 1/2020 | Yerramalli et al. |
| 10,548,153 | B2 | 1/2020 | Akkarakaran et al. |
| 10,554,539 | B2 | 2/2020 | Luo |
| 10,554,540 | B2 | 2/2020 | Luo |
| 10,555,203 | B2 | 2/2020 | Malik |
| 10,555,220 | B2 | 2/2020 | Yerramalli |
| 10,560,304 | B2 | 2/2020 | Lei |
| 10,574,422 | B2 | 2/2020 | Wang |
| 10,574,565 | B2 | 2/2020 | Luo |
| 10,575,185 | B2 | 2/2020 | Li |
| 10,575,229 | B2 | 2/2020 | Wu |
| 10,581,568 | B2 | 3/2020 | Mallik |
| 10,581,572 | B2 | 3/2020 | Chendamarai Kannan |
| 10,581,722 | B2 | 3/2020 | Luo |
| 10,582,458 | B2 | 3/2020 | Sadek |
| 10,587,497 | B2 | 3/2020 | Luo |
| 10,595,327 | B2 | 3/2020 | Sadek |
| 10,595,342 | B2 | 3/2020 | Islam |
| 10,602,543 | B2 | 3/2020 | Sun |
| 10,602,545 | B2 | 3/2020 | Mallik |
| 10,609,660 | B2 | 3/2020 | Liu |
| 10,609,664 | B2 | 3/2020 | Zhang |
| 10,616,737 | B2 | 4/2020 | Liu |
| 10,616,771 | B2 | 4/2020 | Montojo |
| 10,616,912 | B2 | 4/2020 | Chendamarai Kannan |
| 10,623,163 | B2 | 4/2020 | Sun |
| 10,638,326 | B2 | 4/2020 | Singh et al. |
| 10,743,357 | B2 | 8/2020 | Valicherla et al. |
| 11,070,467 | B1 | 7/2021 | Shukla |
| 12,068,953 | B2 | 8/2024 | Kadous et al. |
| 12,088,499 | B2 | 9/2024 | Kadous et al. |
| 12,442,291 | B1 * | 10/2025 | Wang ..................... E21B 44/06 |
| 2004/0110525 | A1 | 6/2004 | Black |
| 2004/0121730 | A1 | 6/2004 | Kadous |
| 2006/0119356 | A1 | 6/2006 | Rabe et al. |
| 2006/0203794 | A1 | 9/2006 | Sampath |
| 2007/0041457 | A1 | 2/2007 | Kadous |
| 2007/0066232 | A1 | 3/2007 | Black |
| 2007/0071147 | A1 | 3/2007 | Sampath |
| 2007/0165738 | A1 | 7/2007 | Barriac |
| 2007/0230357 | A1 | 10/2007 | Lin et al. |
| 2008/0025241 | A1 | 1/2008 | Bhushan |
| 2008/0032740 | A1 | 2/2008 | Joshi |
| 2008/0112495 | A1 | 5/2008 | Gore |
| 2009/0016250 | A1 | 1/2009 | Li et al. |
| 2009/0080499 | A1 | 3/2009 | Yavuz |
| 2009/0116420 | A1 | 5/2009 | Jeong et al. |
| 2009/0135754 | A1 | 5/2009 | Yavuz |
| 2009/0154372 | A1 | 6/2009 | Wang et al. |
| 2009/0163209 | A1 | 6/2009 | Black |
| 2009/0268731 | A1 | 10/2009 | Narayanan et al. |
| 2009/0279470 | A1 | 11/2009 | Seok |
| 2010/0003931 | A1 | 1/2010 | Krishnan |
| 2010/0046497 | A1 | 2/2010 | Jalali |
| 2010/0067422 | A1 | 3/2010 | Kadous |
| 2010/0153488 | A1 | 6/2010 | Mittal |
| 2010/0215022 | A1 | 8/2010 | Black |
| 2011/0007680 | A1 | 1/2011 | Kadous |
| 2011/0007688 | A1 | 1/2011 | Veeravalli |
| 2011/0202610 | A1 | 8/2011 | Chaturvedi et al. |
| 2011/0222423 | A1 | 9/2011 | Spindola |
| 2011/0235515 | A1 | 9/2011 | Dreyfus |
| 2011/0256834 | A1 | 10/2011 | Dayal |
| 2011/0310858 | A1 | 12/2011 | Tokgoz |
| 2012/0026940 | A1 | 2/2012 | Barbieri |
| 2012/0077532 | A1 | 3/2012 | Kadous |
| 2012/0113906 | A1 | 5/2012 | Kadous |
| 2012/0127870 | A1 | 5/2012 | Zhao |
| 2012/0127923 | A1 | 5/2012 | Zhao |
| 2012/0140798 | A1 | 6/2012 | Kadous |
| 2012/0182935 | A1 | 7/2012 | Addepalli et al. |
| 2012/0201158 | A1 | 8/2012 | Geirhofer |
| 2012/0213303 | A1 | 8/2012 | Kadous |
| 2012/0314633 | A1 * | 12/2012 | Morioka ........... H04W 74/0816 |
| | | | 370/310 |
| 2012/0314655 | A1 | 12/2012 | Xue |
| 2013/0058276 | A1 | 3/2013 | Somasundaram |
| 2013/0194948 | A1 | 8/2013 | Mallik |
| 2013/0229935 | A1 | 9/2013 | Gorokhov |

(56) References Cited

U.S. PATENT DOCUMENTS

| | | | |
|---|---|---|---|
| 2013/0294275 A1 | 11/2013 | Gorokhov |
| 2013/0294461 A1 | 11/2013 | Zhou et al. |
| 2013/0301553 A1 | 11/2013 | Klein |
| 2013/0301611 A1 | 11/2013 | Baghel et al. |
| 2013/0336193 A1 | 12/2013 | Luo |
| 2013/0336249 A1 | 12/2013 | Zhao |
| 2014/0023001 A1 | 1/2014 | Huang |
| 2014/0029456 A1 | 1/2014 | Mallik |
| 2014/0029705 A1 | 1/2014 | Wu |
| 2014/0038645 A1 | 2/2014 | Wu |
| 2014/0071894 A1 | 3/2014 | Kairouz |
| 2014/0079155 A1 | 3/2014 | Wang |
| 2014/0126580 A1 | 5/2014 | Sampath et al. |
| 2014/0204857 A1 | 7/2014 | Mallik |
| 2014/0219117 A1 | 8/2014 | Meshkati |
| 2014/0219243 A1 | 8/2014 | Meshkati |
| 2014/0269616 A1 | 9/2014 | Black |
| 2014/0273884 A1 | 9/2014 | Mantravadi |
| 2014/0301309 A1 | 10/2014 | Luo |
| 2014/0334564 A1 | 11/2014 | Singh et al. |
| 2015/0063150 A1 | 3/2015 | Sadek |
| 2015/0063151 A1 | 3/2015 | Sadek |
| 2015/0063323 A1 | 3/2015 | Sadek |
| 2015/0070323 A1 | 3/2015 | Hong |
| 2015/0071171 A1 | 3/2015 | Akiyoshi |
| 2015/0085686 A1 | 3/2015 | Chande |
| 2015/0139015 A1 | 5/2015 | Kadous |
| 2015/0163823 A1 | 6/2015 | Sadek |
| 2015/0180622 A1 | 6/2015 | Yoo |
| 2015/0282077 A1 | 10/2015 | Yavuz |
| 2015/0319702 A1 | 11/2015 | Patel |
| 2015/0350919 A1 | 12/2015 | Patel |
| 2016/0014714 A1 | 1/2016 | Patil et al. |
| 2016/0088625 A1 | 3/2016 | Kadous |
| 2016/0095039 A1 | 3/2016 | Valliappan |
| 2016/0095040 A1 | 3/2016 | Valliappan |
| 2016/0112168 A1 | 4/2016 | Yoo |
| 2016/0128130 A1 | 5/2016 | Sadek |
| 2016/0156392 A1 | 6/2016 | Jung et al. |
| 2016/0212678 A1 | 7/2016 | Akiyoshi |
| 2016/0234820 A1 | 8/2016 | Mallik |
| 2016/0248542 A1 | 8/2016 | Liu et al. |
| 2016/0248555 A1 | 8/2016 | Lei et al. |
| 2016/0269355 A1 | 9/2016 | Lee et al. |
| 2016/0277929 A1 | 9/2016 | Liu |
| 2016/0277961 A1 | 9/2016 | Hedman et al. |
| 2016/0344766 A1 | 11/2016 | Lawlis |
| 2016/0353482 A1 | 12/2016 | Valliappan |
| 2016/0365952 A1* | 12/2016 | Kim ..................... H04L 1/1816 |
| 2016/0381673 A1 | 12/2016 | Sun |
| 2017/0005741 A1 | 1/2017 | Wu |
| 2017/0019814 A1 | 1/2017 | Determan |
| 2017/0026976 A1 | 1/2017 | Yoo |
| 2017/0027017 A1 | 1/2017 | Black |
| 2017/0034847 A1 | 2/2017 | He et al. |
| 2017/0041766 A1 | 2/2017 | Vajapeyam |
| 2017/0142705 A1 | 5/2017 | Chendamarai Kannan |
| 2017/0163433 A1 | 6/2017 | Luo |
| 2017/0180025 A1 | 6/2017 | Cariou |
| 2017/0222771 A1 | 8/2017 | Chendamarai Kannan |
| 2017/0223739 A1 | 8/2017 | Mallik |
| 2017/0273080 A1 | 9/2017 | Jo et al. |
| 2017/0311346 A1 | 10/2017 | Chendamarai Kannan |
| 2017/0332288 A1 | 11/2017 | Sadek |
| 2017/0332338 A1 | 11/2017 | Mallik |
| 2018/0027552 A1* | 1/2018 | Jeong ................... H04W 72/04 370/336 |
| 2018/0032516 A1 | 2/2018 | Mallik |
| 2018/0035463 A1 | 2/2018 | Mallik |
| 2018/0042018 A1 | 2/2018 | Bhushan |
| 2018/0054348 A1 | 2/2018 | Luo |
| 2018/0054780 A1 | 2/2018 | Radulescu |
| 2018/0054848 A1 | 2/2018 | Yoo |
| 2018/0062801 A1 | 3/2018 | Zhang |
| 2018/0070242 A1 | 3/2018 | Damnjanovic |
| 2018/0077725 A1 | 3/2018 | Sun |
| 2018/0109957 A1 | 4/2018 | Fan |
| 2018/0110056 A1 | 4/2018 | Zhang |
| 2018/0115973 A1 | 4/2018 | Black |
| 2018/0124777 A1 | 5/2018 | Yerramalli |
| 2018/0124789 A1 | 5/2018 | Yerramalli |
| 2018/0131499 A1 | 5/2018 | Zhang |
| 2018/0139618 A1 | 5/2018 | Yerramalli |
| 2018/0139782 A1 | 5/2018 | Sadek |
| 2018/0145919 A1 | 5/2018 | Kalikot Veetil et al. |
| 2018/0159649 A1 | 6/2018 | Sun et al. |
| 2018/0160328 A1 | 6/2018 | Chendamarai Kannan |
| 2018/0160389 A1 | 6/2018 | Yerramalli |
| 2018/0167848 A1 | 6/2018 | Lei |
| 2018/0167941 A1 | 6/2018 | Zhang |
| 2018/0176946 A1 | 6/2018 | Sun |
| 2018/0213486 A1 | 7/2018 | Yoo |
| 2018/0220428 A1 | 8/2018 | Sun |
| 2018/0227011 A1 | 8/2018 | Yerramalli |
| 2018/0227771 A1 | 8/2018 | Malik |
| 2018/0227797 A1 | 8/2018 | Liu |
| 2018/0227936 A1 | 8/2018 | Yerramalli |
| 2018/0227944 A1 | 8/2018 | Yerramalli |
| 2018/0234163 A1 | 8/2018 | Yasukawa et al. |
| 2018/0234830 A1 | 8/2018 | Wang |
| 2018/0241494 A1 | 8/2018 | Chendamarai Kannan |
| 2018/0242348 A1 | 8/2018 | Chendamarai Kannan |
| 2018/0249496 A1 | 8/2018 | Radulescu |
| 2018/0249503 A1 | 8/2018 | Kim et al. |
| 2018/0255584 A1 | 9/2018 | Sun |
| 2018/0278624 A1 | 9/2018 | Kuperman et al. |
| 2018/0279134 A1 | 9/2018 | Malik |
| 2018/0279171 A1* | 9/2018 | Matsuo ................ H04L 5/0007 |
| 2018/0279292 A1 | 9/2018 | Luo |
| 2018/0287840 A1 | 10/2018 | Akkarakaran |
| 2018/0287870 A1 | 10/2018 | Yerramalli |
| 2018/0288747 A1 | 10/2018 | Sun |
| 2018/0288749 A1 | 10/2018 | Sun |
| 2018/0302186 A1 | 10/2018 | Reddy |
| 2018/0310341 A1 | 10/2018 | Yerramalli |
| 2018/0324713 A1 | 11/2018 | Yoo |
| 2018/0338265 A1 | 11/2018 | Goel et al. |
| 2018/0343676 A1 | 11/2018 | Yerramalli |
| 2018/0352520 A1 | 12/2018 | Zhang |
| 2018/0352563 A1 | 12/2018 | Liu |
| 2018/0367362 A1 | 12/2018 | Sun |
| 2018/0368089 A1 | 12/2018 | Yerramalli |
| 2018/0376392 A1 | 12/2018 | Wu |
| 2019/0007946 A1 | 1/2019 | Yerramalli |
| 2019/0014481 A1 | 1/2019 | Yerramalli |
| 2019/0014507 A1 | 1/2019 | Zhang |
| 2019/0014589 A1 | 1/2019 | Yerramalli |
| 2019/0020424 A1 | 1/2019 | Yerramalli |
| 2019/0020461 A1 | 1/2019 | Yerramalli |
| 2019/0020522 A1 | 1/2019 | Sun |
| 2019/0020528 A1 | 1/2019 | Lei |
| 2019/0020529 A1 | 1/2019 | Lei |
| 2019/0021080 A1 | 1/2019 | Lei |
| 2019/0028999 A1 | 1/2019 | Yerramalli |
| 2019/0029019 A1 | 1/2019 | Zhang |
| 2019/0037427 A1 | 1/2019 | Yerramalli |
| 2019/0037481 A1 | 1/2019 | Zhang |
| 2019/0037482 A1 | 1/2019 | Damnjanovic |
| 2019/0037603 A1 | 1/2019 | Damnjanovic |
| 2019/0045509 A1 | 2/2019 | Mallik |
| 2019/0052327 A1 | 2/2019 | Motozuka et al. |
| 2019/0053269 A1 | 2/2019 | Lei |
| 2019/0059001 A1 | 2/2019 | Yerramalli |
| 2019/0059102 A1 | 2/2019 | Yerramalli |
| 2019/0069325 A1 | 2/2019 | Yerramalli |
| 2019/0075591 A1 | 3/2019 | Sun |
| 2019/0075597 A1 | 3/2019 | Yerramalli |
| 2019/0081768 A1 | 3/2019 | Zhang |
| 2019/0082333 A1 | 3/2019 | Malik |
| 2019/0090178 A1 | 3/2019 | Liu |
| 2019/0090256 A1 | 3/2019 | Liu |
| 2019/0090273 A1 | 3/2019 | Yoo |
| 2019/0098656 A1 | 3/2019 | Chendamarai Kannan |
| 2019/0098663 A1 | 3/2019 | Zhang |

(56) References Cited

U.S. PATENT DOCUMENTS

| | | |
|---|---|---|
| 2019/0104416 A1 | 4/2019 | Yerramalli |
| 2019/0104514 A1 | 4/2019 | Chendamarai Kannan |
| 2019/0104542 A1 | 4/2019 | Chendamarai Kannan |
| 2019/0104546 A1 | 4/2019 | Chendamarai Kannan |
| 2019/0104547 A1 | 4/2019 | Xue |
| 2019/0110208 A1 | 4/2019 | Xue |
| 2019/0110254 A1 | 4/2019 | Yerramalli |
| 2019/0110302 A1 | 4/2019 | Zhang |
| 2019/0110317 A1 | 4/2019 | Zhang |
| 2019/0116585 A1 | 4/2019 | Chakraborty |
| 2019/0116599 A1 | 4/2019 | Xue |
| 2019/0124518 A1 | 4/2019 | Zhang |
| 2019/0124595 A1 | 4/2019 | Lei |
| 2019/0124613 A1 | 4/2019 | Liu |
| 2019/0124663 A1 | 4/2019 | Liu |
| 2019/0124694 A1 | 4/2019 | Chendamarai Kannan |
| 2019/0132817 A1 | 5/2019 | Liu |
| 2019/0141707 A1 | 5/2019 | Yerramalli |
| 2019/0141723 A1 | 5/2019 | Zhang |
| 2019/0141734 A1 | 5/2019 | Lei |
| 2019/0141744 A1 | 5/2019 | Naghshvar |
| 2019/0141783 A1 | 5/2019 | Malik |
| 2019/0149190 A1 | 5/2019 | Liu |
| 2019/0150088 A1 | 5/2019 | Sun |
| 2019/0150198 A1 | 5/2019 | Sun |
| 2019/0158333 A1 | 5/2019 | Zhang |
| 2019/0159280 A1 | 5/2019 | Chakraborty |
| 2019/0166621 A1 | 5/2019 | Yerramalli |
| 2019/0173521 A1 | 6/2019 | Liu |
| 2019/0173611 A1 | 6/2019 | Liu |
| 2019/0174532 A1 | 6/2019 | Damnjanovic |
| 2019/0174542 A1 | 6/2019 | Lei |
| 2019/0181995 A1 | 6/2019 | Liu |
| 2019/0182826 A1 | 6/2019 | Yerramalli |
| 2019/0182845 A1 | 6/2019 | Xue |
| 2019/0190668 A1 | 6/2019 | Lei |
| 2019/0199786 A1 | 6/2019 | Mallik |
| 2019/0200385 A1 | 6/2019 | Xue |
| 2019/0223215 A1 | 7/2019 | Tian |
| 2019/0229788 A1 | 7/2019 | Zhang |
| 2019/0238177 A1 | 8/2019 | Liu |
| 2019/0238219 A1 | 8/2019 | Liu |
| 2019/0238284 A1 | 8/2019 | Liu |
| 2019/0239202 A1 | 8/2019 | Bhattad |
| 2019/0246410 A1 | 8/2019 | Zhang |
| 2019/0246425 A1 | 8/2019 | Zhang |
| 2019/0253219 A1 | 8/2019 | Fan |
| 2019/0261354 A1 | 8/2019 | Fakoorian |
| 2019/0268907 A1 | 8/2019 | Bhattad |
| 2019/0268933 A1 | 8/2019 | Sun |
| 2019/0274162 A1 | 9/2019 | Zhang |
| 2019/0280836 A1 | 9/2019 | Bhattad |
| 2019/0288761 A1 | 9/2019 | Mallik |
| 2019/0305834 A1 | 10/2019 | Fakoorian |
| 2019/0305882 A1 | 10/2019 | Wang |
| 2019/0306878 A1 | 10/2019 | Zhang |
| 2019/0306881 A1 | 10/2019 | Fakoorian |
| 2019/0312671 A1 | 10/2019 | Lin |
| 2019/0312763 A1 | 10/2019 | Lei |
| 2019/0313260 A1 | 10/2019 | Zhang |
| 2019/0313419 A1 | 10/2019 | Fakoorian |
| 2019/0319767 A1 | 10/2019 | Sun |
| 2019/0320420 A1 | 10/2019 | Zhang |
| 2019/0320424 A1 | 10/2019 | Yerramalli |
| 2019/0320452 A1 | 10/2019 | Zhang |
| 2019/0327047 A1 | 10/2019 | Liu |
| 2019/0334577 A1 | 10/2019 | Damnjanovic |
| 2019/0334666 A1 | 10/2019 | Damnjanovic |
| 2019/0335337 A1 | 10/2019 | Damnjanovic |
| 2019/0335456 A1 | 10/2019 | Yerramalli |
| 2019/0335500 A1 | 10/2019 | Zhang |
| 2019/0335504 A1 | 10/2019 | Chakraborty |
| 2019/0342035 A1 | 11/2019 | Zhang |
| 2019/0342045 A1 | 11/2019 | Radulescu |
| 2019/0349926 A1 | 11/2019 | Alanen et al. |
| 2019/0349969 A1 | 11/2019 | Chakraborty |
| 2019/0349992 A1 | 11/2019 | Zhang |
| 2019/0349998 A1 | 11/2019 | Bhattad |
| 2019/0350025 A1 | 11/2019 | Eriksson et al. |
| 2019/0357252 A1 | 11/2019 | Sun et al. |
| 2019/0357255 A1 | 11/2019 | Sun et al. |
| 2019/0357256 A1* | 11/2019 | Kim ..................... H04W 48/16 |
| 2019/0363773 A1 | 11/2019 | Yerramalli et al. |
| 2019/0364408 A1* | 11/2019 | Park ..................... H04W 72/20 |
| 2019/0364468 A1 | 11/2019 | Yerramalli et al. |
| 2019/0364579 A1 | 11/2019 | Zhang et al. |
| 2019/0373571 A1 | 12/2019 | Damnjanovic et al. |
| 2019/0373640 A1 | 12/2019 | Sun et al. |
| 2019/0379561 A1 | 12/2019 | Zhang et al. |
| 2019/0380147 A1 | 12/2019 | Zhang et al. |
| 2019/0386737 A1 | 12/2019 | Liu et al. |
| 2019/0387532 A1 | 12/2019 | Liu et al. |
| 2019/0394790 A1 | 12/2019 | Damnjanovic et al. |
| 2020/0008107 A1 | 1/2020 | Zhang et al. |
| 2020/0008108 A1 | 1/2020 | Yoo |
| 2020/0008131 A1 | 1/2020 | Chakraborty et al. |
| 2020/0015268 A1 | 1/2020 | Zhang et al. |
| 2020/0021423 A1 | 1/2020 | Liu et al. |
| 2020/0022029 A1 | 1/2020 | Sadek et al. |
| 2020/0029221 A1 | 1/2020 | Xue et al. |
| 2020/0037336 A1 | 1/2020 | Sun et al. |
| 2020/0045556 A1 | 2/2020 | Xue |
| 2020/0045623 A1 | 2/2020 | Damnjanovic |
| 2020/0045744 A1 | 2/2020 | Sun |
| 2020/0052870 A1 | 2/2020 | Yerramalli |
| 2020/0053599 A1 | 2/2020 | Damnjanovic |
| 2020/0053739 A1 | 2/2020 | Xue |
| 2020/0059346 A1 | 2/2020 | Yoo |
| 2020/0059854 A1 | 2/2020 | Li et al. |
| 2020/0059979 A1 | 2/2020 | Abouelseoud |
| 2020/0067627 A1 | 2/2020 | Bhushan |
| 2020/0067639 A1 | 2/2020 | Lin |
| 2020/0067748 A1 | 2/2020 | Zhang |
| 2020/0068435 A1 | 2/2020 | Zhang |
| 2020/0068614 A1* | 2/2020 | Morioka ........... H04W 72/0446 |
| 2020/0077394 A1 | 3/2020 | Damnjanovic |
| 2020/0077439 A1 | 3/2020 | Sun |
| 2020/0084759 A1 | 3/2020 | Liu |
| 2020/0099436 A1 | 3/2020 | Malik |
| 2020/0100116 A1 | 3/2020 | Chakraborty |
| 2020/0100247 A1 | 3/2020 | Zhang |
| 2020/0100250 A1 | 3/2020 | Zhang |
| 2020/0107270 A1 | 4/2020 | Lou et al. |
| 2020/0107335 A1 | 4/2020 | Xue |
| 2020/0107360 A1 | 4/2020 | Xue |
| 2020/0107364 A1 | 4/2020 | Xue |
| 2020/0228997 A1 | 7/2020 | Chen et al. |
| 2020/0275425 A1 | 8/2020 | Cao et al. |
| 2020/0344684 A1 | 10/2020 | Rantala et al. |
| 2020/0367170 A1 | 11/2020 | Huang et al. |
| 2020/0383156 A1 | 12/2020 | Seok et al. |
| 2021/0076329 A1 | 3/2021 | Kasslin et al. |
| 2021/0167907 A1 | 6/2021 | Ding et al. |
| 2021/0243226 A1 | 8/2021 | El Gamal et al. |
| 2021/0321485 A1 | 10/2021 | Wu et al. |
| 2021/0352663 A1 | 11/2021 | Hedayat et al. |
| 2022/0021503 A1* | 1/2022 | Wilhelmsson ........ H04L 1/1854 |

OTHER PUBLICATIONS

International Preliminary Report on Patentability and Written Opinion for PCT/US2021/027268, dated Oct. 13, 2022, in 5 pages.

OPPO, "Discussion paper for 5GLAN architecture and communication", SA WG2 Meeting #130, Jan. 21-25, 2019, Kochi, India.

Partial European Search Report in European application No. 21788909.6, dated Mar. 19, 2024, in 7 pages.

Extended European Search Report in application No. EP 21788909.6, dated Jun. 11, 2024, in 11 pages.

Office Action in Taiwan application No. 110113645, dated Dec. 31, 2024, in 13 pages.

(56)        References Cited

OTHER PUBLICATIONS

Examination Report in Australian application No. 2021-256985,
dated Sep. 9, 2025, in 3 pages.

* cited by examiner

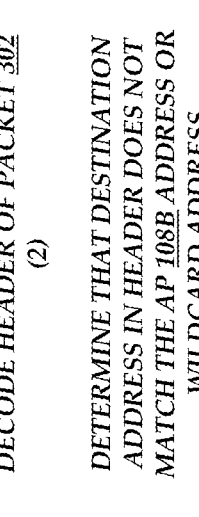
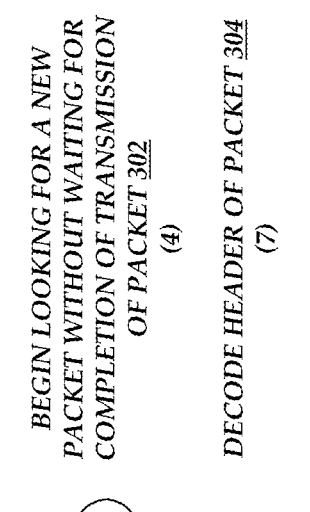
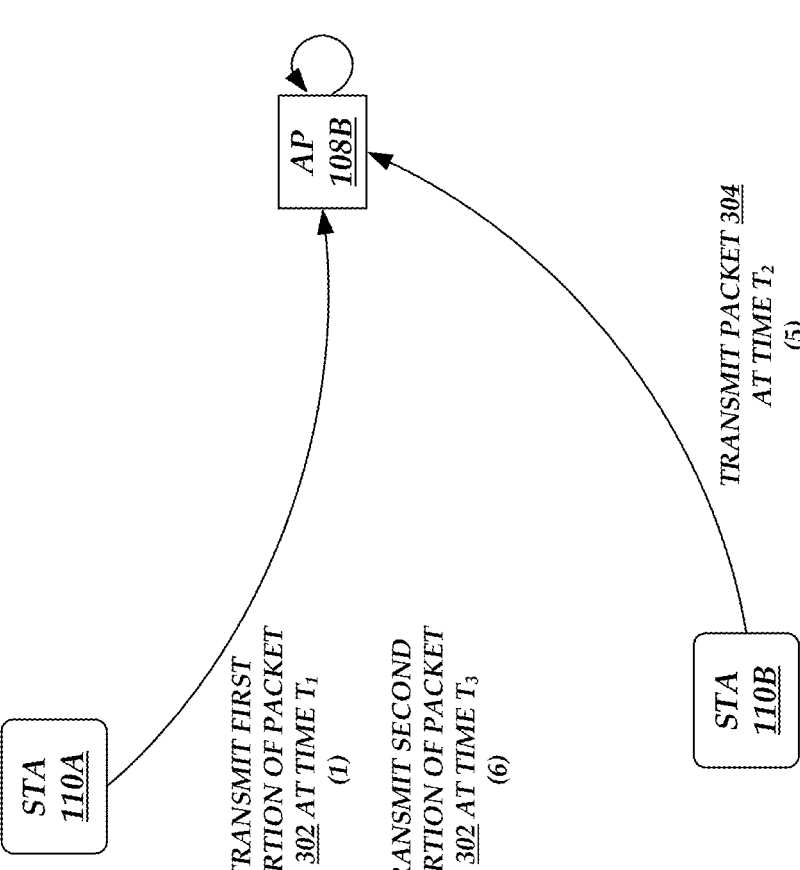

DECODE HEADER OF PACKET 302
(2)

DETERMINE THAT DESTINATION ADDRESS IN HEADER DOES NOT MATCH THE AP 108B ADDRESS OR WILDCARD ADDRESS
(3)

BEGIN LOOKING FOR A NEW PACKET WITHOUT WAITING FOR COMPLETION OF TRANSMISSION OF PACKET 302
(4)

DECODE HEADER OF PACKET 304
(7)

DETERMINE THAT DESTINATION ADDRESS IN HEADER MATCHES THE AP 108B ADDRESS OR WILDCARD ADDRESS
(8)

AP 108B

STA 110A

TRANSMIT FIRST PORTION OF PACKET 302 AT TIME T₁
(1)

TRANSMIT SECOND PORTION OF PACKET 302 AT TIME T₃
(6)

STA 110B

TRANSMIT PACKET 304 AT TIME T₂
(5)

DECODE HEADER OF A FIRST PACKET

704

DETERMINE THAT A DESTINATION ADDRESS
IN THE HEADER DOES NOT MATCH A DEVICE
ADDRESS

706

BEGIN TO LOOK FOR ANOTHER PACKET
BEFORE TRANSMISSION OF THE FIRST
PACKET IS COMPLETE

700

802

TRANSMIT PACKET TO A DEVICE

804

RECEIVE INFORMATION INDICATING THAT A
FALSE ALARM OCCURRED

806

DETERMINE A MINIMUM RX SENSITIVITY
LEVEL FOR THE DEVICE BASED AT LEAST IN
PART ON THE RECEIVED INFORMATION

808

TRANSMIT THE MINIMUM DETERMINED RX
SENSITIVITY LEVEL TO THE DEVICE

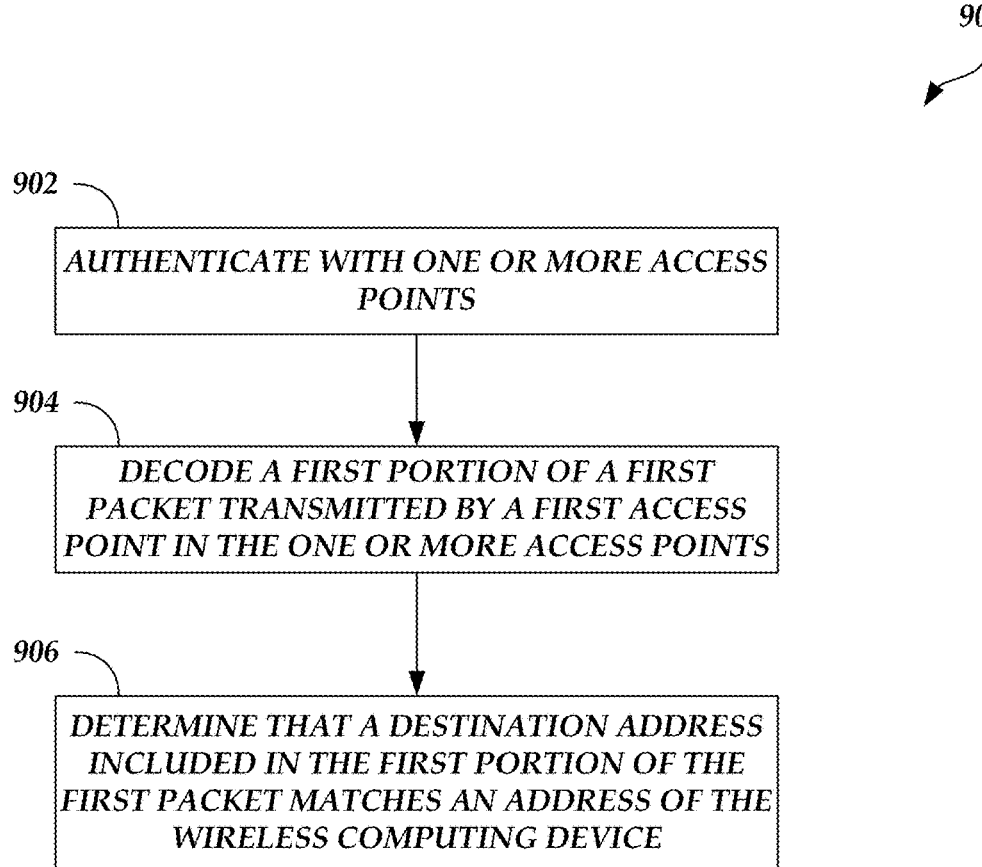

*900*

902

AUTHENTICATE WITH ONE OR MORE ACCESS POINTS

904

DECODE A FIRST PORTION OF A FIRST PACKET TRANSMITTED BY A FIRST ACCESS POINT IN THE ONE OR MORE ACCESS POINTS

906

DETERMINE THAT A DESTINATION ADDRESS INCLUDED IN THE FIRST PORTION OF THE FIRST PACKET MATCHES AN ADDRESS OF THE WIRELESS COMPUTING DEVICE

908

PROCESS THE FIRST PACKET IN RESPONSE TO THE DETERMINATION THAT THE DESTINATION ADDRESS INCLUDED IN THE FIRST PORTION OF THE FIRST PACKET MATCHES THE ADDRESS OF THE WIRELESS COMPUTING DEVICE, IRRESPECTIVE OF A SOURCE ADDRESS INCLUDED IN THE FIRST PORTION OF THE FIRST PACKET

*Fig. 9*

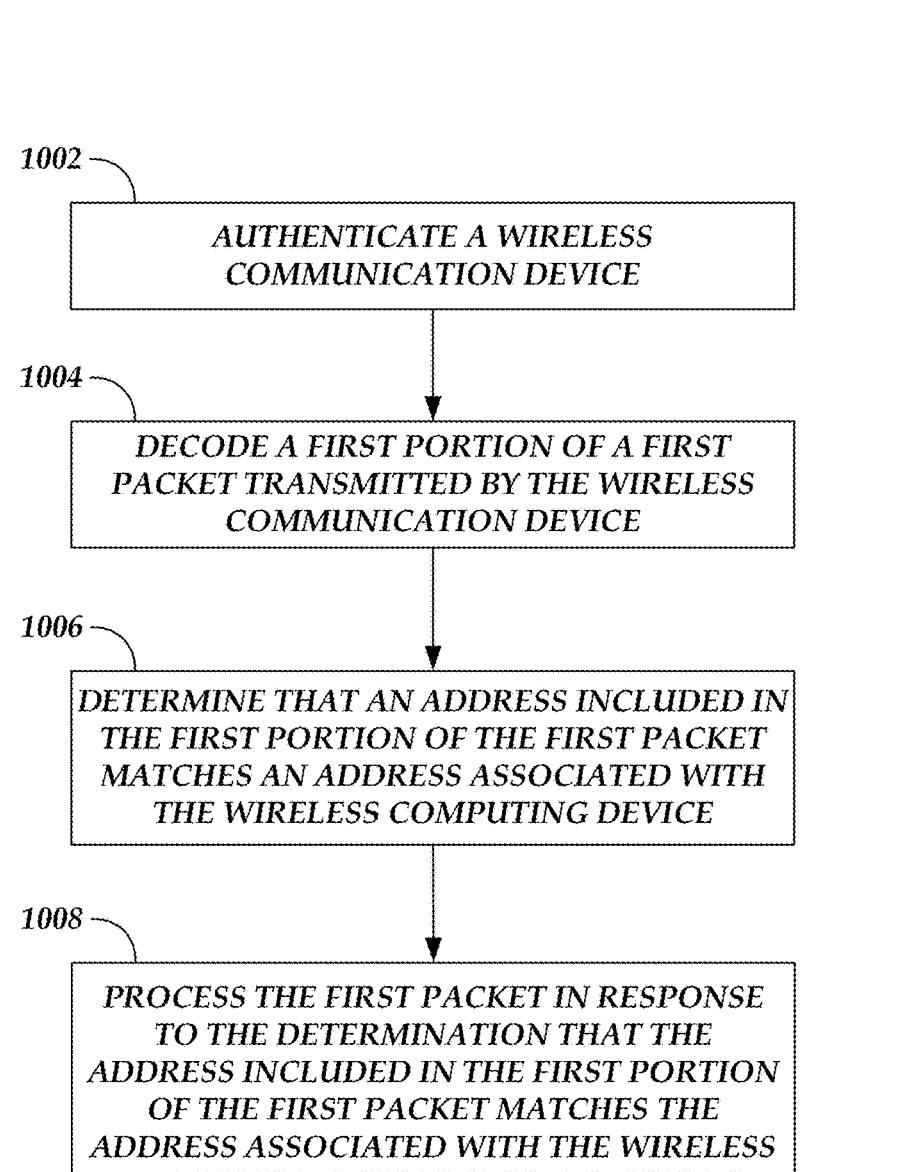

*1000*

1002

AUTHENTICATE A WIRELESS COMMUNICATION DEVICE

1004

DECODE A FIRST PORTION OF A FIRST PACKET TRANSMITTED BY THE WIRELESS COMMUNICATION DEVICE

1006

DETERMINE THAT AN ADDRESS INCLUDED IN THE FIRST PORTION OF THE FIRST PACKET MATCHES AN ADDRESS ASSOCIATED WITH THE WIRELESS COMPUTING DEVICE

1008

PROCESS THE FIRST PACKET IN RESPONSE TO THE DETERMINATION THAT THE ADDRESS INCLUDED IN THE FIRST PORTION OF THE FIRST PACKET MATCHES THE ADDRESS ASSOCIATED WITH THE WIRELESS COMPUTING DEVICE, IRRESPECTIVE OF WHETHER THE FIRST PACKET INCLUDES AN ADDRESS OF THE ACCESS POINT

*Fig. 10*

LATENCY-REDUCING WIRELESS NETWORK MULTIPOINT ASSOCIATION

CROSS-REFERENCE TO RELATED APPLICATIONS

This application is a continuation of U.S. patent application Ser. No. 17/230,783, entitled "SYSTEM AND METHOD FOR REDUCING DATA PACKET PROCESSING FALSE ALARMS" and filed on Apr. 14, 2021, which claims the benefit of priority to U.S. Patent Provisional Application No. 63/010,500, entitled "MULTIPOINT ASSOCIATION AND DIVERSITY" and filed on Apr. 15, 2020, which is hereby incorporated by reference herein in its entirety. Any and all applications for which a foreign or domestic priority claim is identified in the Application Data Sheet as filed with the present application, are hereby incorporated by reference under 37 CFR 1.57.

BACKGROUND

Technical Field

Embodiments of this disclosure relate to wireless communication systems, such as multiple-input multiple output wireless communication systems.

Description of Related Technology

The types of modern computing devices continues to increase along with the differing and dynamic needs of each device. The wireless communication systems providing services to such devices are facing increasing constraints on resources and demands for quality and quantities of service. Accordingly, improvements in providing wireless communication services, such as in a multiple-input multiple-output system, are desired.

SUMMARY

One aspect of the disclosure provides a wireless communication device comprising an antenna. The wireless communication device further comprises a processor in communication with the antenna, where the computer-executable instructions, when executed by the processor, cause the wireless communication device to: decode a first portion of a first packet transmitted by a second wireless communication device; determine that a destination address included in the first portion of the first packet does not match an address of the wireless communication device; and begin to search for a new packet transmitted by the second wireless communication device or a third wireless communication device before transmission of the first packet is complete.

The wireless communication device of the preceding paragraph can include any sub-combination of the following features: where the computer-executable instructions, when executed, further cause the wireless communication device to transmit to the second wireless communication device information identifying an occurrence of a false alarm; where the information identifying an occurrence of a false alarm comprises a received power level of the first packet; where the computer-executable instructions, when executed, further cause the wireless communication device to: process a minimum receive sensitivity level received from the second wireless communication device, and ignore any transmitted packets that have a received power level below the minimum receive sensitivity level; where the computer-executable instructions, when executed, further cause the wireless communication device to determine a minimum receive sensitivity level based on at least one of a received power level of the first packet or received power levels of one or more other packets detected by the wireless communication device that had a destination address that did not match the address of the wireless communication device; where the computer-executable instructions, when executed, further cause the wireless communication device to: transmit a second packet to the second wireless communication device, and determine that the second wireless communication device did not receive the second packet; where the computer-executable instructions, when executed, further cause the wireless communication device to determine a minimum receive sensitivity level for the second wireless communication device based at least on one of a transmission power level of the second packet or an estimate of a path loss between the wireless communication device and the second wireless communication device; where the minimum receive sensitivity level is at most a level below the transmission power level of the second packet; where an access point controller is configured to select a third wireless communication device to transmit the second packet to the second wireless communication device in response to a transmission of the second packet by the wireless communication device failing; where the third wireless communication device is located at a position spatially different than a position of the wireless communication device; where the wireless communication device and the third wireless communication device are both configured to transmit data to the second wireless communication device using a same wireless protocol stack; where the access point controller pre-caches the second packet at the third wireless communication device prior to a transmission of the second packet by the wireless communication device; where a third wireless communication device retransmits the second packet to the second wireless communication device after an initial transmission of the second packet by the wireless communication device fails; where the third wireless communication device causes a scheduler to receive a beam visibility report indicating that the third wireless communication device is transmitting data to the second wireless communication device instead of the wireless communication device, where the scheduler schedules a third packet intended for the second wireless communication device to be transmitted by the third wireless communication device instead of the wireless communication device in response to receipt of the beam visibility report; where the address of the wireless communication device comprises a wildcard address; where the first portion of the first packet comprises one of a header of the first packet or a preamble of the first packet; where the wireless communication device is one of a station or an access point; where the second wireless communication device is one of an access point or a station; and where the second wireless communication device transmits the first packet during an unassigned raster interval.

Another aspect of the disclosure provides a computer-implemented method comprising: decoding a first portion of a first packet transmitted by a second wireless communication device; determining that a destination address included in the first portion of the first packet does not match an address of the wireless communication device; and begin searching for a new packet transmitted by the second wireless communication device or a third wireless communication device before transmission of the first packet is complete.

The computer-implemented method of the preceding paragraph can include any sub-combination of the following features: where the computer-implemented method further comprises: transmitting to the second wireless communication device information identifying an occurrence of a false alarm, receiving a minimum receive sensitivity level from the second wireless communication device, and ignoring any transmitted packets that have a received power level below the minimum receive sensitivity level.

Another aspect of the disclosure provides a wireless computing device comprising an antenna. The wireless computing device further comprises a processor in communication with the antenna, where the computer-executable instructions, when executed by the processor, cause the wireless computing device to: authenticate with one or more access points; decode a first portion of a first packet transmitted by a first access point in the one or more access points; determine that a destination address included in the first portion of the first packet matches an address of the wireless computing device; and process the first packet in response to the determination that the destination address included in the first portion of the first packet matches the address of the wireless computing device, irrespective of a source address included in the first portion of the first packet.

The wireless computing device of the preceding paragraph can include any sub-combination of the following features: where the computer-executable instructions, when executed, further cause the wireless communication device to: decode a first portion of a second packet transmitted by the first access point, determine that a destination address included in the first portion of the second packet does not match an address of the wireless computing device, and begin to search for a new packet transmitted by any access point in the one or more access points before transmission of the second packet is complete; where the computer-executable instructions, when executed, further cause the wireless communication device to transmit to the first access point information identifying an occurrence of a false alarm; where the information identifying an occurrence of a false alarm comprises a received power level of the second packet; where the computer-executable instructions, when executed, further cause the wireless communication device to: process a minimum receive sensitivity level received from the first access point, and ignore any transmitted packets that have a received power level below the minimum receive sensitivity level; where the computer-executable instructions, when executed, further cause the wireless communication device to determine a minimum receive sensitivity level based on at least one of a received power level of the second packet or received power levels of one or more other packets detected by the wireless communication device that had a destination address that did not match the address of the wireless communication device; where the computer-executable instructions, when executed, further cause the wireless communication device to decode a first portion of a second packet transmitted by a second access point in the one or more access points, where the second access point transmits the second packet in response to a transmission of the second packet by the first access point failing; where the second access point is located at a position spatially different than a position of the first access point; where the first access point and the second access point are both configured to transmit data to the wireless communication device using a same wireless protocol stack; where the access point controller pre-caches the second packet at the second access point device prior to a transmission of the second packet by the first access point; where the second access point causes a scheduler to receive a beam visibility report indicating that the second access point is transmitting data to the wireless communication device instead of the first access point, where the scheduler schedules a third packet intended for the wireless communication device to be transmitted by the second access point instead of the first access point in response to receipt of the beam visibility report; where the first portion of the first packet comprises one of a header of the first packet or a preamble of the first packet; where the wireless communication device is a station; and where the first access point transmits the first packet during an unassigned raster interval.

Another aspect of the disclosure provides computer-implemented method comprising: authenticating, by a wireless computing device, with one or more access points; decoding a first portion of a first packet transmitted by a first access point in the one or more access points; determining that a destination address included in the first portion of the first packet matches an address of the wireless computing device; and processing the first packet in response to the determination that the destination address included in the first portion of the first packet matches the address of the wireless computing device, irrespective of a source address included in the first portion of the first packet.

The computer-implemented method of the preceding paragraph can include any sub-combination of the following features: where the computer-implemented method further comprises: decoding a first portion of a second packet transmitted by the first access point, determining that a destination address included in the first portion of the second packet does not match an address of the wireless computing device, and begin searching for a new packet transmitted by any access point in the one or more access points before transmission of the second packet is complete; where the computer-implemented method further comprises: transmitting to the first access point information identifying an occurrence of a false alarm, receiving a minimum receive sensitivity level from the first access point, and ignoring any transmitted packets that have a received power level below the minimum receive sensitivity level; where the computer-implemented method further comprises determining a minimum receive sensitivity level based on at least one of a received power level of the second packet or received power levels of one or more other packets detected by the wireless communication device that had a destination address that did not match the address of the wireless communication device; where the computer-implemented method further comprises decoding a first portion of a second packet transmitted by a second access point in the one or more access points, where the second access point transmits the second packet in response to a transmission of the second packet by the first access point failing; where the second access point is located at a position spatially different than a position of the first access point; and where the first access point and the second access point are both configured to transmit data to the wireless communication device using a same wireless protocol stack.

Another aspect of the disclosure provides an access point comprising an antenna. The access point further comprises a processor in communication with the antenna, where the computer-executable instructions, when executed by the processor, cause the access point to: authenticate a wireless communication device; decode a first portion of a first packet transmitted by the wireless communication device; determine that an address included in the first portion of the first packet matches an address associated with the wireless communication device; and process the first packet transmitted by the second wireless communication device in response to the determination that the address included in the first portion of the first packet matches the address associated with the wireless communication device, irrespective of whether the first packet includes an address of the access point.

The access point of the preceding paragraph can include any sub-combination of the following features: where the computer-executable instructions, when executed, further cause the access point to process the first packet transmitted by the wireless communication device in response to a determination that the wireless communication device is authenticated and the determination that the address included in the first portion of the first packet matches the address associated with the wireless communication device; where the address included in the first portion of the first packet is a source address in a header of the first packet; where the first portion of the first packet includes a wildcard address associated with the access point; where the address associated with the wireless communication device is an address of the wireless communication device; where the computer-executable instructions, when executed, further cause the access point to process the first packet transmitted by the wireless communication device in response to a determination that the address included in the first portion of the first packet is a source address that matches the address of the wireless communication device; where the computer-executable instructions, when executed, further cause the access point to process the first packet transmitted by the wireless communication device in response to a determination that the address included in the first portion of the first packet is a source address that matches an address of an authenticated wireless communication device; where the computer-executable instructions, when executed, further cause the access point to: transmit a second packet to the wireless communication device, and determine that the wireless communication device did not receive the second packet; where the computer-executable instructions, when executed, further cause the access point to determine a minimum receive sensitivity level for the wireless communication device based at least on one of a transmission power level of the second packet or an estimate of a path loss between the access point and the wireless communication device; where the minimum receive sensitivity level is at most a level below the transmission power level of the second packet; where an access point controller is configured to select a second access point to transmit the second packet to the wireless communication device in response to a transmission of the second packet by the access point failing; where the second access point is located at a position spatially different than a position of the access point; where the access point and the second access point are both configured to transmit data to the wireless communication device using a same wireless protocol stack; where the access point controller pre-caches the second packet at the second access point prior to a transmission of the second packet by the access point; where a second access point retransmits the second packet to the wireless communication device after an initial transmission of the second packet by the access point fails; where the second access point causes a scheduler to receive a beam visibility report indicating that the second access point is transmitting data to the wireless communication device instead of the access point, where the scheduler schedules a third packet intended for the wireless communication device to be transmitted by the second access point instead of the access point in response to receipt of the beam visibility report; where the first portion of the first packet comprises one of a header of the first packet or a preamble of the first packet; and where the wireless communication device is a station.

Another aspect of the disclosure provides computer-implemented method comprising: authenticating, by an access point, a wireless communication device; decoding a first portion of a first packet transmitted by the wireless communication device; determining that an address included in the first portion of the first packet matches an address associated with the wireless communication device; and processing the first packet transmitted by the second wireless communication device in response to the determination that the address included in the first portion of the first packet matches the address associated with the wireless communication device, irrespective of whether the first packet includes an address of the access point.

The computer-implemented method of the preceding paragraph can include any sub-combination of the following features: where processing the first packet further comprises processing the first packet transmitted by the wireless communication device in response to a determination that the wireless communication device is authenticated and the determination that the address included in the first portion of the first packet matches the address associated with the wireless communication device.

Another aspect of the disclosure provides a wireless communication system comprising a plurality of access points, where the access point transmission timelines are synchronized, and where each access point transmission start time aligns to a raster interval.

The wireless communication system of the preceding paragraph can include any sub-combination of the following features: where access point transmission start times are offset to a plurality of other access point start times; where access point offsets are assigned according to a re-use pattern; where access point transmission start times include at least one start time that is not an assigned offset; where the non-offset aligned start times are controlled probabilistically; where the offset re-use assignment is dynamically reconfigured in response to changes in the active access points; and where access point transmission times are adjusted to ensure that station acknowledgement or negative acknowledgement message lags the preamble, and that the station acknowledgement or negative acknowledgement message leads the raster start times.

BRIEF DESCRIPTION OF THE DRAWINGS

Embodiments of this disclosure will now be described, by way of non-limiting example, with reference to the accompanying drawings.

FIG. 3 is another block diagram of the multipoint environment of FIG. 1A illustrating the operations performed by the components of the multipoint environment to minimize the negative effects of false alarms according to an embodiment.

FIG. 9 is a flow diagram depicting a packet detection routine illustratively implemented by a STA, according to one embodiment.

FIG. 10 is a flow diagram depicting a packet detection routine illustratively implemented by an AP, according to one embodiment.

DETAILED DESCRIPTION OF CERTAIN EMBODIMENTS

Figure 1A:
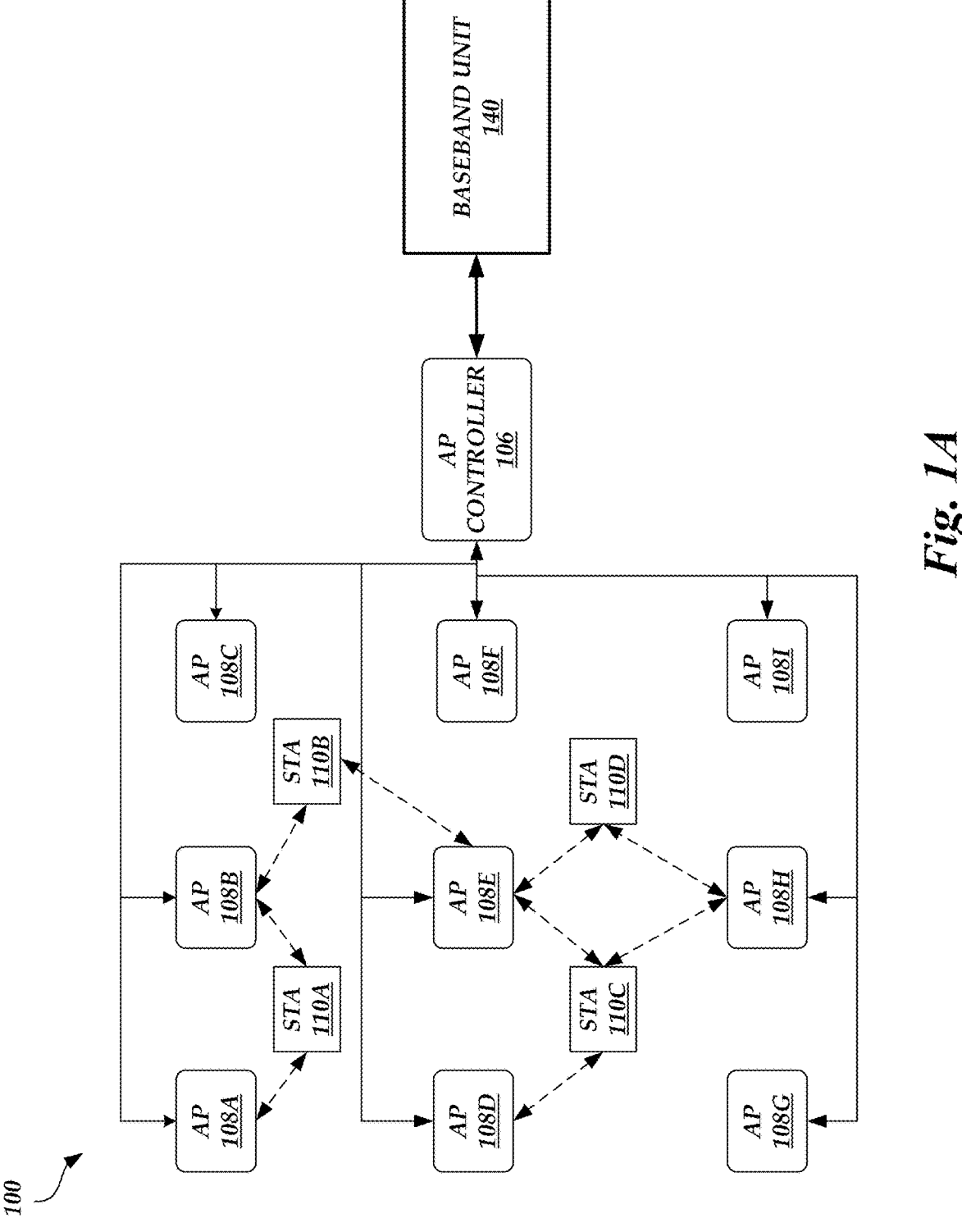
FIG. 1A is a diagram of a multipoint environment in which multiple stations and access points can communicate with each other according to an embodiment.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

As wireless networks are increasingly used to run services sensitive to reliability and/or latency issues (e.g., media streaming, video chat, virtual reality, augmented reality, etc.), any situations that negatively affect reliability and/or latency can be problematic. For example, a station (STA) typically decodes a packet and analyzes a destination address and source address included in the header of the packet to determine whether the packet is intended for the STA. Access points (APs) perform a similar operation. Decoding a packet and analyzing the destination address and the source address, however, can increase a time that it takes a STA or AP to process a received packet.

In fact, false alarms often occur in which a STA or AP locks onto a transmitted packet that is not intended for the STA or AP. For example, a STA or AP may detect that transmission of a packet is occurring and attempting to decode the packet. The STA or AP may eventually determine that the packet is not meant for the STA or AP (e.g., based on an analysis of the destination address and source address in the header of the packet). The STA or AP, however, typically remains locked onto the packet until transmission of the packet is complete, even after determining that the packet is not meant for the STA or AP (where the determination generally occurs before transmission of the packet is complete). In other words, if a typical STA or AP detects the transmission of a first packet, the STA or AP does not start searching for a new packet until transmission of the first packet is complete whether or not the first packet is actually intended for the STA or AP. If a packet that is actually intended for the STA or AP is transmitted or begins to be transmitted before transmission of a packet locked onto by and not intended for the STA or AP is complete, then the STA or AP may not receive or process the packet that is actually intended for the STA or AP. Thus, false alarms can increase the latency of the wireless network in situations in which a STA or AP locks onto a packet not intended for the STA or AP, and can reduce the reliability of the wireless network in situations in which the STA or AP misses a packet intended for the STA or AP because the STA or AP was locked onto another packet not intended for the STA or AP.

In addition, obstructions and/or interference can prevent a STA from receiving a transmission from an AP, and vice-versa. Typically, a STA or AP may retransmit a packet if an initial transmission fails (e.g., if the AP or STA for which the packet is intended does not receive the packet, as indicated by the failure of the AP or STA to send an acknowledgement message acknowledging receipt of the packet). However, if the initial transmission failed because of an obstruction (e.g., by an object, such as a wall, a human, furniture, etc.) and/or interference (e.g., from another transmitting device, such as an AP or STA), the obstruction and/or interference is likely to still be present when the STA or AP attempts the retransmission (e.g., given that retransmissions generally occur within 1 ms, 10 ms, 100 ms, etc. of the initial transmission). Thus, obstructions and/or interference can also reduce the reliability of the wireless network.

To increase the reliability and reduce the latency of the wireless network, described herein is a multipoint environment that enables a STA to communicate with multiple APs and an AP to communicate with multiple STAs in a single wireless protocol stack (e.g., a single IEEE 802.11 protocol stack). For example, a STA can authenticate simultaneously with multiple APs and decode any data packet that includes in a header a destination address that matches an address of the STA, irrespective of the source address included in the header of the data packet. Similarly, an AP can decode any data packet that includes in a header a destination address that matches an address of the AP or that matches a wildcard address associated with the AP, irrespective of the source address included in the header of the data packet.

Thus, unlike typical wireless network environments in which a basic service set (BSS) includes one AP assigned to one or more STAs, the multipoint environment described herein has no pre-defined AP to which a STA is associated. Rather, the AP transmitting a data packet to a particular STA can change on a packet-by-packet basis. For example, a first AP can transmit a first data packet to a STA at a first time, a second AP can transmit a second data packet to the STA at a second time, a third AP can transmit a third data packet to the STA at a third time, the first AP can transmit a fourth data packet to the STA at a fourth time, and so on. In fact, the AP that transmits a data packet to the STA can change without the STA changing BSSs to which the STA is associated—the STA may remain in the same BSS using the same, single wireless stack while the AP that transmits data packets to the STA changes. Similarly, there may be no pre-defined STA to which an AP is associated. Rather, the STA transmitting a data packet to a particular AP can change on a packet-by-packet basis.

The multipoint environment can further include an AP controller (also referred to herein as a central controller) that can select the AP to transmit a data packet to a STA. For example, the AP controller can route traffic to one or more APs for transmission to one or more STAs based on downlink and/or uplink quality measurements.

To minimize the negative effects of false alarms, the STAs and APs in the multipoint environment can each be configured to restart a data packet detection procedure after decoding the destination address in the header of a data packet and determining that the destination address does not match an address (or wildcard address) of the STA or AP, use a minimum receive (Rx) sensitivity level below which the STA or AP does not attempt to decode the header of a data packet, or both restart a data packet detection procedure after decoding the destination address in the header of a data packet and determining that the destination address does not match an address (or wildcard address) of the STA or AP and use the minimum Rx sensitivity level to determine whether to decode the header of a data packet. For example, instead of locking onto a data packet until transmission of the data packet is complete (e.g., transmission of the preamble, header, and/or data payload of the data packet is complete), a STA or AP can decode the header of a detected data packet to determine whether the destination address included in the header matches an address (or wildcard address) of the STA or AP. If the destination address does not produce a match (indicating that the data packet is not intended for the STA or AP), then the STA or AP can start searching for a new data packet without waiting for transmission of the initial data packet to finish. In particular, the STA or AP can start a physical (PHY) clear channel assessment (CCA) and short training field (STF) detection procedure to detect transmissions of data packets (e.g., to begin detecting the transmission of a preamble, header, and/or data payload of a data packet). Upon detecting the transmission of a preamble or header of a data packet using the PHY CCA and STF detection procedure, the STA or AP can decode the destination address included in the preamble or header. If the destination address does not match the address (or wildcard address) of the STA or AP, then the STA or AP can restart the PHY CCA and STF detection procedure to detect the transmission of another packet, even before transmission of the preamble, header, and/or data payload of the initial data packet is complete.

Alternatively or in addition, a STA can provide to an AP information identifying a false alarm when the STA attempts to decode a data packet only to find that the destination address of the data packet does not match the address of the STA. The AP can gather information for one or more false alarms identified by the STA, and use this information to determine a minimum Rx sensitivity level for the STA. For example, the AP can determine the mean, median, mode, etc. of the received power level of the data packets that the STA identified as resulting in a false alarm, and the AP can set the minimum Rx sensitivity level for the STA to be some level above the mean, median, mode, etc. of the received power level of the data packets that the STA identified as resulting in a false alarm. Alternatively or in addition, the AP can gather information for one or more missed detects (e.g., data packet transmissions intended for the STA that were not received by the STA) and use this information alone or with the false alarm information to determine a minimum Rx sensitivity level for the STA. For example, the AP can set the minimum Rx sensitivity level to be some level below the mean, median, mode, etc. of the transmission power level of the data packets intended for the STA that were not received by the STA (or the power level at which the data packets should have been received by the STA) minus the estimate of the path loss from the AP to the STA. The AP can then provide the determined minimum Rx sensitivity level to the STA so that the STA can begin using the minimum Rx sensitivity level to determine whether or not to begin decoding a preamble or header of a transmitted data packet. Similarly, an AP can use missed detect information obtained from a STA (e.g., information identifying data packets intended for the AP that were not received by the AP) and/or false alarm information determined by the AP (e.g., information associated with data packets decoded by the AP that were not intended for the AP) to determine a minimum Rx sensitivity level for itself in a similar manner. The AP can then use the determined minimum Rx sensitivity level to determine whether or not to begin decoding a preamble or header of a transmitted data packet.

By configuring a STA or AP to restart the data packet detection procedure soon after identifying that a destination address does not match an address (or wildcard address) of a STA or AP and/or to use a minimum Rx sensitivity level to determine whether or not to begin decoding a preamble or header of a transmitted data packet, the multipoint environment increases the reliability and reduces the latency of a wireless network. For example, reliability may be increased because an STA or AP is less likely to miss a data packet intended for the STA or AP given that the STA or AP is no longer waiting for transmission of a data packet to finish before searching for a new data packet. Latency of the wireless network may be reduced because a STA or AP may no longer decode all detected data packets. Rather, the STA or AP may only decode those data packets that have a received power level over a minimum Rx sensitivity level, which may cause the STA or AP to decode sooner those data packets actually intended for the STA or AP.

The AP controller may further increase reliability and reduce latency in the wireless network by implementing retransmission diversity. For example, transmission of a data packet from an AP to a STA or from a STA to an AP may fail due to an obstruction (e.g., by an object, such as a wall, a human, furniture, etc.) and/or interference (e.g., from another transmitting device, such as an AP or STA) being present. Generally, the data packet may be retransmitted in response to the initial transmission failure. Retransmitting the data packet from the same STA or AP is likely to result in another transmission failure, however, because retransmissions generally occur soon after the initial transmission (e.g., 1 ms after, 10 ms after, 100 ms after, etc.) and the obstruction and/or interference is still likely to be present given the short timeframe between transmissions. Thus, in the event of a data packet transmission failure, the AP controller can trigger a retransmission of the data packet from another STA or AP, such as from a STA or AP that has a different spatial location than the STA or AP that originally transmitted the data packet. Accordingly, the retransmission is less likely to be affected by the obstruction and/or interference, and the recipient STA or AP is then more likely to receive the retransmitted data packet.

In addition, the AP controller can pre-cache a data packet at one or more APs, even before the AP that is originally assigned to transmit the data packet transmits the data packet. For example, there may be a time delay involved in an AP controller transmitting a data packet to an AP so that the AP can transmit the data packet to a STA. Pre-caching the data packet at multiple APs before the data packet is transmitted by any AP (and therefore before a transmission failure occurs) may reduce the time it takes for a second AP to retransmit the data packet if the first transmission of the data packet fails. Thus, if the transmission by a first AP that is originally assigned to transmit the data packet fails, the AP controller can instruct a second AP at which the data packet has already been pre-cached to transmit the data packet. The time waiting for the second AP to receive the data packet from the AP controller is therefore eliminated. Thus, the time from when the AP controller determines that the second AP should retransmit the data packet to when the second AP retransmits the data packet is reduced, thereby reducing the latency involved with retransmitting the data packet.

In an embodiment, the multipoint environment described herein is designed to operate at higher frequencies, such as at millimeter wave (mmW) frequencies, such as between 24 GHz to 300 GHz. In general, mmW frequencies can encompass at least some frequency ranges between 2 GHz to 3 GHz, at least some frequency ranges in the Super high frequency (SHF) bands (e.g., 3 GHz to 30 GHz), and/or at least some frequency ranges in the Extremely High Frequency (EHF) bands (e.g., 30 GHz to 300 GHz). The techniques described herein can be applied to networks operating at any suitable range of frequencies. In addition, the techniques described herein can be used for a variety of use cases, such as media streaming, video chat, virtual reality, augmented reality, etc.

Multipoint Association and Diversity

FIG. 1A is a diagram of a multipoint environment 100 in which multiple STAs 110A-D and APs 108A-I can communicate with each other according to an embodiment. As illustrated in FIG. 1A, the multipoint environment 100 includes a plurality of APs 108A-I, a plurality of STAs 110A-D, an AP controller 106, and a baseband unit 140. In an embodiment, data packets can be wirelessly transmitted from the baseband unit 140 to the plurality of STAs 110A-D via one or more of the APs 108A-I. Similarly, data packets can be transmitted from the plurality of STAs 110A-D to one or more APs 108A-I.

As described herein, a STA 110A-D can communicate with multiple APs 108A-I and an AP 108A-I can communicate with multiple STAs 110A-D in a single wireless stack (e.g., a single IEEE 820.11 protocol stack). For example, a STA 110A-D can authenticate simultaneously with multiple APs 108A-I (e.g., one or more of the APs 108A-I can individual or collectively authenticate the STA 110A-D upon request from the STA 110A-D) and decode any data packet that includes in a header or preamble a destination address that matches an address of the STA 110A-D, irrespective of the source address included in the header or preamble of the data packet (e.g., the STA 110A-D can decode any data packet that includes in a header or preamble a destination address that matches an address of the STA 110A-D whether or not the source address is the address of a particular AP 108A-I). Similarly, an AP 108A-I can decode any data packet that includes in a header or preamble a destination address that matches an address of the AP 108A-I or that matches a wildcard address associated with the AP 108A-I, irrespective of the source address included in the header of the data packet (e.g., the AP 108A-I can decode any data packet that includes in a header or preamble a destination address that matches an address of the AP 108A-I or that matches a wildcard address associated with the AP 108A-I whether or not the source address is the address of a particular STA 110A-D). For example, a wildcard address may be an address associated with multiple APs 108A-I rather than a unique address associated with just one AP 108A-I. As one illustrative example, the address associated with multiple APs 108A-I could be one or more addresses of one or more STAs 110A-D that has authenticated with some or all of the APs 108A-I. Thus, the wildcard address can be one or more addresses of one or more authenticated STAs 110A-D. As another example, an AP 108A-I can decode any data packet that includes in a header or preamble a source address that matches an address of one of a set of STAs 110A-D, such as an address of a STA 110A-D that has already authenticated with the AP 108A-I or another AP 108A-I that is part of the same wireless protocol stack as the AP 108A-I, irrespective of whether the destination address in the header or preamble matches an address of the AP 108A-I (e.g., the AP 108A-I can decode any data packet that includes in a header or preamble a source address that matches an address of one of a set of STAs 110A-D that has already authenticated with the AP 108A-I or another AP 108A-I that is part of the same wireless protocol stack whether or not the destination address is the address of the AP 108A-I itself).

For the purposes of illustration and not meant to be limiting, STA 110A communicates with APs 108A and 108B, STA 110B communicates with APs 108B and 108E, STA 110C communicates with APs 108D, 108E, and 108H, and STA 110D communicates with APs 108E and 108H. The STAs 110A-D and APs 108A-I, however, can communicate with other APs 108A-I and STAs 110A-D. Thus, unlike typical wireless network environments in which a BSS includes one AP assigned to one or more STAs, the multipoint environment 100 has no pre-defined AP 108A-I to which a STA 110A-D is associated. Rather, the AP 108A-I transmitting a data packet to a particular STA 110A-D can change on a packet-by-packet basis. For example, the AP 108D can transmit a first data packet to the STA 110C at a first time, the AP 108E can transmit a second data packet to the STA 110C at a second time, the AP 108H can transmit a third data packet to the STA 110C at a third time, the AP 108D can transmit a fourth data packet to the STA 110C at a fourth time, and so on. In fact, the AP 108A-I that transmits a data packet to the STA 110A-D can change without the STA 110A-D changing BSSs to which the STA 110A-D is associated—the STA 110A-D may remain in the same BSS using the same, single wireless stack while the AP 108A-I that transmits data packets to the STA 110A-D changes. Similarly, there may be no pre-defined STA 110A-D to which an AP 108A-I is associated. Rather, the STA 110A-D transmitting a data packet to a particular AP 108A-I can change on a packet-by-packet basis.

The AP controller 106 can be configured to select the AP 108A-I to transmit a data packet to a STA 110A-D. For example, the AP controller 106 can route traffic to one or more APs 108A-I for transmission to one or more STAs 110A-D based on downlink and/or uplink quality measurements. A downlink (DL) transmission generally refers to a communication from a network system (e.g., an AP) to a user terminal (e.g., a STA). An uplink (UL) transmission generally refers to a communication from the user terminal to the network system.

In the multipoint environment 100, base station functionality is subdivided between the baseband unit 140, the AP controller 106, and/or multiple remote radio units (RRUs) (e.g., APs 108A-I). An RRU may include multiple antennas, and one or more of the antennas may serve as a transmit-receive point (TRP). The RRU and/or a TRP may be referred to as a serving node, a base station, or an access point. The baseband unit 140 may be physically connected to the AP controller 106 and/or the RRUs, such as via an optical fiber connection. The baseband unit 140 and/or the AP controller 106 may provide operational details to an RRU to control transmission and reception of signals from the RRU along with control data and payload data to transmit. The RRU may provide data to the network received from STAs 110A-D within a service area associated with the RRU. An RRU can provide service to devices (e.g., STAs 110A-D) within a service area. For example, wireless downlink transmission service may be provided by an RRU to the service area to communicate data to one or more devices within the service area.

The APs 108A-I may each have one or more transmit antennas that each support one or more digital basebands. In some embodiments, each AP 108A-I has the same number of transmit antennas. In other embodiments, some or all APs 108a-I have a different number of transmit antennas than other APs 108A-I. Thus, the APs 108A-I may collectively be capable of transmitting N spatial beams, where N is the product of the number of APs 108A-I in the multipoint environment 100 and the number of transmit antennas operated by a single AP 108A-I. Similarly, each AP 108A-I can have the same number or different number of receive antennas. The baseband unit 140, the AP controller 106, and/or the APs 108A-I can be collectively referred to herein as a "network system."

Various standards and protocols may be included in the multipoint environment 100 to wirelessly communicate data between a base station (e.g., an AP 108) and a wireless communication device (e.g., a STA 110). Some wireless devices may communicate using an orthogonal frequency-division multiplexing (OFDM) digital modulation scheme via a physical layer. OFDM standards and protocols can include the third generation partnership project (3GPP) long term evolution (LTE), the Institute of Electrical and Electronics Engineers (IEEE) 802.16 standard (e.g., 802.16e, 802.16m), which may be known as WiMAX (Worldwide interoperability for Microwave Access), and the IEEE 802.11 standard, which may be known as Wi-Fi. In some systems, a radio access network (RAN) may include one or more base stations associated with one or more evolved NodeBs (also commonly denoted as enhanced NodeBs, eNodeBs, or eNBs), next generation NodeBs (gNBs), or any other suitable NodeBs (xNBs). In other embodiments, radio network controllers (RNCs) may be provided as the base stations. A base station provides a bridge between the wireless network and a core network such as the Internet. The base station may be included to facilitate exchange of data for the wireless communication devices of the wireless network.

The wireless communication device may be referred to as a station (STA) (e.g., for wireless communication devices that communicate using the IEEE 802.11 standard). The wireless communication device may also be referred to as a UE (e.g., for wireless communication devices that communicate in a RAN). The STA may be a device used by a user such as a smartphone, a laptop, a tablet computer, cellular telephone, a wearable computing device such as smart glasses or a smart watch or an ear piece, one or more networked appliances (e.g., consumer networked appliances or industrial plant equipment), an industrial robot with connectivity, or a vehicle. In some implementations, the STA may include a sensor or other networked device configured to collect data and wirelessly provide the data to a device (e.g., server) connected to a core network such as the Internet. Such devices may be referred to as Internet of Things devices (IoT devices).

The AP controller 106 can function as a router to route traffic between the baseband unit 140 and the APs 108A-I. The AP controller 106 can implement a relatively small amount of buffering. This can contribute to the AP controller 106 routing data between the baseband unit 140 and the APs 108A-I with low latency. The AP controller 106 can include any suitable hardware to implement the functionality described herein.

The APs 108A-I can be arranged as an array. All of the APs 108A-I can be connected to the AP controller 106. The APs 108A-I can be connected to the AP controller 106 via wired or wireless connections. Each AP 108A-I can buffer a relatively low amount of frames of data at a time. For example, an AP 108A can buffer 1 or 2 frames of data at a time in certain applications. The frames can be relatively big frames. For example, one frame can include 100 to 150 Internet protocol (IP) packets. The APs 108A-I are arranged to wirelessly communicate with STAs 110A-D. The APs 108A-I can communicate via any suitable wireless links, such as wireless local area network (WLAN) links. WLAN signals can have a shorter signal range than cellular signals. In some instances, the WLAN signals can have a range of about 300 feet or less. WLAN signals can have a range of about 150 feet or less in certain applications. An example of a WLAN link is a Wi-Fi link. The WLAN link can be implemented based on an IEEE 802.11 standard. The APs 108A-I are networking hardware devices that include any suitable physical hardware to implement the functionalities disclosed herein. Although APs are described with reference to certain embodiments for illustrative purposes, any suitable principles and advantages described with references to access points can be implemented with any other suitable serving nodes of a network system. Any suitable wireless link that meets latency and throughput specifications can be used. Wi-Fi links, millimeter wave (mmW) wireless area network (WAN) links, and fifth generation (5G) New Radio (NR) links in Frequency Range 2 (FR2) are examples of such suitable wireless links.

Figure 1B:
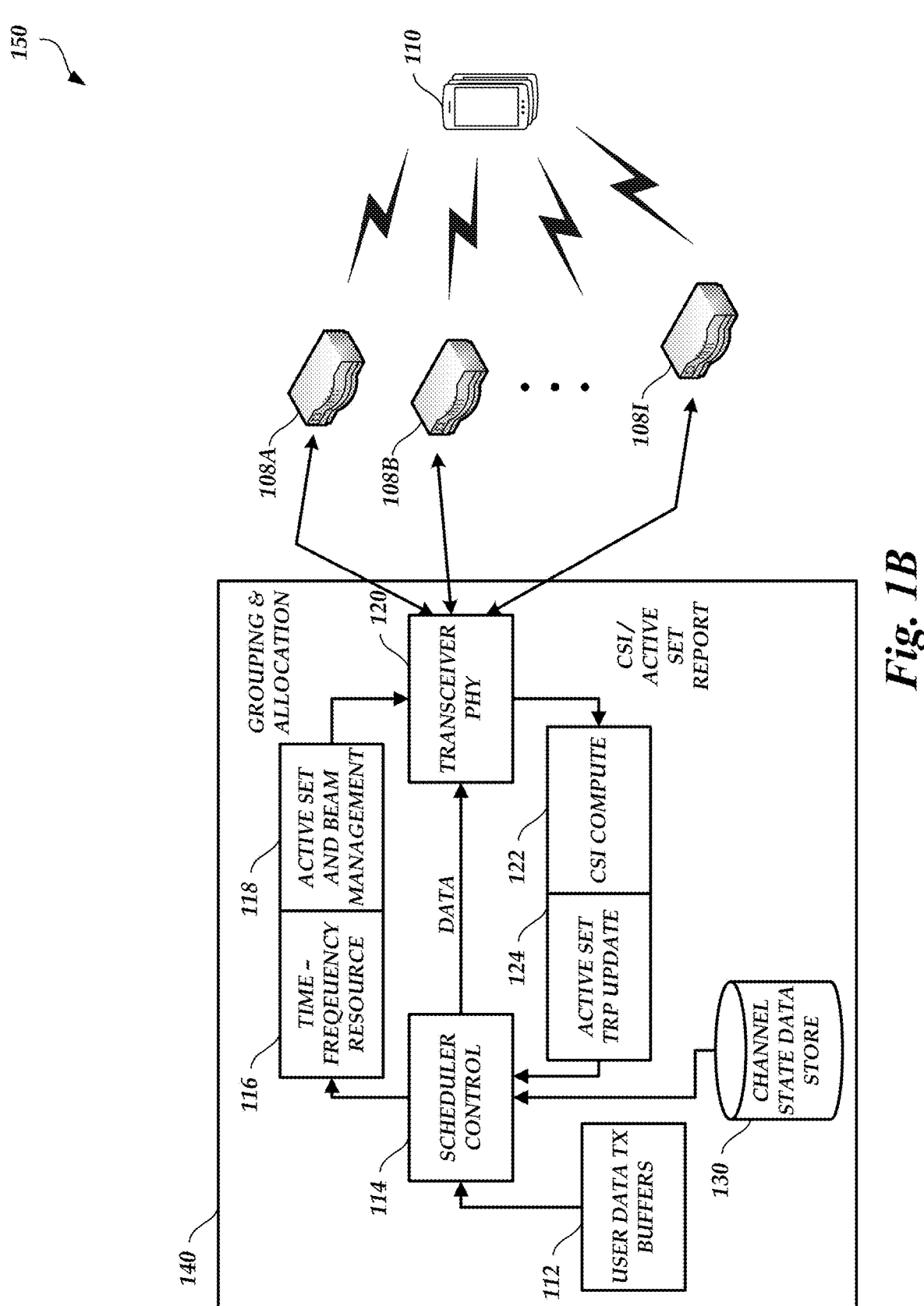
FIG. 1B is a schematic diagram illustrating a wireless network that includes the baseband unit according to an embodiment.

FIG. 1B is a schematic diagram illustrating a wireless network 150 that includes the baseband unit 140 according to an embodiment. In this embodiment, the APs 108A-I may operate as RRUs or serving nodes, and the baseband unit 140 and/or the AP controller 106 (not shown) may select users (e.g., STAs 110, STA 110 receive antennas, etc.) to be served by one or more APs 108A-I over one or more time slots and/or over one or more spatial dimensions.

As illustrated in FIG. 1B, the baseband unit 140 includes user data TX buffers 112, the scheduler control 114, a time/frequency resource allocation block 116, an active set and beam management block 118, a transceiver 120, a CSI computation block 122, an active set serving node update block 124, and the channel state data store 130. The baseband unit 140 can include any suitable physical hardware to implement the illustrated blocks. For example, the baseband unit 140 can include a processor and computer readable storage to implement any suitable blocks shown in FIG. 1B. The wireless network 150 also includes the APs 108A-I, one or more STAs 110, and/or the AP controller 106 (not shown). The wireless network 150 optionally includes other APs 108, not shown.

The baseband unit 140 and/or the AP controller 106 includes a scheduler that selects users to serve over one or more spatial dimensions over one or more time slots, selects APs 108A-I to serve user data, and schedules user data for wireless transmission between the APs 108A-I and STAs 110 over various spatial dimensions (e.g., spatial beams, channels, etc.). The scheduler can schedule DL data traffic, UL data traffic, or both. The scheduler can schedule data from any suitable number of APs 108 to any suitable number of UEs 110. The scheduler can include the user data queue TX buffers 112, the scheduler control 114, the time/frequency resource allocation block 116, the active set and beam management block 118, the CSI computation block 122, the active set serving node update block 124, and/or the channel state data store 130.

The transceiver 120 can provide a STA report received from the STA 110 to the scheduler. For example, the STA report can include spatial beam link strengths, spatial beam link quality, and/or other CSI suitable for allowing the scheduler to schedule DL data transmissions and/or to schedule UL data transmissions. The CSI computation block 122 can compute CSI data from data in the STA report. The active set serving node update block 124 can determine an updated active set for one or more STAs 110 based on updated link strength information provided by the STA(s) 110 (e.g., provided by the STA(s) 110 in response to receiving DL data traffic). In some instances, the active set serving node update block 124 can determine an updated active set for a subset of one or more antennas of a STA 110. The active set serving node update block 124 can use any suitable metrics disclosed herein to update an active set associated with a STA 110.

The transceiver 120 can also provide a beam visibility report received from the STA 110 and/or AP 108 to the scheduler. The beam visibility report can indicate which AP 108 has started transmitting UL data to a STA 110 in response to a blockage, obstruction, or other interference. For example, one AP 108 may have initially been serving a STA 110. Due to an obstruction or interference, however, another AP 108 may start serving the STA 110 instead. The beam visibility report can inform the scheduler of the new AP 108 that has started serving the STA 110 instead. The scheduler (e.g., the active set serving node update block 124) can use this information to determine an updated active set for the STA 110 (e.g., update information identifying the beam(s) serving the STA 110, which may now include the beam from the new AP 108 serving the STA 110, such that future DL transmissions to the STA 110 are completed using at least one of the identified beam(s)).

Alternatively or in addition, the beam visibility report can include information from a STA 110 indicating that the STA 110 cannot receive transmissions from a beam transmitted by an AP 108 originally assigned to serve the STA 110, but that the STA 110 can receive transmissions from a beam transmitted by another AP 108. The scheduler (e.g., the active set serving node update block 124) can use this information to determine an updated active set for the STA 110 (e.g., update information identifying the beam(s) serving the STA 110, which may now include the beam from the another AP 108 that the STA 110 can see, such that future DL transmissions to the STA 110 are completed using at least one of the identified beam(s)).

The updated active set data is provided to the scheduler control 114. The user data queue TX buffers 112 can provide user data (e.g., DL user data) to the scheduler control 114. The scheduler control 114 provides user data to the transceiver 120 and also provides instructions to the time/frequency resource allocation block 116. The time/frequency resource allocation block 116 can schedule timing and frequency of DL and/or UL data transmission from and/or to APs 108 (e.g., generate scheduling data), which can be forwarded to the APs 108 via the transceiver 120 and/or the AP controller 106. This can avoid timing conflicts and conflicts in the frequency domain. The active set and beam management block 118 can select APs 108 and/or specific spatial beams offered by these APs 108 for providing wireless transmission services to STAs 110, and create corresponding active sets for the STAs 110. The active set and beam management block 118 can group DL data transmissions and manage beamforming from the APs 108 to the STAs 110. The transceiver 120 provides data for transmission by the APs 108 to STAs 110.

As illustrated in FIG. 1B, the scheduler can cause a network system of the wireless network 150 to wirelessly transmit first user data to a first STA 110 across one or more spatial beams or spatial dimensions, to transmit second user data to a second STA 110 across one or more spatial beams or spatial dimensions, and so on. The scheduler can cause the transmissions of the first user data, the second user data, etc. to occur simultaneously and/or at different times. Moreover, the scheduler can cause a network system of the wireless network 150 to wirelessly transmit user data to any suitable number of STAs 110 across one or more spatial beams or spatial dimensions served by one or more APs 108.

Figure 2:
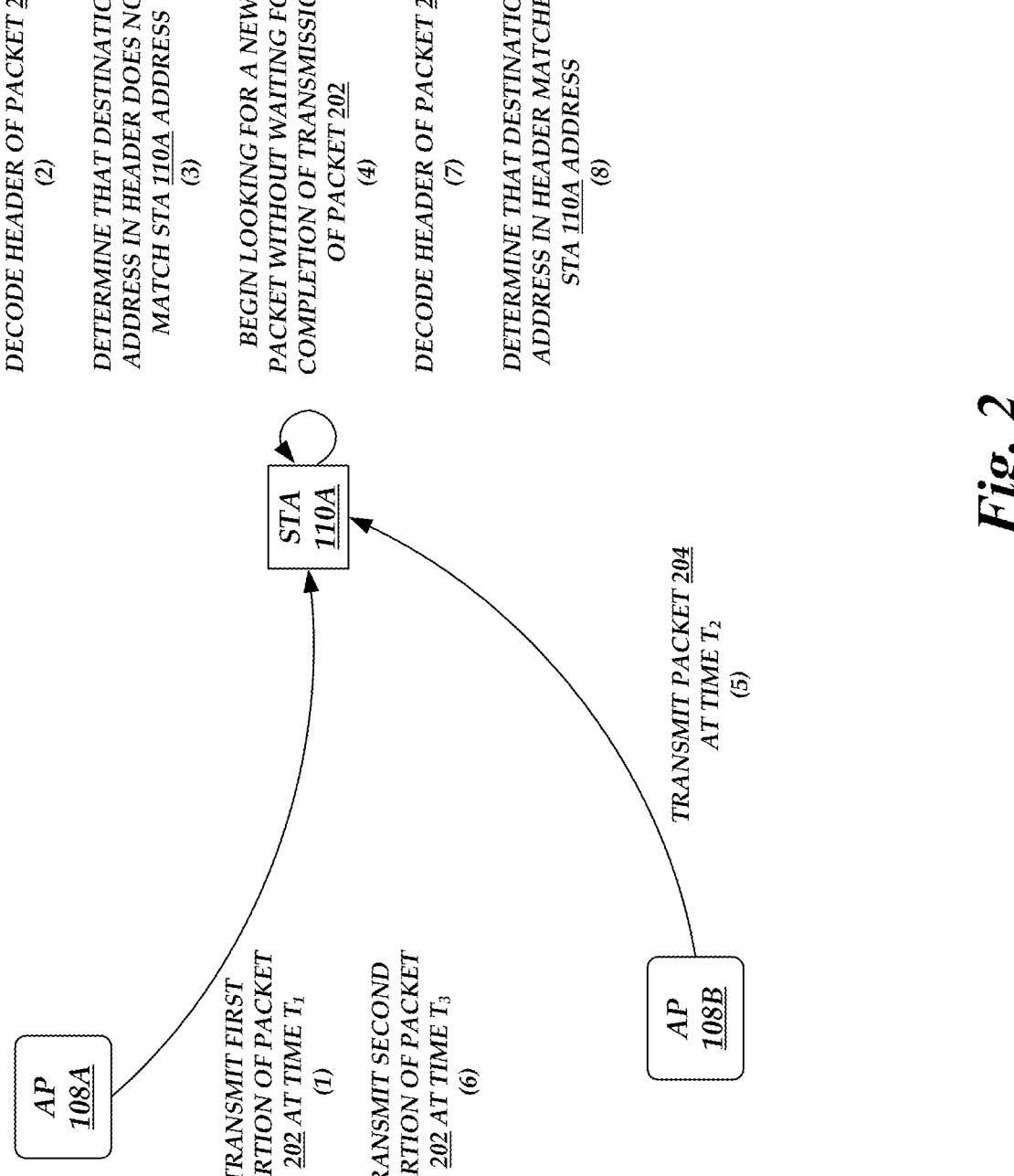
FIG. 2 is a block diagram of the multipoint environment of FIG. 1A illustrating the operations performed by the components of the multipoint environment to minimize the negative effects of false alarms according to an embodiment.

FIG. 2 is a block diagram of the multipoint environment 100 of FIG. 1A illustrating the operations performed by the components of the multipoint environment 100 to minimize the negative effects of false alarms according to an embodiment. To minimize the negative effects of false alarms, the STAs 110 and APs 108 in the multipoint environment 100 can each be configured to restart a data packet detection procedure after decoding the destination address in the header or preamble of a data packet and determining that the destination address does not match an address (or wildcard address) of the STA 110 or AP 108, use a minimum receive (Rx) sensitivity level below which the STA 110 or AP 108 does not attempt to decode the header or preamble of a data packet, or both restart a data packet detection procedure after decoding the destination address in the header or preamble of a data packet and determining that the destination address does not match an address (or wildcard address) of the STA 110 or AP 108 and use the minimum Rx sensitivity level to determine whether to decode the header or preamble of a data packet. The operations depicted in FIG. 2 are directed to the data packet detection procedure restart described herein being performed by a STA 110.

For example, instead of locking onto a data packet until transmission of the data packet is complete (e.g., transmission of the preamble, header, and/or data payload of the data packet is complete), a STA 110 or AP 108 can decode the header or preamble of a detected data packet to determine whether the destination address included in the header or preamble matches an address (or wildcard address) of the STA 110 or AP 108. If the destination address in the header or preamble does not match an address (or wildcard address) of the STA 110 or AP 108 (indicating that the data packet is not intended for the STA 110 or AP 108), then the STA 110 or AP 108 can start searching for a new data packet without waiting for transmission of the preamble, header, and/or data payload of the initial data packet to finish. In particular, the STA 110 or AP 108 can start a PHY CCA and STF detection procedure to detect transmissions of data packets (e.g., to begin detecting the transmission of a preamble, header, and/or data payload of a data packet). Upon detecting the transmission of a preamble or header of a data packet using the PHY CCA and STF detection procedure, the STA 110 or AP 108 can decode the destination address included in the preamble or header. If the destination address does not match the address (or wildcard address) of the STA 110 or AP 108, then the STA 110 or AP 108 can restart the PHY CCA and STF detection procedure to attempt to detect the transmission of another packet, even before transmission of the preamble, header, and/or data payload of the initial data packet is complete.

As illustrated in FIG. 2, the AP 108A transmits a first portion of packet 202 at time $T_1$ to STA 110A at (1). For example, the first portion of the packet 202 may be the header or preamble of the packet 202. The STA 110A can detect the transmission and decode the header (and/or preamble) of the packet 202 at (2). After decoding the header (and/or preamble) of the packet 202, the STA 110A determines that the destination address in the header (or preamble) does not match the STA 110A address at (3). As a result, the STA 110A begins looking for a new packet without waiting for completion of the transmission of the packet 202 at (4). For example, the STA 110A may begin searching for a new packet prior to the completion of the transmission of the header, preamble, and/or data payload of the packet 202.

The AP 108B transmits a packet 204 to the STA 110A at time $T_2$ at (5). The time $T_2$ may be after the time $T_1$, but before the completion of the transmission of the header, preamble, and/or data payload of the packet 202. For example, the AP 108A may transmit a second portion of the packet 202 to the STA 110A at time $T_3$ at (6). The time $T_3$ may be after the time T2. The second portion of the packet 202 may be a subsequent part of the header, a subsequent part of the preamble, and/or the data payload of the packet 202.

The STA 110A can decode the header (and/or preamble) of the packet 204 at (7). After decoding the header (and/or preamble) of the packet 204, the STA 110A determines that the destination address in the header (or preamble) matches the STA 110A address at (8). The STA 110A can then lock onto the packet 204 and process the remaining portion of the packet 204.

In further embodiments, the AP controller 106, some or all of the APs 108A-I, and/or some or all of the STAs 110A-D can be configured to execute additional operations that further minimize false alarms. For example, an AP 108 transmission can include a header, a payload, and a guard time that follows the payload to allow the STA 110 to transmit a positive acknowledgement (ACK) message or a negative acknowledgement (NAK) message. In one scenario, a STA 110 begins searching for a data packet. After successfully identifying and decoding a preamble or header of a data packet that has a destination address that matches the address of the STA 110, the STA 110 continues to decode the payload. Once the preamble or header and/or payload are decoded, the STA 110 can transmit an ACK or NAK to the AP 108 that transmitted the data packet and/or to another AP 108, such as another AP 108 that shares the same wireless protocol stack as the packet transmitted AP 108 as described herein. The STA 110 then begins searching for another data packet.

In a second scenario, a STA 110 begins searching for a data packet. After successfully identifying and decoding a preamble or header of a data packet that has a destination address that does not match the address of the STA 110, the STA 110 aborts the payload decode and continues searching for a preamble or header of another data packet.

In a third scenario, a STA 110B begins searching for a data packet. After successfully identifying and decoding an ACK and/or NAK transmitted by another STA 110A, the STA 110B finishes processing the ACK and/or NAK and continues searching for another data packet.

Figure 13:
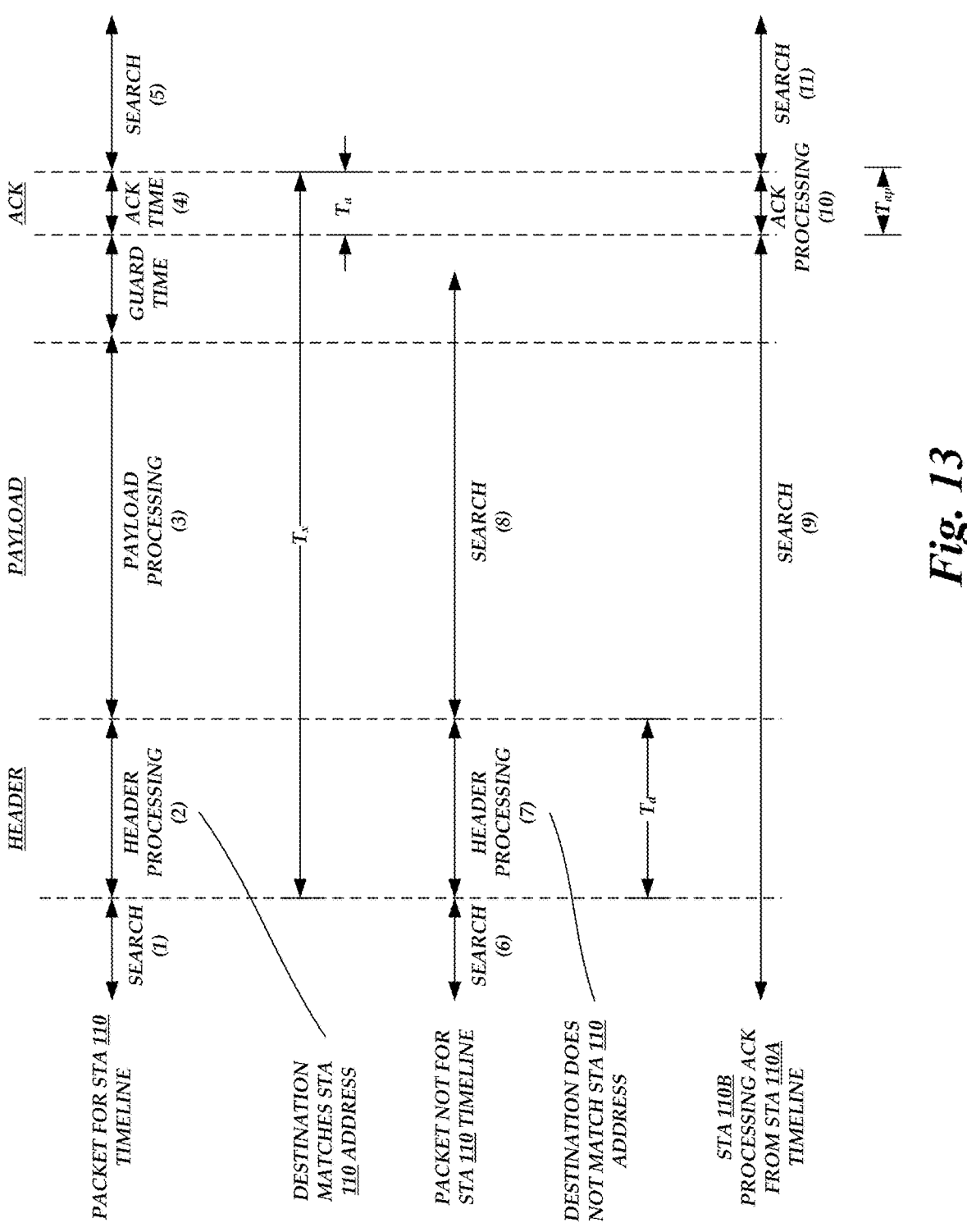
FIG. 13 illustrates an example timeline for packet transmissions from an AP to a STA, depicting reasons why a data packet transmission miss may occur.
Figure 14:
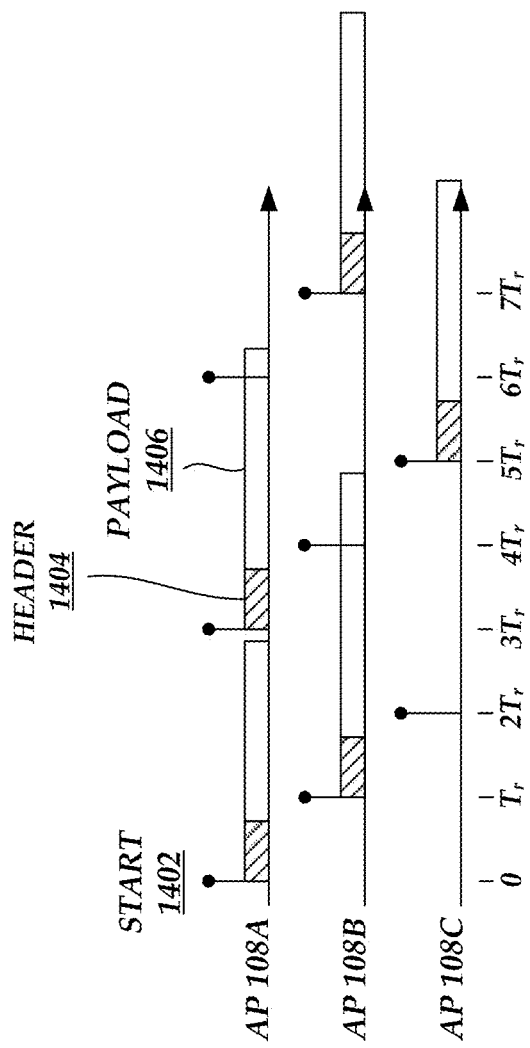
FIG. 14 illustrates a synchronized system in which AP packet transmission times are synchronized to a raster.
Figure 15:
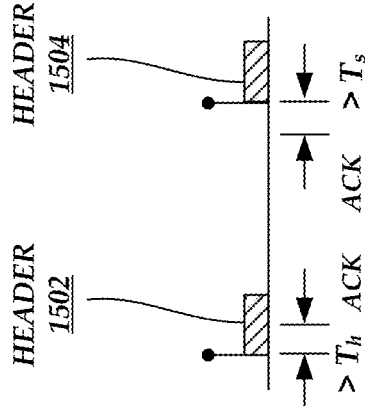
FIG. 15 illustrates a timeline of ACK and/or NAK transmission that may reduce the likelihood that ACK and/or NAK transmissions result in missed AP preambles.

Pre-empting full data packet processing in a manner as described above with respect to FIG. 2 and elsewhere in this disclosure (e.g., based on determining whether the destination address in a header or preamble matches a destination address of a receiving device, based on determining whether a source address in a header or preamble matches an address of an authenticated device, etc.) can reduce the likelihood that a STA 110 misses a transmission from an AP 108 that is intended for the STA 110 and that is transmitted while the STA 110 is processing a false alarm data packet (e.g., a data packet not intended for the STA 110, a data packet intended for another STA 110, a data packet transmitted by an AP 108 with which the STA 110 has not authenticated, etc.). However, a STA 110 may still miss some transmissions intended for the STA 110. For example, the header of a data packet intended for a STA 110 may be missed if the STA 110 is processing the header of a data packet not intended for the STA 110. Such overlap may be possible because traditional AP 108 transmissions may not be synchronized or even temporarily coordinated. FIGS. 13-15 below describe in greater detail additional operations that can be performed by the AP controller 106, some or all of the APs 108A-I, and/or some or all of the STAs 110A-D to further reduce the likelihood that data packet transmissions intended for a STA 110 are missed by the STA 110.

FIG. 3 is another block diagram of the multipoint environment 100 of FIG. 1A illustrating the operations performed by the components of the multipoint environment 100 to minimize the negative effects of false alarms according to an embodiment. The operations depicted in FIG. 3 are directed to the data packet detection procedure restart described herein being performed by an AP 108.

As illustrated in FIG. 3, the STA 110A transmits a first portion of packet 302 at time $T_1$ to AP 108B at (1). For example, the first portion of the packet 302 may be the header or preamble of the packet 302. The AP 108B can detect the transmission and decode the header (and/or preamble) of the packet 302 at (2). After decoding the header (and/or preamble) of the packet 302, the AP 108B determines that the destination address in the header (or preamble) does not match the AP 108B address or the wildcard address associated with the AP 108B at (3). As a result, the AP 108B begins looking for a new packet without waiting for completion of the transmission of the packet 302 at (4). For example, the AP 108B may begin searching for a new packet prior to the completion of the transmission of the header, preamble, and/or data payload of the packet 302.

The STA 110B transmits a packet 304 to the AP 108B at time $T_2$ at (5). The time $T_2$ may be after the time $T_1$, but before the completion of the transmission of the header, preamble, and/or data payload of the packet 302. For example, the STA 110A may transmit a second portion of the packet 302 to the AP 108B at time $T_3$ at (6). The time $T_3$ may be after the time T2. The second portion of the packet 302 may be a subsequent part of the header, a subsequent part of the preamble, and/or the data payload of the packet 302.

The AP 108B can decode the header (and/or preamble) of the packet 304 at (7). After decoding the header (and/or preamble) of the packet 304, the AP 108B determines that the destination address in the header (or preamble) matches the AP 108B address or the wildcard address associated with the AP 108B at (8). The AP 108B can then lock onto the packet 304 and process the remaining portion of the packet 304.

Alternatively or in addition, a STA 110 can provide to an AP 108 information identifying a false alarm when the STA 110 attempts to decode a data packet only to find that the destination address of the data packet does not match the address of the STA 110. The AP 108 can gather information for one or more false alarms identified by the STA 110 (e.g., the STA 110 can transmit, at separate times or at once, information for one or more false alarms identified by the STA 110), and use this information to determine a minimum Rx sensitivity level for the STA 110. For example, the AP 108 and/or the AP controller 106 can determine a statistic (e.g., the mean, median, mode, etc.) of the received power level (e.g., a power level at which a data packet is received) of the data packets that the STA 110 identified as resulting in a false alarm, and the AP 108 and/or AP controller 106 can set the minimum Rx sensitivity level for the STA 110 to be some level above the determined statistic (e.g., some level above the mean, median, mode, etc.) of the received power level of the data packets that the STA 110 identified as resulting in a false alarm.

In an alternative embodiment, the APs 108 can analyze the source address included in a header or preamble of a data packet instead of the destination address to minimize the negative effects of false alarms, and otherwise perform some or all of the other operations described herein. In particular, the APs 108 in the multipoint environment 100 can each be configured to restart a data packet detection procedure after decoding the source address in the header or preamble of a data packet and determining that the source address does not match an address of a STA 110 that has authenticated with one or more of the APs 108, use a minimum receive (Rx) sensitivity level below which the AP 108 does not attempt to decode the header or preamble of a data packet, or both restart a data packet detection procedure after decoding the source address in the header or preamble of a data packet and determining that the source address does not match an address an authenticated STA 110 and use the minimum Rx sensitivity level to determine whether to decode the header or preamble of a data packet. On the other hand, an AP 108 may start processing and/or decoding a data packet if the AP 108 determines that the source address included in the header or preamble of the data packet matches an address of an authenticated STA 110 (e.g., a STA 110 that has authenticated with the AP 108, the AP 108 or another AP 108 in a group of APs 108 has authenticated the STA 110, etc.) and/or has a minimum Rx sensitivity level.

For example, instead of locking onto a data packet until transmission of the data packet is complete (e.g., transmission of the preamble, header, and/or data payload of the data packet is complete), an AP 108 can decode the header or preamble of a detected data packet to determine whether the source address included in the header or preamble matches an address of an authenticated STA 110. If the source address in the header or preamble matches an address of an authenticated STA 110, the AP 108 locks onto the data packet and continues to process the remaining portion of the data packet, irrespective of whether the destination address included in the header or preamble of the data packet matches the address of the AP 108. If the source address in the header or preamble does not match an address of au authenticated STA 110 (indicating that the data packet is not intended for the AP 108), then the AP 108 can start searching for a new data packet without waiting for transmission of the preamble, header, and/or data payload of the initial data packet to finish. In particular, the AP 108 can start a PHY CCA and STF detection procedure to detect transmissions of data packets (e.g., to begin detecting the transmission of a preamble, header, and/or data payload of a data packet). Upon detecting the transmission of a preamble or header of a data packet using the PHY CCA and STF detection procedure, the AP 108 can decode the source address included in the preamble or header. If the source address does not match the address of an authenticated STA 110, then the AP 108 can restart the PHY CCA and STF detection procedure to attempt to detect the transmission of another packet, even before transmission of the preamble, header, and/or data payload of the initial data packet is complete.

Figure 4:
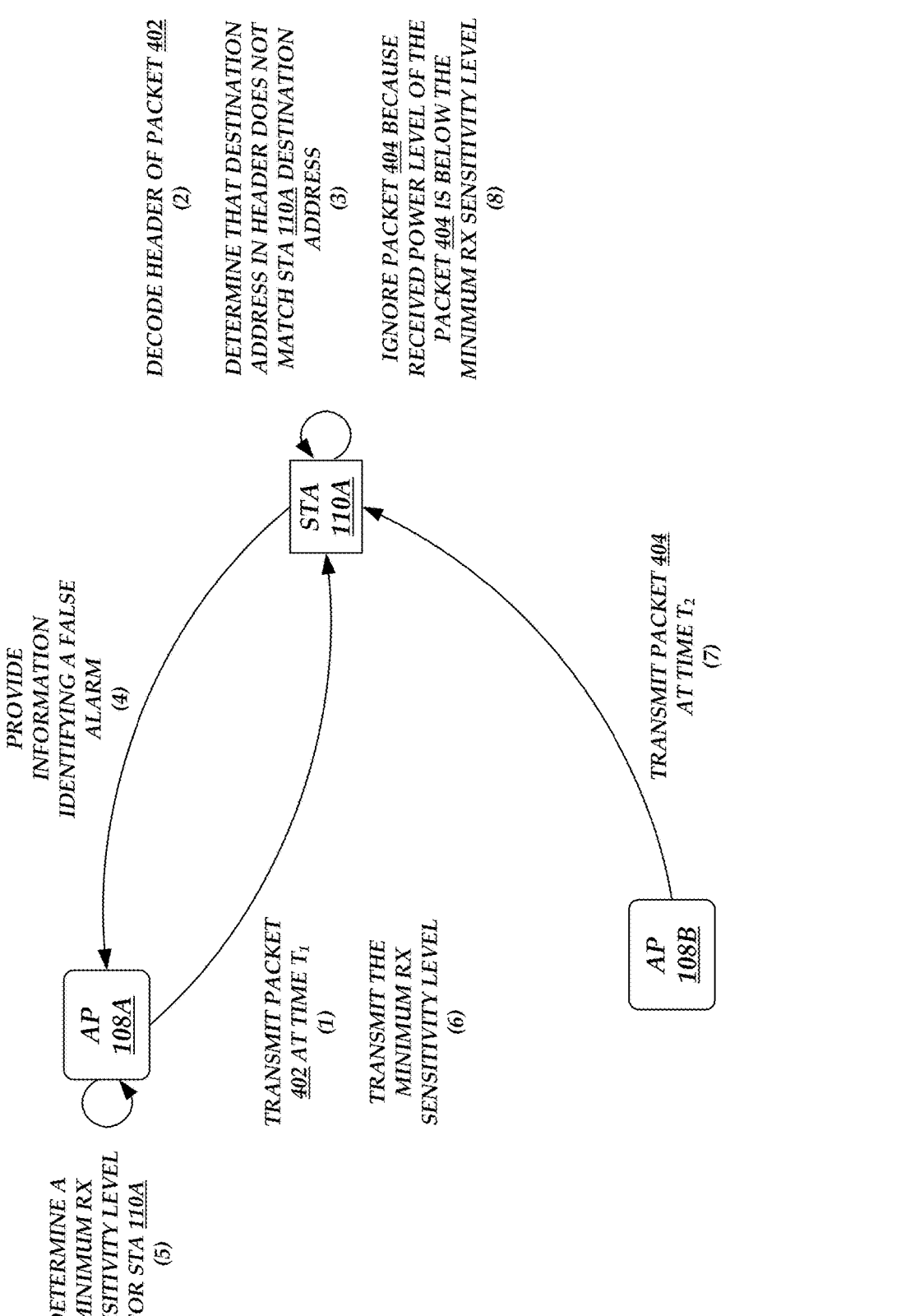
FIG. 4 is a block diagram of the multipoint environment of FIG. 1A illustrating the operations performed by the components of the multipoint environment to select a minimum Rx sensitivity level for a STA using false alarm information according to an embodiment.

FIG. 4 is a block diagram of the multipoint environment 100 of FIG. 1A illustrating the operations performed by the components of the multipoint environment 100 to select a minimum Rx sensitivity level for a STA 110A using false alarm information according to an embodiment. While the operations depicted in FIG. 4 are directed to determining a minimum Rx sensitivity level for a STA 110, similar techniques can be used to determine a minimum Rx sensitivity level for an AP 108.

As illustrated in FIG. 4, the AP 108A transmits packet 402 at time $T_1$ to the STA 110A at (1). For example, the AP 108A may initially transmit a header or preamble of the packet 402. The STA 110A can detect the transmission and decode the header (and/or preamble) of the packet 402 at (2). After decoding the header (and/or preamble) of the packet 402, the STA 110A determines that the destination address in the header (or preamble) does not match the STA 110A address at (3). As a result, the STA 110A provides information to the AP 108A identifying the false alarm at (4). For example, the information can include the received power level of the packet 402 (e.g., a power level at which the packet 402 is received by the STA 110A), a destination address included in the packet 402, a time that the packet 402 was received by the STA 110A, and/or the like. Alternatively or in addition, the STA 110A may also begin looking for a new packet without waiting for completion of the transmission of the packet 402. For example, the STA 110A may begin searching for a new packet prior to the completion of the transmission of the header, preamble, and/or data payload of the packet 402.

After the AP 108A has received the false alarm information from the STA 110A in response to transmission of the packet 402 and/or after the AP 108A has received multiple instances of false alarm information in response to transmissions of different data packets, the AP 108A can determine a minimum Rx sensitivity level for the STA 110A at (5). For example, the AP 108A can average the data packet received power level(s) included in the received false alarm information, and select a minimum Rx sensitivity level for the STA 110A that is at least some value above the average data packet received power level. Similarly, the AP 108A can determine a median data packet received power level, a mode data packet received power level, a standard deviation of the data packet received power level(s), a variance of the data packet received power level(s), etc., and select a minimum Rx sensitivity level for the STA 110A that is at least some value over the determined data packet received power level statistic. Once the minimum Rx sensitivity level is determined, the AP 108A transmits the minimum Rx sensitivity level to the STA 110A at (6).

The STA 110A can now use the minimum Rx sensitivity level to determine whether to begin decoding a data packet. For example, the AP 108B can transmit a packet 404 at a time $T_2$ that is some time after the time $T_1$ at (7). The STA 110A may detect the transmission of the packet 404, but may ignore the packet 404 at (8) (e.g., decline to decode the header and/or preamble of the packet 404) because the received power level of the packet 404 is below the minimum Rx sensitivity level.

Alternatively or in addition, the AP 108 can gather information for one or more missed detects (e.g., data packet transmissions intended for a STA 110 that were not received by the STA 110) and use this information alone or with the false alarm information to determine a minimum Rx sensitivity level for the STA 110. For example, the AP 108 can set the minimum Rx sensitivity level to be some level below a statistic (e.g., a mean, median, mode, etc.) of a transmission power level of the data packets intended for the STA 110 that were not received by the STA 110. In particular, the AP 108 can set the minimum Rx sensitivity level to be some level below a statistic of a transmission power level of the data packets intended for the STA 110 that were not received by the STA 110 minus an estimated path loss from the AP 108 to the STA 110 (where the path loss may be estimated by the AP 108 and/or the STA 110). The AP 108 can then provide the determined minimum Rx sensitivity level to the STA 110 so that the STA 110 can begin using the minimum Rx sensitivity level to determine whether or not to begin decoding a preamble or header of a transmitted data packet. Similarly, an AP 108 can use missed detect information obtained from a STA 110 (e.g., information identifying data packets intended for the AP 108 that were not received by the AP 108) and/or false alarm information determined by the AP 108 (e.g., information associated with data packets decoded by the AP 108 that were not intended for the AP 108) to determine a minimum Rx sensitivity level for itself in a similar manner. The AP 108 can then use the determined minimum Rx sensitivity level to determine whether or not to begin decoding a preamble or header of a transmitted data packet.

Figure 5:
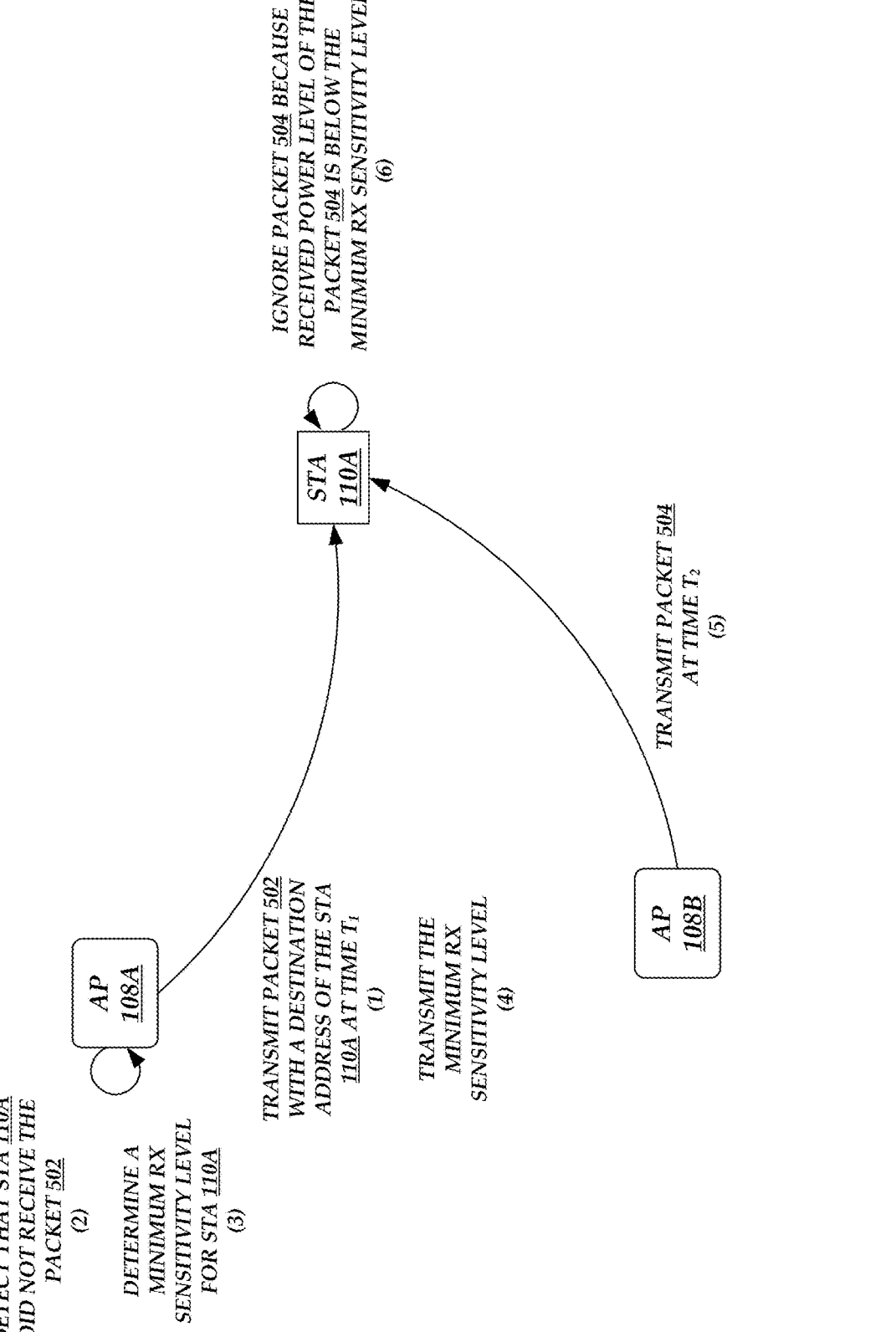
FIG. 5 is a block diagram of the multipoint environment of FIG. 1A illustrating the operations performed by the components of the multipoint environment to select a minimum Rx sensitivity level for a STA using missed detect information according to an embodiment.

FIG. 5 is a block diagram of the multipoint environment 100 of FIG. 1A illustrating the operations performed by the components of the multipoint environment 100 to select a minimum Rx sensitivity level for a STA 110A using missed detect information according to an embodiment. While the operations depicted in FIG. 5 are directed to determining a minimum Rx sensitivity level for a STA 110, similar techniques can be used to determine a minimum Rx sensitivity level for an AP 108.

As illustrated in FIG. 5, the AP 108A transmits a packet 502 that includes a destination address of the STA 110A at time $T_1$ at (1). The AP 108A can detect that the STA 110A did not receive the packet 502 at (2). For example, the AP 108A may detect that the STA 110A did not receive the packet 502 because the STA 110A did not transmit an acknowledgement message to the AP 108A acknowledging receipt of the packet 502 within a threshold period of time after time $T_1$. As a result, the AP 108A can generate missed detect information, which includes a transmission power level of the packet 502 (and/or a power level at which the packet 502 should have been received by the STA 110A), a time that the packet 502 was transmitted, a destination address of the packet 502, and/or the like.

The AP 108A can use the generated missed detect information and/or missed detect information derived from one or more other data packets transmitted to, but not received by, the STA 110A to determine a minimum Rx sensitivity level for the STA 110A at (3). For example, the AP 108A can average the transmission power level(s) of the data packets transmitted to, but not received by, the STA 110A, and set the minimum Rx sensitivity level to be at most some level below the average transmission power level (e.g., at most some level below the average transmission power level minus the estimated path loss from the AP 108A to the STA 110A). Similarly, the AP 108A can determine a median transmission power level, a mode transmission power level, a standard deviation of the transmission power level(s), a variance of the transmission power level(s), and/or the like of the data packets transmitted to, but not received by, the STA 110A, and set the minimum Rx sensitivity level to be at most some level below the statistic of the transmission power level (e.g., at most some level below the statistic of the transmission power level minus the estimated path loss from the AP 108A to the STA 110A). Once the minimum Rx sensitivity level is determined, the AP 108A transmits the minimum Rx sensitivity level to the STA 110A at (4).

The STA 110A can now use the minimum Rx sensitivity level to determine whether to begin decoding a data packet. For example, the AP 108b can transmit a packet 504 at a time $T_2$ that is some time after the time $T_1$ at (5). The STA 110A may detect the transmission of the packet 504, but may ignore the packet 504 at (6) (e.g., decline to decode the header and/or preamble of the packet 504) because the received power level (or transmission power level) of the packet 504 is below the minimum Rx sensitivity level.

In alternate embodiments, the AP controller 106, jointly or separate from an AP 108, can determine the minimum Rx sensitivity level. The AP controller 106 can determine the minimum Rx sensitivity level in the same manner as the AP 108 as described herein.

By configuring a STA 110 or AP 108 to restart the data packet detection procedure soon after identifying that a destination address does not match an address (or wildcard address) of a STA 110 or AP 108 and/or to use a minimum Rx sensitivity level to determine whether or not to begin decoding a preamble or header of a transmitted data packet, the multipoint environment 100 increases the reliability and reduces the latency of a wireless network. For example, reliability may be increased because a STA 110 or AP 108 is less likely to miss a data packet intended for the STA 110 or AP 108 given that the STA 110 or AP 108 is no longer waiting for transmission of a data packet to finish before searching for a new data packet. Latency of the wireless network may be reduced because a STA 110 or AP 108 may no longer decode all detected data packets. Rather, the STA 110 or AP 108 may only decode those data packets that have a received power level over a minimum Rx sensitivity level, which may cause the STA 110 or AP 108 to decode sooner those data packets actually intended for the STA 110 or AP 108.

The AP controller 106 may further increase reliability and reduce latency in the wireless network by implementing retransmission diversity. For example, transmission of a data packet from an AP 108 to a STA 110 or from a STA 110 to an AP 108 may fail due to an obstruction (e.g., by an object, such as a wall, a human, furniture, etc.) and/or interference (e.g., from another transmitting device, such as an AP 108 or STA 110) being present. Generally, the data packet may be retransmitted in response to the initial transmission failure. Retransmitting the data packet from the same STA 110 or AP 108 is likely to result in another transmission failure, however, because retransmissions generally occur soon after the initial transmission (e.g., 1 ms after, 10 ms after, 100 ms after, etc.) and the obstruction and/or interference is still likely to be present given the short timeframe between transmissions. Thus, in the event of a data packet transmission failure, the AP controller 106 can trigger a retransmission of the data packet from another STA 110 or AP 108, such as from a STA 110 or AP 108 that has a different spatial location than the STA 110 or AP 108 that originally transmitted the data packet. Accordingly, the retransmission is less likely to be affected by the obstruction and/or interference, and the recipient STA 110 or AP 108 is then more likely to receive the retransmitted data packet. As an illustrative example, in the event of a data packet transmission failure by a first AP 108 that originally transmitted a data packet, the AP controller 106 can trigger a retransmission of the data packet by a second AP 108 in place of the first AP 108, where the second AP 108 may have a different spatial location than the first AP 108.

In addition, the AP controller 106 can pre-cache a data packet at one or more APs 108, even before the AP 108 that is originally assigned to transmit the data packet transmits the data packet. For example, there may be a time delay involved in an AP controller 106 transmitting a data packet to an AP 108 so that the AP 108 can transmit the data packet to a STA 110. Pre-caching the data packet at multiple APs 108 before the data packet is transmitted by any AP 108 (and therefore before a transmission failure occurs) may reduce the time it takes for a second AP 108 to retransmit the data packet if the first transmission of the data packet fails. Thus, if the transmission by a first AP 108 that is originally assigned to transmit the data packet fails, the AP controller 106 can instruct a second AP 108 at which the data packet has already been pre-cached to transmit the data packet. The time waiting for the second AP 108 to receive the data packet from the AP controller 106 is therefore eliminated. Thus, the time from when the AP controller 106 determines that the second AP 108 should retransmit the data packet to when the second AP 108 retransmits the data packet is reduced, thereby reducing the latency involved with retransmitting the data packet.

Figure 6A:
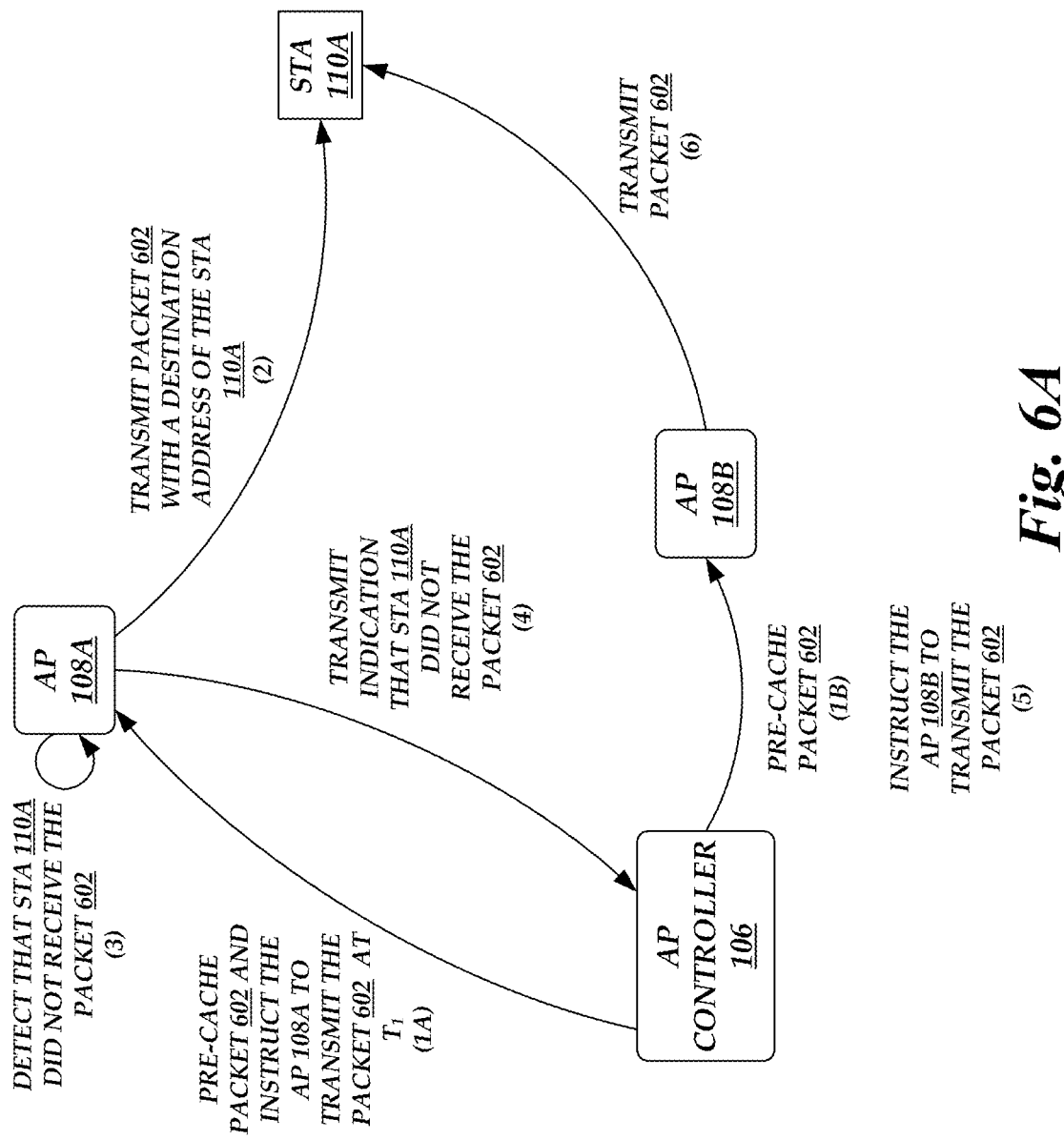
FIGS. 6A-6B are block diagrams of the multipoint environment of FIG. 1A illustrating the operations performed by the components of the multipoint environment to pre-cache data packets according to an embodiment.
Figure 6B:
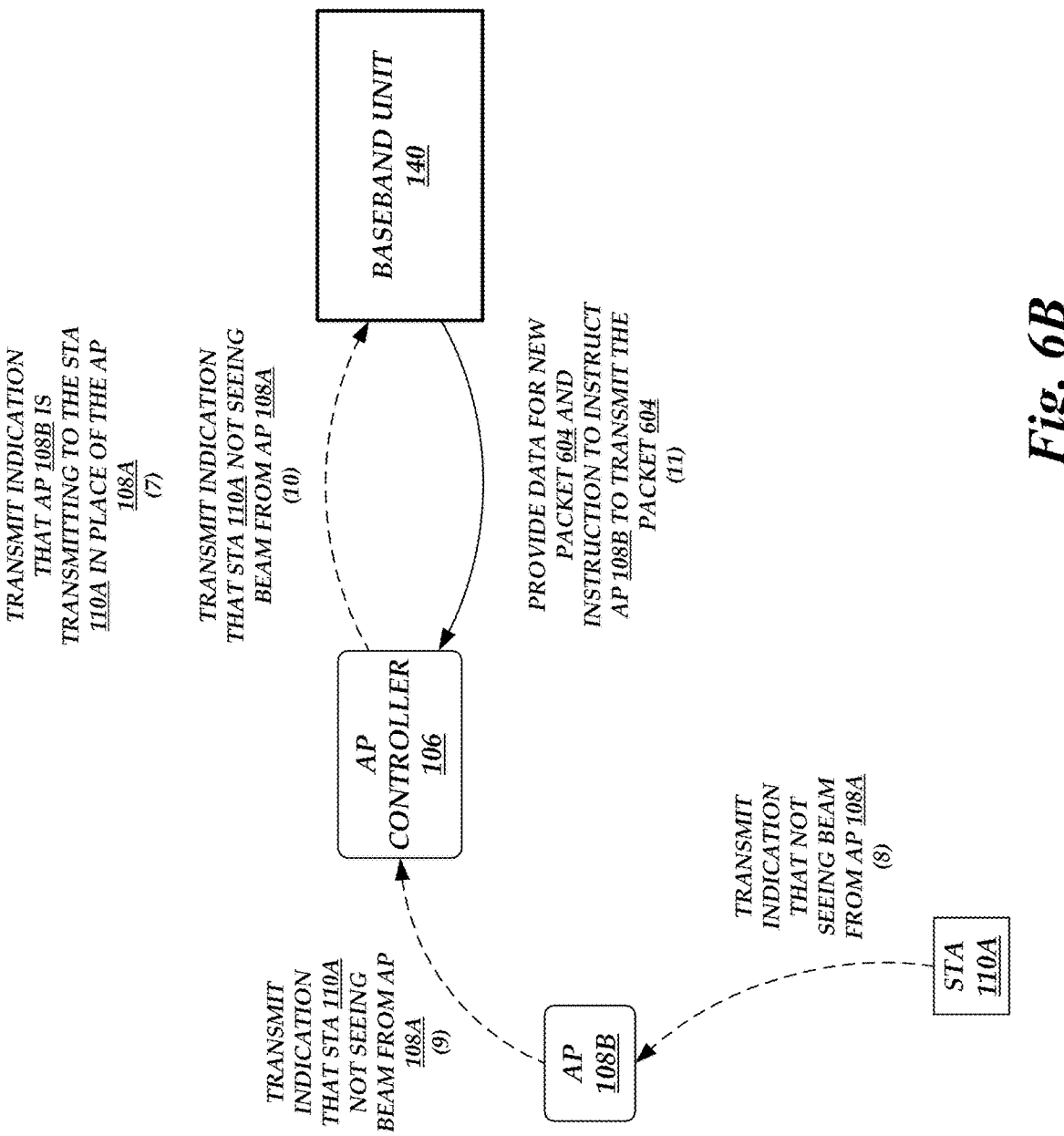

FIGS. 6A-6B are block diagrams of the multipoint environment 100 of FIG. 1A illustrating the operations performed by the components of the multipoint environment 100 to pre-cache data packets according to an embodiment. As illustrated in FIG. 6A, the AP controller 106 pre-caches a data packet 602 at the AP 108A and instructs the AP 108A to transmit the packet 602 at a time $T_1$ at (1A). For example, the AP controller 106 can pre-cache the packet 602 at the AP 108A by transmitting the packet 602 data to the AP 108A. Before, during, and/or after pre-caching the packet 602 at the AP 108A, the AP controller 106 pre-caches the packet 602 at the AP 108B. The AP controller 106, however, does not immediately instruct the AP 108B to transmit the packet 602.

At time $T_1$, the AP 108A can transmit the packet 602 with a destination address of the STA 110A at (2). The AP 108A may detect that the STA 110A did not receive the packet at (3) because, for example, no acknowledgement message was received from the STA 110A acknowledging receipt of the packet 602. As a result, the AP 108A can transmit to the AP controller 106 an indication that the STA 110A did not receive the packet 602 at (4). The AP controller 106 can then instruct the AP 108B to transmit the packet 602 at (5), and the AP 108B can transmit the packet 602 to the STA 110A at (6).

As illustrated at FIG. 6B, the AP controller 106 can optionally transmit an indication to the baseband unit 140 that the AP 108B is transmitting to the STA 110A in place of the AP 108A at (7). The baseband unit 140 can use this information to schedule future data packets to the STA 110A to be served by the AP 108B instead of the AP 108A, at least until the next active set selection procedure is performed to select one or more APs 108 and/or one or more beams to serve the STA 110A.

Alternatively or in addition, the STA 110A can transmit to the AP 108B an indication that the STA 110A is not seeing a beam from the AP 108A that was originally assigned in an active set to serve the STA 110A at (8). The STA 110A may further indicate a beam that the STA 110A can see from another AP, such as from the AP 108B. The AP 108B can forward this indication to the AP controller 106 at (9), and the AP controller 106 can forward this indication to the baseband unit 140 at (10). The baseband unit 140 can use this information to schedule future data packets to the STA 110A to be served by a beam other than the beam of the AP 108A originally assigned in active set to serve the STA 110A. For example, the other beam may be the beam from the AP 108B that the STA 110A can see or detect. This beam may be temporarily assigned to the STA 110A until the next active set selection procedure is performed to select one or more APs 108 and/or one or more beams to serve the STA 110A.

In one embodiment, the baseband unit 140 uses the updated AP 108 serving information provided by the AP controller 106 and/or the beam information provided by the STA 110A to provide to the AP controller 106 data for a new packet 604 and an instruction to instruct the AP 108B (and/or a particular beam of the AP 108B) to transmit the packet 604 at (11). Thus, new packets can be transmitted to the STA 110A in a manner that may avoid the obstruction or interference causing transmission issues.

Figure 7:
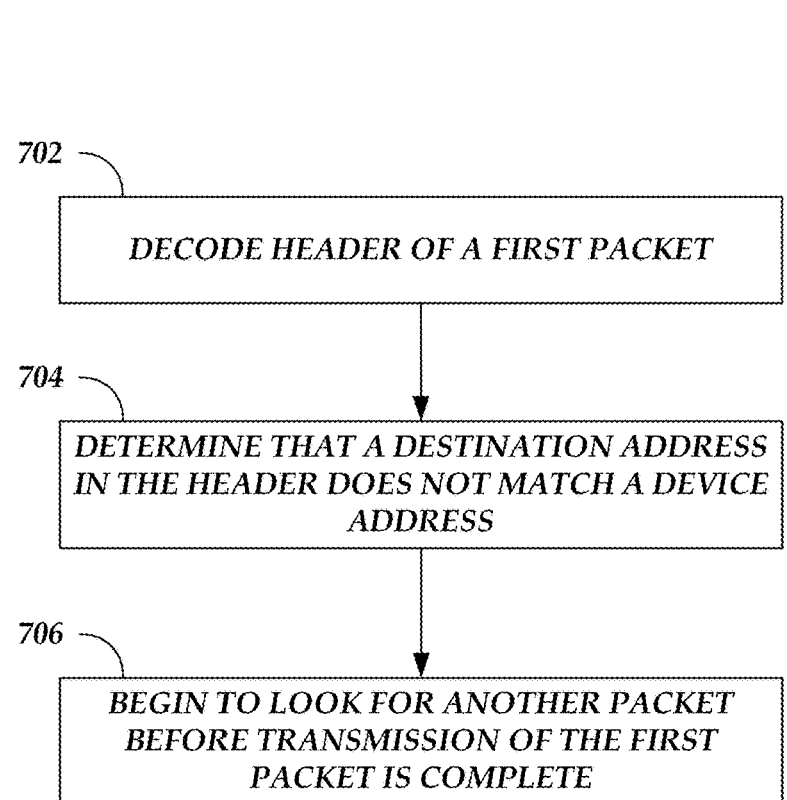
FIG. 7 is a flow diagram depicting a packet detection routine illustratively implemented by a STA and/or an AP, according to one embodiment.

FIG. 7 is a flow diagram depicting a packet detection routine 700 illustratively implemented by a STA and/or an AP, according to one embodiment. As an example, a STA 110A-D and/or an AP 108A-I can be configured to execute the packet detection routine 700. The packet detection routine 700 begins at block 702.

At block 702, a header (and/or a preamble) of a first packet is decoded. For example, the header and/or preamble of the first packet may be decoded in order to determine whether the packet is intended for the decoding device (e.g., a STA 110 or an AP 108).

At block 704, a determination is made that the destination address in the header (and/or the preamble) does not match a device address. For example, the destination address may not match a STA 110 address or the destination address may not match an AP 108 address or a wildcard address associated with an AP 108.

At block 706, the device begins to look for another packet before transmission of the first packet is complete. For example, rather than waiting for transmission of the first packet is complete before looking for another packet, the STA 110 or AP 108 can immediate unlock from the first packet upon determining that the destination address does not match the address or wildcard address of the STA 110 or AP 108.

Figure 8:
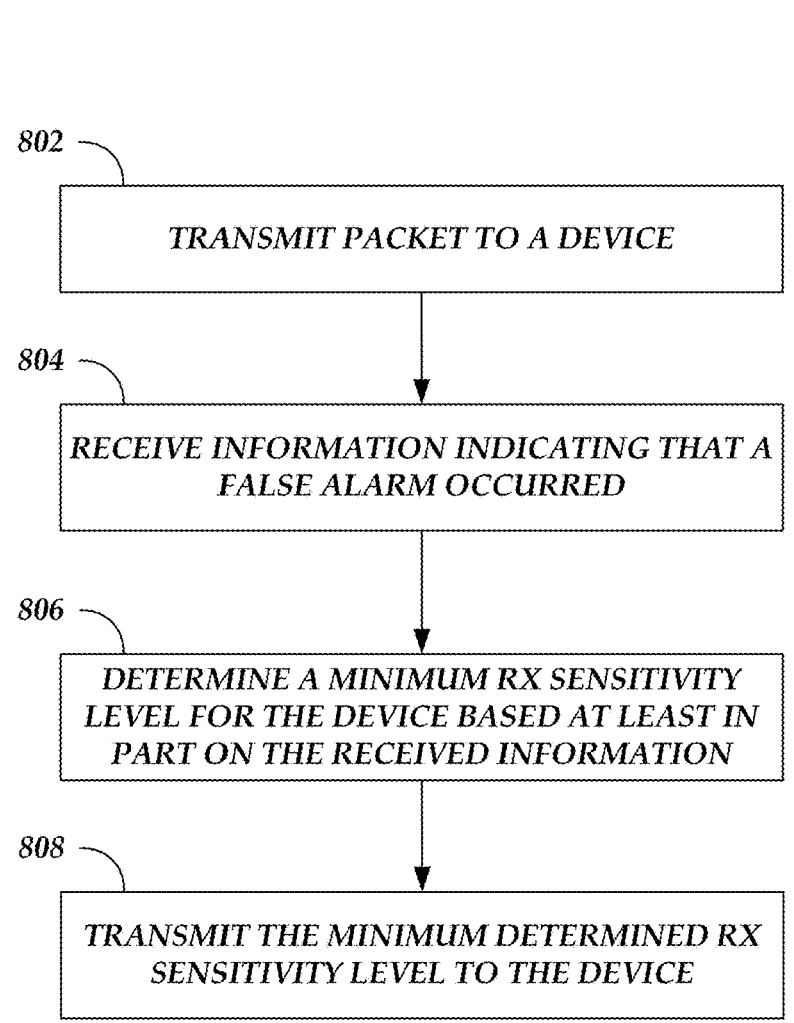
FIG. 8 is a flow diagram depicting a minimum Rx sensitivity selection routine illustratively implemented by an AP, an AP controller, and/or a STA according to one embodiment.

FIG. 8 is a flow diagram depicting a minimum Rx sensitivity selection routine 800 illustratively implemented by an AP, an AP controller, and/or a STA according to one embodiment. As an example, the AP 108, the AP controller 106, and/or the STA 110 can be configured to execute the minimum Rx sensitivity selection routine 800. The minimum Rx sensitivity selection routine 800 begins at block 802.

At block 802, a packet is transmitted to a device. For example, the packet can be transmitted to a STA 110 or an AP 108.

At block 804, information is received indicating that a false alarm occurred. For example, the information can be received by an AP 108 from a STA 110 or can be generated by the AP 108 in response to a packet transmitted by a STA 110. The information can include an indication of a received power level of the packet.

At block 806, a minimum Rx sensitivity level is determined for the device based at least in part on the received information. For example, the minimum Rx sensitivity level may be based on the received information and previously received false alarm information associated with previously transmitted packets to the device. The minimum Rx sensitivity level may be set to a level that is at least some level above the received power level of the packet and/or at least some level above a statistic derived from the received power level of the packet and/or received power level(s) of other transmitted packet(s).

At block 808, the determined minimum Rx sensitivity level is transmitted to the device. For example, the determined minimum Rx sensitivity level can be transmitted to a STA 110. As another example, the determined minimum Rx sensitivity level can be transmitted to an AP 108 from an AP controller 106. This operation may be optional if, for example, the AP 108 determines a minimum Rx sensitivity level for itself.

FIG. 9 is a flow diagram depicting a packet detection routine 900 illustratively implemented by a STA, according to one embodiment. As an example, a STA 110A-D can be configured to execute the packet detection routine 900. The packet detection routine 900 begins at block 902.

At block 902, authentication with one or more access points is performed. For example, the STA may request to be authenticated with any one of multiple access points in a single wireless protocol stack.

At block 904, a first portion of a first packet transmitted by a first access point in the one or more access points is decoded. For example, the first portion of the first packet may be a header or preamble of the first packet.

At block 906, a determination is made that a destination address included in the first portion of the first packet matches an address of the wireless computing device (e.g., the STA). For example, the address can be the Internet protocol (IP) address of the STA.

At block 908, the first packet is processed in response to the determination that the destination address included in the first portion of the first packet matches the address of the wireless computing device, irrespective of a source address included in the first portion of the first packet. For example, the STA can lock onto and process the remaining portion of the first packet (e.g., the data payload of the first packet) in response to determining that the destination address in the first portion of the first packet matches the address of the STA.

FIG. 10 is a flow diagram depicting a packet detection routine 1000 illustratively implemented by an AP, according to one embodiment. As an example, an AP 108A-I can be configured to execute the packet detection routine 1000. The packet detection routine 1000 begins at block 1002.

At block 1002, a wireless communication device is authenticated. For example, the wireless communication device can be a STA. The wireless communication device may be authenticated in response to a request from the wireless communication device. Authentication by the AP 108A-I may result in the wireless communication device being authenticated with the AP 108A-I and/or with one or more other APs 108A-I that are within a single wireless protocol stack.

At block 1004, a first portion of a first packet transmitted by the wireless communication device is decoded. For example, the first portion of the first packet may be a header or preamble of the first packet.

At block 1006, a determination is made that an address included in the first portion of the first packet matches an address associated with the wireless computing device. For example, the address included in the first portion of the first packet can be a source address in a header or preamble of the first packet. As another example, the address included in the first portion of the first packet can be a wildcard address associated with the AP, which can be the address of the wireless computing device (e.g., a STA). As another example, the address associated with the wireless communication device is an address of the wireless communication device. As another example, the address included in the first portion of the first packet can be a source address that matches the address of the wireless communication device. As another example, the address included in the first portion of the first packet can be a source address that matches the address of the authenticated wireless communication device.

At block 1008, the first packet is processed in response to the determination that the address included in the first portion of the first packet matches the address associated with the wireless computing device, irrespective of whether the first packet includes an address of the access point. For example, the AP can lock onto and process the remaining portion of the first packet (e.g., the data payload of the first packet) in response to determining that the address included in the first portion of the first packet matches the address associated with the wireless computing device. The AP can process the first packet whether the first portion of the first packet includes the address of the AP as a destination address. For example, the destination address could be a wildcard address, the address of another AP, or the address of the AP. In further embodiments, the AP can verify that the wireless communication device is authenticated (e.g., authenticated with the AP and/or with one or more other APs in the same wireless protocol stack) and process the first packet in response to the determination that the wireless communication device is authenticated and in response to the determination that the address included in the first portion of the first packet matches the address associated with the wireless computing device.

Figure 11:
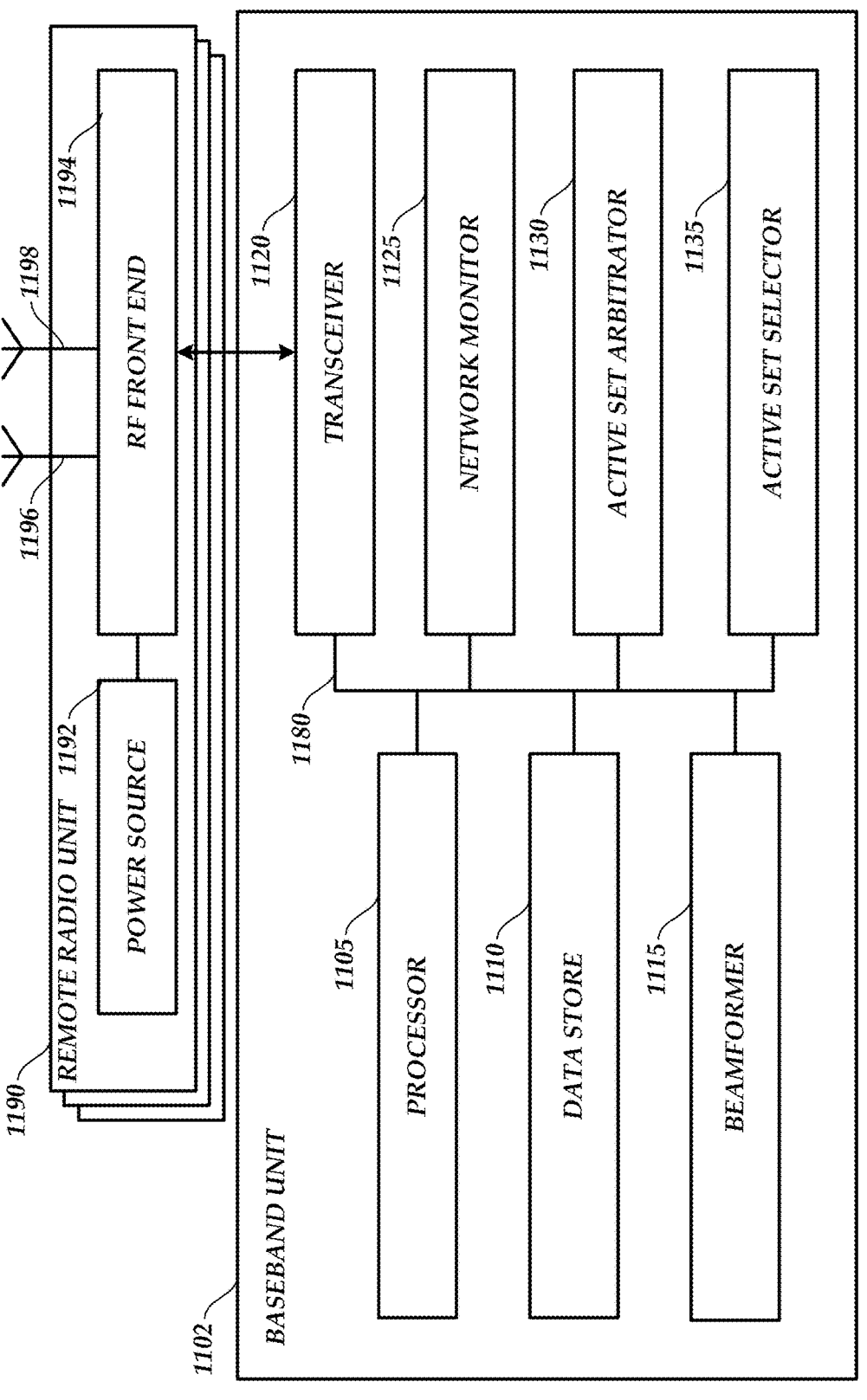
FIG. 11 is a block diagram illustrating an example baseband unit and remote radio unit according to an embodiment.

FIG. 11 is a block diagram illustrating an example baseband unit 1102 and remote radio unit 1190 according to an embodiment. The baseband unit 1102 may be coupled with at least one remote radio unit 1190. The remote radio unit 1190 may include at least a first antenna 1196 and a second antenna 1198 for MIMO wireless communications. Any antenna disclosed herein, such as the antenna 1196 or the antenna 1198, can be referred to as antenna element. The first antenna 1196 and the second antenna 1198 may be coupled with a RF front end 1194. The RF front end 1194 may process signals received via the first antenna 1196 and the second antenna 1198. Part of processing a signal may include transmitting the signal to a transceiver 1120 included in the BBU 1102.

A processor 1105 may receive signals received by the transceiver 1120. The processor 1105 may be configured to determine a type of the signal. For example, if the signal includes a request for connection services, the processor 1105 may provide the signal to an active set selector 1135. The active set selector 1135 may be configured to identify an active set of serving nodes to provide the requested downlink data transmission service. The active set selector 1135 can identify the active set for a STA based on information associated with the STA. Alternatively or additionally, the active set selector 1135 can identify the active set for a STA based on information associated with one or more other STAs. In some instances, the active set selector 1135 can identify specific spatial beam(s) selected to serve a STA. The BBU 1102 may include a network monitor 1125 to detect characteristics of the network such as the number of STAs served by each RRU, network data transmission load, and/or the like. The active set selector 1135 may receive the network characteristics from the network monitor 1125 as a factor considered when selecting spatial beam(s) to serve a STA and/or identifying an active set for a STA.

A beamformer 1115 may be included in the BBU 1102 to further identify parameters for the serving nodes (e.g., RRUs) included in an active set. The parameters may include one or more of transmission mode, time, frequency, power, beamforming matrix, tone allocation, or channel rank. The beamformer 1115 may determine optimal parameters for RRUs coupled with the BBU 1102 that facilitate a network-wide optimization of downlink data transmissions. In some implementations, the active set selector 1135 determines an active set for a STA based, in part, on information provided by the STA. In other implementations, a UE may provide a requested active set. The BBU 1102 may include an active set arbitrator 1130 to reconcile a requested active set with an active set selected by the active set selector 1135. The active set arbitrator 1130 may compare a requested set of serving nodes to the serving nodes identified by the active set selector 1135. The comparison may include ordering the serving nodes according to the STA recommendation. In some implementations, the active set arbitrator 1130 may provide a message to the STA indicating confirmation or other assessment for a requested active set. For example, if the STA requested nodes A and B but the BBU 1102 identified only B in the active set, the message may include a code indicating a partial match for the active set. Other status codes may be included to facilitate efficient communication and assessment of requested active sets. The active set arbitrator 1130 may additionally or alternatively compare a requested transmission mode to the transmission mode identified by the active set selector 1135 or other element of the BBU 1102.

The BBU 1102 may include a data store 1110. The data store 1110 may include instructions that can be executed by the processor 1105 to implement the features described herein. In some implementations, the data store 1110 may retain active sets or other scheduling information assigned to STAs served by the BBU 1102 and/or channel state information. The data store 1110 may be indexed by STA identifier and/or RRU identifier. This can expedite identification of previously communicated scheduling information for the STA and for monitoring network conditions (e.g., number of STAs allocated to an RRU or antenna element of an RRU).

In addition to providing the scheduling information to the STA, the scheduling information may be used to configure the RRU 1190. The configuration may include adjusting the first antenna 1196 such as by frequency modulation, time modulation, altering transmission power from a power source 1192, or adjusting direction, tone allocation, or beamforming of the transmission.

As discussed above, a variety of different STAs can wirelessly communicate with serving nodes in a cooperative MIMO network. An example STA will be discussed with reference to FIG. 12.

Figure 12:
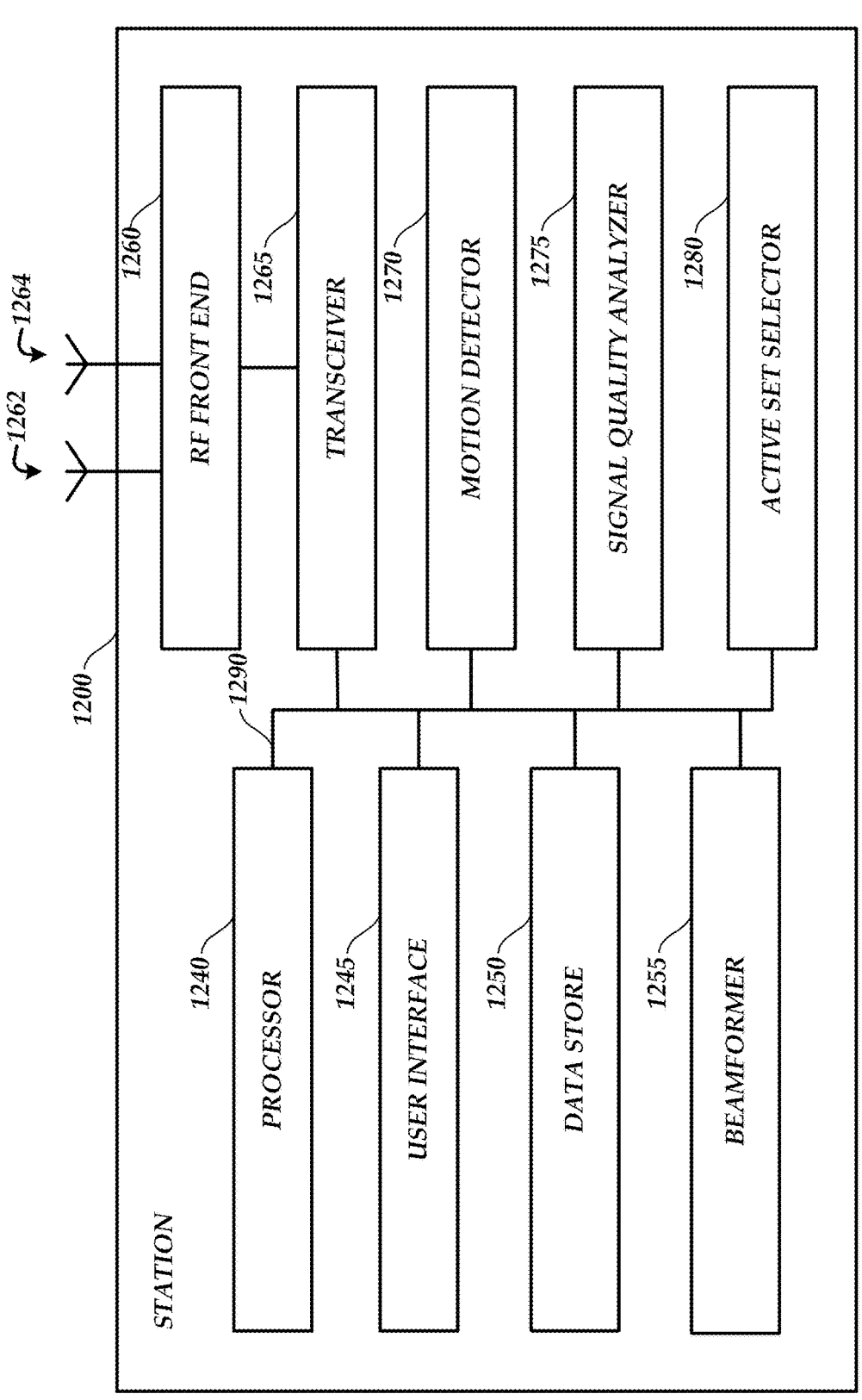
FIG. 12 is a schematic block diagram of an example STA according to an embodiment.

FIG. 12 is a schematic block diagram of an example STA 1200 according to an embodiment. The STA 1200 is configured for wirelessly communicating with a base station in a cooperative MIMO network. As illustrated in FIG. 12, the STA 1200 includes a processor 1240, a user interface 1245, a data store 1250, a beamformer 1255, antennas 1262 and 1264, a transceiver 1265, a motion detector 1270, a signal quality analyzer 1275, and an active set selector 1280. Some other STAs can include additional elements and/or a subset of the elements illustrated in FIG. 12.

The STA 1200 includes a plurality of antennas 1262 and 1264. Any suitable number of antennas can be included for wireless communication. The STA 1200 can include one or more arrays of antennas. A radio frequency (RF) front end 1260 can process RF signals received via the antennas 1262 and 1264. The RF front end can also provide RF signals to the antennas 1262 and 1264 for transmission. The transceiver 1265 includes a transmitter and a receiver. The transceiver 1265 can provide processing for transmitting and receiving RF signals associated with the antennas 1262 and 1264. For example, upon receiving active set data, the processor 1240 can configure the transceiver 1265 (e.g., receiver) to receive DL data associated with the spatial beam(s) identified in the active set data as being selected to serve the STA 1200.

The processor 1240 is in communication with the transceiver 1265. The processor 1240 is implemented by physical hardware arranged to perform specific operations to implement functionality related to determining a link strength of spatial beams over which beam pilots and/or user data are transmitted. The processor 1240 can determine the link strength, identify a spatial beam that provides the best link strength, and/or generate one or more messages to report the link strength to a serving node in accordance with any suitable principles and advantages disclosed herein. The processor 1240 can cause active set and neighbor set data to be stored and updated. The processor 1240 can perform any other suitable processing for the STA 1200.

The processor 1240 can be in communication with the motion detector 1270 and the signal quality analyzer 1275. Accordingly, the processor 1240 can receive and process information associated with conditions of the STA 1200. The motion detector 1270 can include any suitable hardware arranged to detect mobility information associated with the STA 1200. The signal quality analyzer 1275 can analyze the quality of signals received and/or transmitted by the antennas 1262 and 1264. This can provide information associated with a spatial channel condition of the STA 1200. The information associated with conditions of the STA 1200 can be provided to the processor 1240 for providing to the serving node(s). In some instances, some or all of the functionality of the motion detector 1270 and/or the signal quality analyzer can be implemented by the processor 1240.

The active set selector 1280 is optional and can identify a desired active set of one or more serving nodes. The active set selector 1280 can select the desired active set based on data associated with one or more of: one or more serving nodes in the active set, one or more serving nodes in the neighbor set, mobility data associated with the UE 1200, a spatial channel condition associated with the STA 1200, the link strength and/or the link quality of one or more spatial beams served by one or more serving nodes, or one or more characteristics of the STA 1200. The active set selector 1280 can optionally execute the active set management scheme to identify a desired active set. The active set selector 1280 can cause the processor 1240 to generate a message for transmission to a serving node and/or a BBU to request that a selected spatial beam (or selected spatial beams) be added to an active set for the STA 1200 (e.g., request that a selected spatial beam, which may be different than the spatial beam (s) already included in an active set for the STA 1200, be included in an updated active set for the STA 1200). The active set selector 1280 can be implemented by dedicated circuitry and/or circuitry of the processor 1240.

The beamformer 1255 can perform any suitable beamforming functionality for the STA 1200. The beamformer 1255 can set and/or adjust one or more parameters associated with receiving and/or transmitting signals associated with the antennas 1262 and 1264 of the STA 1200. The beamformer 1255 can be implemented by dedicated circuitry and/or circuitry of the processor 1240.

The STA 1240 includes a data store 1250. The data store 1250 can store instructions that can be executed by the processor 1240 to implement the features described herein. The data store 1250 can store active set data and neighbor set data for the STA 1200. The data store 1250 can store spatial beam link strengths and/or link qualities. The data store 1250 can store any other suitable data for the STA 1200. The data store 1250 can include any suitable memory elements arranged to store data.

Several elements included in the STA 1200 may be coupled by a bus 1290. The bus 1290 can be a data bus, communication bus, other bus, or any suitable combination thereof to enable the various components of the STA 1200 to exchange information.

As illustrated in FIG. 12, the STA 1200 also includes a user interface 1245. The user interface 1245 can be any suitable user interface, such as a display and/or an audio component. In some instances, the user interface 1245 can include one or more of touch screen capabilities, a button, a knob, a switch, or a slider.

As described above, a STA 110 may miss a data packet transmission intended for the STA 110 if the STA 110 is decoding a preamble or header of another data packet while the header or preamble of desired data packet is being transmitted. FIG. 13 illustrates an example timeline for packet transmissions from an AP 108 to a STA 110, depicting reasons why a data packet transmission miss may occur.

In one timeline (e.g., packet for STA 110 timeline), a STA 110 begins searching for a data packet at (1). After successfully identifying a data packet, the STA 110 may decode a preamble or header of the data packet and determine that the preamble or header has a destination address that matches the address of the STA 110 at (2). The STA 110 may then continue decoding the payload of the data packet at (3). Once the preamble or header and/or payload are decoded and a guard time has passed, the STA 110 can transmit an ACK or NAK at (4) to the AP 108 that transmitted the data packet and/or to another AP 108, such as another AP 108 that shares the same wireless protocol stack as the packet transmitted AP 108 as described herein. The STA 110 then begins searching for another data packet at (5). The total transmission and/or processing time from transmission of the beginning of the header to transmission of the end of the ACK may be time $T_x$. The transmission time for the STA 110 to transmit the ACK or NAK may be $T_a$.

In a second timeline (e.g., packet not for STA 110 timeline), a STA 110 begins searching for a data packet at (6). After successfully identifying a data packet, the STA 110 may decode a preamble or header of a data packet and determine that the preamble or header has a destination address that does not match the address of the STA 110 at (7). The STA 110 then aborts the payload decode and continues searching at (8) for a preamble or header of another data packet. The total transmission and/or processing time from the transmission of the beginning of the header to the start of the search at (8) is time $T_d$.

In a third timeline (e.g., STA 110B processing ACK from STA 110A timeline), a STA 110B begins searching for a data packet at (9). After successfully identifying and decoding an ACK and/or NAK transmitted by another STA 110A, the STA 110B finishes processing the ACK and/or NAK at (10) and continues searching for another data packet at (11). The total transmission and/or processing time from the transmission of the beginning of the ACK and/or NAK to the start of the search at (11) may be time $T_{ap}$. The difference between $T_{ap}$ and $T_a$ may be the time beyond the transmission of the ACK and/or NAK for the STA 110B to complete the processing of the ACK and/or NAK and restart the search processing at (11).

As described above, pre-empting full data packet processing in a manner as described above with respect to FIG. 2 and elsewhere in this disclosure (e.g., based on determining whether the destination address in a header or preamble matches a destination address of a receiving device, based on determining whether a source address in a header or preamble matches an address of an authenticated device, etc.) can reduce the likelihood that a STA 110 misses a transmission from an AP 108 that is intended for the STA 110 and that is transmitted while the STA 110 is processing a false alarm data packet (e.g., a data packet not intended for the STA 110, a data packet intended for another STA 110, a data packet transmitted by an AP 108 with which the STA 110 has not authenticated, etc.). However, a STA 110 may still miss some transmissions intended for the STA 110 as depicted in FIG. 13. Synchronizing and/or temporarily coordinating APs 108 may alleviate this issue.

FIG. 14 illustrates a synchronized system in which AP 108 packet transmission times are synchronized to a raster. As illustrated in FIG. 14, the AP 108A-C transmission start times may be offset on a raster with spacing time $T_r$. Given N APs 108 and N raster offsets (with one offset assigned to each AP 108 by, for example, an AP controller 106), an AP 108 may transmit a data packet at start time index n if $$(n\text{–offset})\text{modulo } N\text{=0}$$

The raster may ensure that one AP 108 is transmitting a header during any raster interval (e.g., multiple APs 108 may not transmit a header during the same raster interval). As a result, if a STA 110 detects a preamble for a data packet not intended for the STA 110, as long as the STA 110 can process and/or abort the processing of the header prior to the next raster start time, the STA 110 may not miss a preamble of a data packet actually intended for the STA 110 (e.g., given that subsequent preambles may be transmitted by APs 108 after the prior raster start time completes). In other words, the STAs 110 can continue to process preambles or headers in a manner as described herein, and abort the processing if the destination address in the header or preamble does not match the address of the respective STA 110. However, the APs 108 may be coordinated such that the APs 108 refrain from transmitting preambles or headers at the same time and/or overlapping in time. This may ensure that, at least due to AP 108 preamble false alarms, the STAs 110 are in a search state at the beginning of a raster interval if the STAs 110 are not already processing a data packet that is directed to the respective STA 110. These operations may reduce the likelihood that STAs 110 miss data packets due to the processing of preambles or headers that are for data packets not actually intended for the STAs 110.

For example, AP 108A may start 1402 transmitting a header or preamble of a data packet at time 0. Because FIG. 14 illustrates three APs 108A-C in the network, the next raster interval during which the AP 108A can transmit is time 3T$_r$. At time 3T$_r$, the AP 108A transmits a header 1404 and, some time later, transmits a payload 1406 of a second data packet. AP 108B, however, may start transmitting preambles or headers at time T$_r$, and AP 108C may start transmitting preambles or headers at time 2T$_r$. The data packet transmitted by the AP 108B at time T$_r$, however, may be large and the amount of time to transmit the full data packet may pass the next raster interval, 4T$_r$, assigned to the AP 108B. As a result, the AP 108B may not transmit a second packet until the following raster interval, 7T$_r$. Similarly, while the AP 108C can transmit during the raster interval starting at 2T$_r$, the AP 108C does not need to transmit during this raster interval. Here, the AP 108C does not transmit any data packets during this raster interval. The AP 108C then waits until the next raster interval, 5T$_r$, to transmit a preamble or header and payload of a data packet.

To ensure that a STA 110 is in a data packet search state at the beginning of a raster interval (e.g., at a raster start time), the raster step T$_r$ may be at least equal to the maximum time, T$_d$, for a STA 110 to process and abort processing a preamble that has a mismatched destination (e.g., has a destination address that does not match the address of the STA 110). For example, the raster time interval, T$_r$, may be as follows:

$$T_r > T_d$$

In an embodiment, the AP controller 106 could assign every AP 108A-C in a system a unique raster offset or interval. For N APs 108, the period of start times for a given AP may be N*T$_r$. For large N, this could lead to significant inefficiencies given long idle transmission times waiting for the next raster start time. In another embodiment, the AP controller 106 can assign APs 108 the same offset if the APs 108 are sufficiently spaced from a path loss perspective. For example, if AP 108A is outside the coverage of STAs 110 associated with AP 108B, the APs 108A-B could be assigned the same offset given that it is unlikely that the STAs 110 associated with AP 108B will process preambles or headers of data packets transmitted by the AP 108A since such data packets may be below a configured minimum sensitivity threshold (e.g., such as the minimum Rx sensitivity level described above). These operations may be a form of raster offset re-use (e.g., multiple APs 108 can use the same raster interval to transmit preambles or headers). As an illustrative example, assuming a cellular deployment topology, an offset re-use of 7 or 21 could yield the same or similar false alarm reduction performance as an arbitrarily large N in which unique raster offsets are used.

In another embodiment, to reduce the idle transmission times associated with strict raster start times, some APs 108 may be assigned optional data packet transmit times other than or in addition to the assigned raster offset. For example, if an AP 108 raster start time has just passed, the AP 108 may still transmit a preamble or header (or data packet) during the next raster interval (subject to an exception criterion). The exception criterion may limit such exceptions so that most preamble or header transmission are aligned to the assigned raster offset (e.g., occur during the assigned raster interval). Non-offset aligning (e.g., an AP 108 transmitting a preamble or header outside of an assigned raster interval)

may result in one or more STAs 110 missing packet transmissions due to preamble or header transmission overlaps. If the relative frequency of non-offset aligned preamble or header transmissions is low compared to the total packet transmission, however, the impact on overall system false alarm reduction performance may be minimized. As an example, an exception criterion may be the minimum run length of offset aligned transmissions between exceptions. In particular, a run-length of 9 data packets would ensure at most one non-offset aligned preamble or header transmission every transmission of 10 data packets during an assigned raster interval. As another example, an exception criterion may define that an AP 108 is allowed to start transmission of a preamble or header during the assigned raster interval with probability 1 and within any other raster interval with probability p. For non-assigned raster interval transmission, a random coin toss event (e.g., a random number generator) can determine if a transmission of a preamble or header by an AP 108 not assigned to the current raster interval can start. The probabilistic approach may ensure exceptions are uniformly distributed and the value of p may allow the fraction of non-offset aligned transmissions to be controlled.

In another embodiment, to reduce the idle transmission times, some APs 108 may be assigned raster intervals or offsets (e.g., by the AP controller 106) if the APs 108 have active queues of data packets to be scheduled. This may be a form a dynamic raster interval re-use, with the number of raster offsets N and the offset assignments being reconfigured depending on the active APs 108 (e.g., the APs 108 having active queues of data packets to be scheduled). In an extreme case of only one active AP 108, the raster may offset N may equal 1 and the AP controller 106 may assign a single offset. In this case the AP 108 could start preamble or header transmission on any raster interval T$_r$. An alternative to semi-static reassignment of the offsets is to extend the probabilistic approach described above without changing the set of raster offsets N. For example, an AP can start transmission at the assigned offset with probability 1. For a specified set of offsets that are associated with idle or unassigned offsets, the start probability may be q, and for all other offsets with other active APs 108, the start probability may be p. Typically, the relative probabilities q>p may bias transmissions to idle AP 108 offsets versus known active AP 108 offsets.

Not only can the transmission of preambles or headers that are processed by STAs 110 for which the transmission is not intended result in false alarms (e.g., false decodes), but also the ACK or NAK transmitted by STAs 110 can cause false alarms and missed data packets as well. For example, the STA 110 ACK and/or NAK, which is directed to the serving AP 108, may also be decoded by other STAs 110. If the ACK and/or NAK decode processing happens to overlap with the preamble of a transmission directed to the STA 110, a missed packet can result.

FIG. 15 illustrates a timeline of ACK and/or NAK transmission that may reduce the likelihood that ACK and/or NAK transmissions result in missed AP 108 preambles. As illustrated in FIG. 15, STAs 110 may be configured to start transmission of an ACK or NAK at least a hold time T$_h$ after the start of the raster interval and/or after the start of a transmission of a preamble or header 1502. By the AP controller 106, APs 108, and/or STAs 110 ensuring that transmission of the ACK and/or NAK lags transmission of a preamble or header during the same raster interval with sufficient margin to offset synchronization and other delays, the STAs 110 may detect the preamble or header first and before the ACK and/or NAK. In addition, the STAs 110 may be configured such that transmission of the ACK and/or NAK may be complete with sufficient setup time $T_s$ before the next raster start time (e.g., before the start of the next raster interval), such as the next time an AP 108 is eligible to transmit a header 1504. By the AP controller 106, APs 108, and/or STAs 110 ensuring that the ACK and/or NAK is transmitted after transmission of the preamble or header 1502 during a given raster interval with sufficient margin to allow the ACK and/or NAK to be processed prior to completion of the raster interval, with a time margin to offset synchronization and other delays, the STAs 110 may be in a search state at the start of a raster interval and ready to detect any preambles or headers 1504 transmitted by an AP 108 after the current raster interval. Furthermore, the raster interval duration may be at least equal to the ACK and/or NAK transmission time, $T_a$, plus the setup time $T_s$ and hold $T_h$ time. For example, the STAs 110 may be configured to follow the following transmission settings:

$$T_r > T_h + T_a + T_s$$

$$(T_x - T_a) \bmod T_r > T_h$$

$$(T_r - T_x) \bmod T_r > T_s$$

$T_x$ may be adjusted by the AP controller 106 and/or the APs 108 to ensure that the false alarm likelihood is reduced. The time $T_x$ may be a function of the transmission MCS, number packets, etc. To adjust the time $T_x$ time, an AP controller 106 and/or an AP 108 can pad the transmission and extend the time $T_x$ to ensure that the false alarm likelihood is reduced. As described herein, if the above-described transmission settings can be met, the likelihood of false alarms may be greatly reduced.

In some embodiments, data packets transmitted by a serving AP 108 that have been successfully decoded by a STA 110 may still be retransmitted by the serving AP 108 if the confirmation ACK transmitted by the STA 110 is not successfully decoded by the serving AP 108. Similar to overlapping packet preambles that may result in STA 110 preamble missed detection (e.g., a STA 110 missing a preamble of a data packet intended for the STA 110 because the STA 110 is currently processing a preamble of another data packet that actually is not intended for the STA 110), the ACK transmitted by a STA 110 may be missed by the receiving AP 108 if the receiving AP 108 is processing a preamble transmitted by another AP 108 at the time that the ACK is transmitted. The AP 108 may begin searching for a preamble of an ACK and/or NAK after the data packet transmission is complete. By ensuring that the AP 108 is configured to delay starting the search for a preamble of an ACK and/or NAK, such as by at least the preamble hold time $T_h$ (e.g., at least a hold time $T_h$ after the start of the raster interval and/or after the start of a transmission of a preamble or header of a data packet), any preambles transmitted by other APs 108 may be missed, thereby avoiding a false detection that could overlap with the ACK and/or NAK detection. For example, the ACK time (e.g., the ACK transmission time) can be extended to include the guard time between the end of the data packet transmission and the start of the ACK and/or NAK transmission. Equivalently, $T_a$ can be the total time from the end of the data packet transmission to the end of the ACK transmission.

In any of the approaches or embodiments described above, the AP controller 106 may assign raster offsets or intervals or otherwise assign settings or parameters for APs 108 and/or STAs 110 that govern AP 108 and/or STA 110 transmissions and/or timing.

TERMINOLOGY, APPLICATIONS, AND CONCLUSION

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

As used herein a "transmit-receive point" (TRP) (which can alternatively be referred to as a transmission reception point) may refer to a transceiver device or one transceiver element included in a device. When included as a transceiver element, the device may include multiple TRPs. The TRP may include one or more antennas which are coupled to signal processing circuitry. The signal processing circuitry may be included in the device. The TRP may include additional elements to facilitate transmission or receipt of wireless signals for one or more UEs. Example of such elements may include a power source, amplifier, digital-to-analog converter, analog-to-digital converter, or the like. When a TRP is allocated, such as by a BBU, to provide service to a UE, the TRP may be said to be a "serving node" for the UE.

As used herein a "remote radio unit" (RRU) may refer to a device for controlling and coordinating transmission and receipt of wireless signals for one or more UEs. An RRU may include or be coupled with one or more TRPs. The RRU may receive signals from the TRP and include the signal processing circuitry. The signal processing circuitry may be selectively operated to facilitate processing of signals associated with different TRPs.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An access point comprising:
an antenna; and
a processor in communication with the antenna, wherein computer-executable instructions, when executed by the processor, cause the access point to:
    authenticate a wireless communication device;
    decode a first portion of a first packet transmitted by the wireless communication device;
    determine that an address included in the first portion of the first packet matches an address associated with the wireless communication device;
    process the first packet transmitted by the wireless communication device in response to the determination that the address included in the first portion of the first packet matches the address associated with the wireless communication device, irrespective of whether the first packet includes an address of the access point; and
    transmit a header of a second packet to the wireless communication device at a first time corresponding to a raster offset assigned to the access point by an access point controller.

2. The access point of claim 1, wherein the computer-executable instructions, when executed, further cause the access point to process the first packet transmitted by the wireless communication device in response to a determination that the wireless communication device is authenticated and the determination that the address included in the first portion of the first packet matches the address associated with the wireless communication device.

3. The access point of claim 1, wherein the address included in the first portion of the first packet is a source address in a header of the first packet.

4. The access point of claim 1, wherein the computer-executable instructions, when executed, further cause the access point to process the first packet transmitted by the wireless communication device in response to a determination that the address included in the first portion of the first packet is a source address that matches the address of the wireless communication device.

5. The access point of claim 1, wherein the computer-executable instructions, when executed, further cause the access point to process the first packet transmitted by the wireless communication device in response to a determination that the address included in the first portion of the first packet is a source address that matches an address of an authenticated wireless communication device.

6. The access point of claim 1, wherein the first portion of the first packet comprises one of a header of the first packet or a preamble of the first packet.

7. The access point of claim 1, wherein the wireless communication device is a station.

8. The access point of claim 1, wherein the computer-executable instructions, when executed, further cause the access point to refrain from transmitting a third packet at a second time corresponding to a second raster offset assigned to a second access point by the access point controller subject to an exception criterion.

9. The access point of claim 8, wherein a time difference between the second time and the first time is at least equal to a maximum time for the wireless communication device to process and abort processing a preamble that has a mismatched destination address.

10. The access point of claim 8, wherein the exception criterion comprises one of a minimum run length of offset aligned transmissions or a random coin toss event.

11. The access point of claim 1, wherein the access point controller assigns the raster offset to the access point in response to an indication that the access point as an active queue of data packets to be scheduled.

12. The access point of claim 1, wherein the wireless communication device transmits a positive acknowledgement (ACK) message or a negative acknowledgement (NAK) message in response to transmission of the second packet at least a hold time after start of transmission of the second packet.

13. The access point of claim 12, wherein the access point controller assigns the raster offset to the access point in response to begin searching for the ACK message or the NAK message at least the hold time after start of transmission of the second packet.

14. The access point of claim 1, wherein the computer-executable instructions, when executed, further cause the access point to determine that the first portion of the first packet does not include an address of the access point.

15. A computer-implemented method comprising:

authenticating, by an access point, a wireless communication device;

decoding a first portion of a first packet transmitted by the wireless communication device;

determining that an address included in the first portion of the first packet matches an address associated with the wireless communication device;

processing the first packet transmitted by the wireless communication device in response to the determination that the address included in the first portion of the first packet matches the address associated with the wireless communication device, irrespective of whether the first packet includes an address of the access point; and transmitting a header of a second packet to the wireless communication device at a first time corresponding to a raster offset assigned to the access point by an access point controller.

16. The computer-implemented method of claim 15, wherein processing the first packet further comprises processing the first packet transmitted by the wireless communication device in response to a determination that the wireless communication device is authenticated and the determination that the address included in the first portion of the first packet matches the address associated with the wireless communication device.

17. The computer-implemented method of claim 15, wherein the address included in the first portion of the first packet is a source address in a header of the first packet.

18. The computer-implemented method of claim 15, further comprising refraining from transmitting a third packet at a second time corresponding to a second raster offset assigned to a second access point by the access point controller subject to an exception criterion.

19. The computer-implemented method of claim 15, further comprising determining that the first portion of the first packet does not include an address of the access point.

20. The computer-implemented method of claim 15, wherein the wireless communication device transmits a positive acknowledgement (ACK) message or a negative acknowledgement (NAK) message in response to transmission of the second packet at least a hold time after start of transmission of the second packet.

21. The computer-implemented method of claim 20, further comprising beginning to search for the ACK message or the NAK message at least the hold time after start of transmission of the second packet.

* * * * *